United States Patent
Holman et al.

(10) Patent No.: US 10,176,505 B2
(45) Date of Patent: Jan. 8, 2019

(54) SYSTEMS AND METHODS FOR PROVIDING CUSTOMIZED FOOD ITEMS THAT ARE CUSTOMIZED BASED, AT LEAST IN PART, ON CUSTOMIZED FOOD ITEM INTEGRITY PREFERENCE

(71) Applicant: Elwha LLC, Bellevue, WA (US)

(72) Inventors: Pablos Holman, Seattle, WA (US); Nathan P. Myhrvold, Bellevue, WA (US); Robert C. Petroski, Seattle, WA (US); Clarence T. Tegreene, Mercer Island, WA (US); Charles Whitmer, North Bend, WA (US); Lowell L. Wood, Jr., Bellevue, WA (US); Victoria Y. H. Wood, Livermore, CA (US); Roderick A. Hyde, Redmond, WA (US); Muriel Y. Ishikawa, Livermore, CA (US); Jordin T. Kare, Seattle, WA (US); Max R. Levchin, San Francisco, CA (US); Royce A. Levien, Lexington, MA (US); Richard T. Lord, Gig Harbor, WA (US); Robert W. Lord, Seattle, WA (US); Mark A. Malamud, Seattle, WA (US)

(73) Assignee: Elwha LLC, Bellevue, WA (US)

( * ) Notice: Subject to any disclaimer, the term of this patent is extended or adjusted under 35 U.S.C. 154(b) by 74 days.

(21) Appl. No.: 14/176,408

(22) Filed: Feb. 10, 2014

(65) Prior Publication Data
US 2015/0186969 A1     Jul. 2, 2015

Related U.S. Application Data

(63) Continuation of application No. 14/175,416, filed on Feb. 7, 2014, now Pat. No. 9,824,382, which is a
(Continued)

(51) Int. Cl.
G06Q 30/00    (2012.01)
G06Q 30/06    (2012.01)
(Continued)

(52) U.S. Cl.
CPC .......... *G06Q 30/0621* (2013.01); *G07F 9/023* (2013.01); *G07F 11/002* (2013.01); *G07F 11/70* (2013.01); *G07F 17/0064* (2013.01)

(58) Field of Classification Search
CPC ........ G07F 9/023; G07F 11/002; G07F 11/70; G07F 17/0064; G07F 17/26;
(Continued)

(56) References Cited

U.S. PATENT DOCUMENTS 5,147,068 A    9/1992   Wright
5,997,924 A    12/1999   Olander, Jr. et al.
(Continued)

OTHER PUBLICATIONS

"Burritobot: A 3-D Printer That Spits Out Burritos"; bearing a date of Jun. 19, 2012; retrieved on Aug. 26, 2015; pp. 1-9; located at: http://www.fastcodesign.com/1670070/burritobot-a-3-d-printer-that-spits-out-burritos (hereinafter "Burritobot").
(Continued)

*Primary Examiner* — Brandy A Zukanovich

(57) ABSTRACT

Computationally implemented methods and systems include acquiring user information associated with one or more users for use in generating one or more customized food items that are customized specifically for the one or more users, the user information to be acquired including at least one or more user preferences related to integrity of one or more food ingredients to be included in the one or more customized food items; and directing generation of the one or more customized food items for the one or more users, the one or more customized food items having been customized to show one or more visual indicators that provide customized information that has been customized in accordance, at
(Continued)

least in part, with the acquired user information. In addition to the foregoing, other aspects are described in the claims, drawings, and text.

42 Claims, 37 Drawing Sheets

Related U.S. Application Data continuation-in-part of application No. 14/145,864, filed on Dec. 31, 2013, now Pat. No. 10,035,643, which is a continuation of application No. 14/144,163, filed on Dec. 30, 2013, now Pat. No. 10,053,280.

(51) Int. Cl.
*G07F 11/00* (2006.01)
*G07F 17/00* (2006.01)
*G07F 9/02* (2006.01)
*G07F 11/70* (2006.01)

(58) Field of Classification Search
CPC ........... G06Q 30/0601–30/0645; G06Q 30/08; G06Q 20/18
USPC ...................................... 705/26.1–27.2, 26.5
See application file for complete search history.

(56) References Cited

U.S. PATENT DOCUMENTS

| | | | |
|---|---|---|---|
| 6,646,659 B1* | 11/2003 | Brown | G06Q 30/02 705/15 |
| 6,662,195 B1 | 12/2003 | Langseth et al. | |
| 7,076,438 B1* | 7/2006 | Tobelmann | G06F 19/3475 128/921 |
| 7,421,285 B1* | 9/2008 | Rao | G06F 3/023 455/556.1 |
| 8,255,699 B2 | 8/2012 | Tagscherer | |
| 8,429,026 B1 | 4/2013 | Kolawa et al. | |
| 8,504,440 B1 | 8/2013 | Kolawa et al. | |
| 8,751,334 B2 | 6/2014 | Wijaya et al. | |
| 8,863,649 B1 | 10/2014 | Rao et al. | |
| 9,172,738 B1 | 10/2015 | daCosta | |
| 9,239,246 B2 | 1/2016 | Jones | |
| 2001/0011680 A1 | 8/2001 | Soltesz et al. | |
| 2002/0081356 A1 | 6/2002 | Bebiak et al. | |
| 2003/0006281 A1 | 1/2003 | Thomas et al. | |
| 2003/0028885 A1 | 2/2003 | Wilcox et al. | |
| 2003/0061094 A1 | 3/2003 | Banerjee et al. | |
| 2004/0238555 A1* | 12/2004 | Parks | G07F 9/105 221/80 |
| 2005/0267811 A1 | 12/2005 | Almblad | |
| 2006/0188620 A1 | 8/2006 | Gutwein et al. | |
| 2007/0112460 A1 | 5/2007 | Kiselik | |
| 2007/0231425 A1* | 10/2007 | Ream | A23G 3/0021 426/3 |
| 2007/0294129 A1* | 12/2007 | Froseth | G06Q 10/08 705/7.32 |
| 2008/0012726 A1 | 1/2008 | Publicover | |
| 2009/0077007 A1 | 3/2009 | Schwarzberg et al. | |
| 2009/0204492 A1 | 8/2009 | Scifo et al. | |
| 2009/0228325 A1 | 9/2009 | Simmons et al. | |
| 2009/0275075 A1* | 11/2009 | Dodd | C12Q 1/22 435/34 |
| 2010/0255484 A1* | 10/2010 | Halverson | G01N 1/38 435/6.1 |
| 2011/0208617 A1 | 8/2011 | Weiland | |
| 2011/0238296 A1 | 9/2011 | Purks et al. | |
| 2012/0102993 A1 | 5/2012 | Hortin | |
| 2012/0226698 A1 | 9/2012 | Silvestre et al. | |
| 2012/0239683 A1 | 9/2012 | Starkman | |
| 2012/0323691 A1 | 12/2012 | McLaughlin et al. | |
| 2013/0024299 A1* | 1/2013 | Wong | G06Q 50/12 705/15 |
| 2013/0029693 A1 | 1/2013 | Bradley, Jr. et al. | |
| 2013/0054016 A1 | 2/2013 | Canter et al. | |
| 2013/0085345 A1* | 4/2013 | Geisner | G06Q 30/00 600/300 |
| 2013/0218687 A1* | 8/2013 | Sohangir | G06F 17/30867 705/14.66 |
| 2013/0311311 A1* | 11/2013 | Chopra | G06Q 30/018 705/15 |
| 2013/0317921 A1 | 11/2013 | Havas | |
| 2014/0037805 A1 | 2/2014 | Minvielle | |
| 2014/0080102 A1* | 3/2014 | Krishna | G06Q 30/02 434/127 |
| 2014/0108320 A1 | 4/2014 | Baca et al. | |
| 2015/0058063 A1 | 2/2015 | Pinel et al. | |
| 2015/0227140 A1 | 8/2015 | Douglas et al. | |

OTHER PUBLICATIONS

"Inside Redbox Mobile Demo"; bearing a date of Feb. 1, 2009; uploaded to YouTube by habdeira; retrieved on Aug. 27, 2015; 1 page; located at: https://www.youtube.come/watch?v=iroan2BtzDc; ("Redbox").
"Say Hello to Burritobox, The World's First Burrito Vending Machine"; bearing a date of Jan. 8, 2014; updated on Jan. 23, 2014; pp. 1-3.
Andersen; "Freshly Baked Pizzas . . . from a Vending Machine?"; bearing a date of Aug. 27, 2013; pp. 1-2; located at: http://slice.seriouseats.com/archives/2013/08/freshly-baked-pizzasfrom-a-vending-machine.html.
pizzamarketplace.com; "Let's Pizza vending machine ready for U.S. debut"; bearing a date of Jun. 5, 2017; pp. 1-2; located at: https://www.pizzamarketplace.com/articles/lets-pizza-vending-machine-ready-for-us-debut/.
"EatWaveTM Vending Launches the Industry's First 'All-In-One' Vending Machine for Hot and Cold Food Items as well as Snacks and Drinks"; Business Wire; Nov. 6, 2012; total of 3 pages, as provided by examiner; ProQuest LLC 2018.
Microwave Oven reference, The Southwest Museum of Engineering, Communication and Computation, 2007; cited and printed by Examiner on Jun. 6, 2018; total of 13 pages (as provided by examiner); located at: http://www.srnecc.org/microwave_oven.htm.

* cited by examiner

320' Customized Food Item Generation System

460' Customized Food Item Production System

FIG. 4C

320" Customized Food Item Generation System

460" Customized Food Item Production System

462* Visual Indicator Placement System

FIG. 4D

SYSTEMS AND METHODS FOR PROVIDING CUSTOMIZED FOOD ITEMS THAT ARE CUSTOMIZED BASED, AT LEAST IN PART, ON CUSTOMIZED FOOD ITEM INTEGRITY PREFERENCE

CROSS-REFERENCE TO RELATED APPLICATIONS

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC § 119(e) for provisional patent applications, for any and all parent, grandparent, great-grandparent, etc. applications of the Priority Application(s)). In addition, the present application is related to the "Related Applications," if any, listed below.

Priority Applications

For purposes of the USPTO extra-statutory requirements, the present application constitutes a continuation of U.S. patent application Ser. No. 14/175,416, entitled SYSTEMS AND METHODS FOR PROVIDING CUSTOMIZED FOOD ITEMS THAT ARE CUSTOMIZED BASED, AT LEAST IN PART, ON CUSTOMIZED FOOD ITEM INTEGRITY PREFERENCE, naming Pablos Holman, Son Hong, Roderick A. Hyde, Muriel Y. Ishikawa, Jordin T. Kare, Max R. Levchin, Royce A. Levien, Richard T. Lord, Robert W. Lord, Mark A. Malamud, Nathan P. Myhrvold, Robert C. Petroski, Clarence T. Tegreene, Charles Whitmer, Lowell L. Wood, Jr., and Victoria Y. H. Wood as inventors, filed 7 Feb. 2014, which is currently co-pending or is an application of which a currently co-pending application is entitled to the benefit of the filing date.

The present application constitutes a continuation-in-part of U.S. patent application Ser. No. 14/145,864, entitled SYSTEMS AND METHODS FOR PROVIDING CUSTOMIZED PACKAGINGS FOR CUSTOMIZED FOOD ITEMS THAT WERE CUSTOMIZED BASED, AT LEAST IN PART, ON CUSTOMIZED FOOD ITEM INTEGRITY PREFERENCE, naming Pablos Holman, Roderick A. Hyde, Muriel Y. Ishikawa, Jordin T. Kare, Max R. Levchin, Royce A. Levien, Richard T. Lord, Robert W. Lord, Mark A. Malamud, Nathan P. Myhrvold, Robert C. Petroski, Clarence T. Tegreene, Charles Whitmer, Lowell L. Wood, Jr., and Victoria Y. H. Wood, as inventors, filed 31 Dec. 2013, which is currently co-pending or is an application of which a currently co-pending application is entitled to the benefit of the filing date, and which is a continuation of U.S. patent application Ser. No. 14/144,163, entitled SYSTEMS AND METHODS FOR PROVIDING CUSTOMIZED PACKAGINGS FOR CUSTOMIZED FOOD ITEMS THAT WERE CUSTOMIZED BASED, AT LEAST IN PART, ON CUSTOMIZED FOOD ITEM INTEGRITY PREFERENCE, naming Pablos Holman, Roderick A. Hyde, Muriel Y. Ishikawa, Jordin T. Kare, Max R. Levchin, Royce A. Levien, Richard T. Lord, Robert W. Lord, Mark A. Malamud, Nathan P. Myhrvold, Robert C. Petroski, Clarence T. Tegreene, Charles Whitmer, Lowell L. Wood, Jr., and Victoria Y. H. Wood, as inventors, filed 30 Dec. 2013.

Related Applications

None as of the filing date.

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, Benefit of Prior-Filed Application, USPTO Official Gazette Mar. 18, 2003. The USPTO further has provided forms for the Application Data Sheet which allow automatic loading of bibliographic data but which require identification of each application as a continuation, continuation-in-part, or divisional of a parent application. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above and in any ADS filed in this application, but expressly points out that such designation(s) are not to be construed in any way as any type of commentary and/or admission as to whether or not the present application contains any new matter in addition to the matter of its parent application(s).

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

SUMMARY

In one or more various aspects, a method includes, but is not limited to, acquiring user information associated with one or more users for use in generating one or more customized food items that are customized specifically for the one or more users, the user information to be acquired including at least one or more user preferences related to integrity of one or more food ingredients to be included in the one or more customized food items, and directing generation of the one or more customized food items for the one or more users, the one or more customized food items having been customized to show one or more visual indicators that provide customized information that has been customized in accordance, at least in part, with the acquired user information. In various implementations, at least one of the above recited operations is performed by a machine or article of manufacture. In addition to the foregoing, other method aspects are described in the claims, drawings, and text forming a part of the disclosure set forth herein.

In one or more various aspects, one or more related systems may be implemented in machines, compositions of matter, or manufactures of systems, limited to patentable subject matter under 35 U.S.C. 101. The one or more related systems may include, but are not limited to, circuitry and/or programming for effecting the herein-referenced method aspects. The circuitry and/or programming may be virtually any combination of hardware, software, and/or firmware configured to effect the herein-referenced method aspects depending upon the design choices of the system designer, and limited to patentable subject matter under 35 USC 101.

In one or more various aspects, a system includes, but is not limited to, means for acquiring user information associated with one or more users for use in generating one or more customized food items that are customized specifically for the one or more users, the user information to be acquired including at least one or more user preferences related to integrity of one or more food ingredients to be included in the one or more customized food items, and means for directing generation of the one or more customized food items for the one or more users, the one or more customized food items having been customized to show one or more visual indicators that provide customized information that has been customized in accordance, at least in part, with the acquired user information. In addition to the foregoing, other system aspects are described in the claims, drawings, and text forming a part of the disclosure set forth herein.

In one or more various aspects, a system includes, but is not limited to, circuitry for acquiring user information associated with one or more users for use in generating one or more customized food items that are customized specifically for the one or more users, the user information to be acquired including at least one or more user preferences related to integrity of one or more food ingredients to be included in the one or more customized food items, and circuitry for directing generation of the one or more customized food items for the one or more users, the one or more customized food items having been customized to show one or more visual indicators that provide customized information that has been customized in accordance, at least in part, with the acquired user information. In addition to the foregoing, other system aspects are described in the claims, drawings, and text forming a part of the disclosure set forth herein.

In one or more various aspects, a computer program product, comprising a signal bearing non-transitory storage medium, bearing one or more instructions including, but not limited to, acquiring user information associated with one or more users for use in generating one or more customized food items that are customized specifically for the one or more users, the user information to be acquired including at least one or more user preferences related to integrity of one or more food ingredients to be included in the one or more customized food items, and directing generation of the one or more customized food items for the one or more users, the one or more customized food items having been customized to show one or more visual indicators that provide customized information that has been customized in accordance, at least in part, with the acquired user information. In addition to the foregoing, other computer program product aspects are described in the claims, drawings, and text forming a part of the disclosure set forth herein.

In one or more various aspects, a system includes, but is not limited to, a user information obtaining module configured to obtain user information associated with one or more users that is a basis, at least in part, in generating one or more customized food items that are customized specifically for the one or more users, the user information to be obtained including at least one or more user preferences related to integrity of one or more food ingredients to be included in the one or more customized food items; and a customized food item generation controlling module configured to control generation of the one or more customized food items that are customized to show one or more visual indicators that provide customized information that has been customized in accordance, at least in part, with the acquired user information.

In addition to the foregoing, various other method and/or system and/or program product aspects are set forth and described in the teachings such as text (e.g., claims and/or detailed description) and/or drawings of the present disclosure.

The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent by reference to the detailed description, the corresponding drawings, and/or in the teachings set forth herein.

BRIEF DESCRIPTION OF THE FIGURES

For a more complete understanding of embodiments, reference now is made to the following descriptions taken in connection with the accompanying drawings. The use of the same symbols in different drawings typically indicates similar or identical items, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIG. 2A illustrates an exemplary customized food item 22a with exemplary visual indicators 204a.

FIG. 3A shows a block diagram of a particular implementation of the customized food preparation system 10* of FIG. 1A illustrated as customized food preparation system 10a.

FIG. 3D shows a block diagram of a particular implementation of the network control system 12* of FIG. 1B illustrated as network control system 12a.

FIG. 4C shows a particular embodiment of the customized food item generation system 320* of FIGS. 3A, 3B, and 3C illustrated as customized food item generation system 320' in accordance with various implementations.

FIG. 4D shows a particular embodiment of the customized food item generation system 320* of FIGS. 3A, 3B, and 3C illustrated as customized food item generation system 320" in accordance with various implementations.

DETAILED DESCRIPTION

Figure 1A:
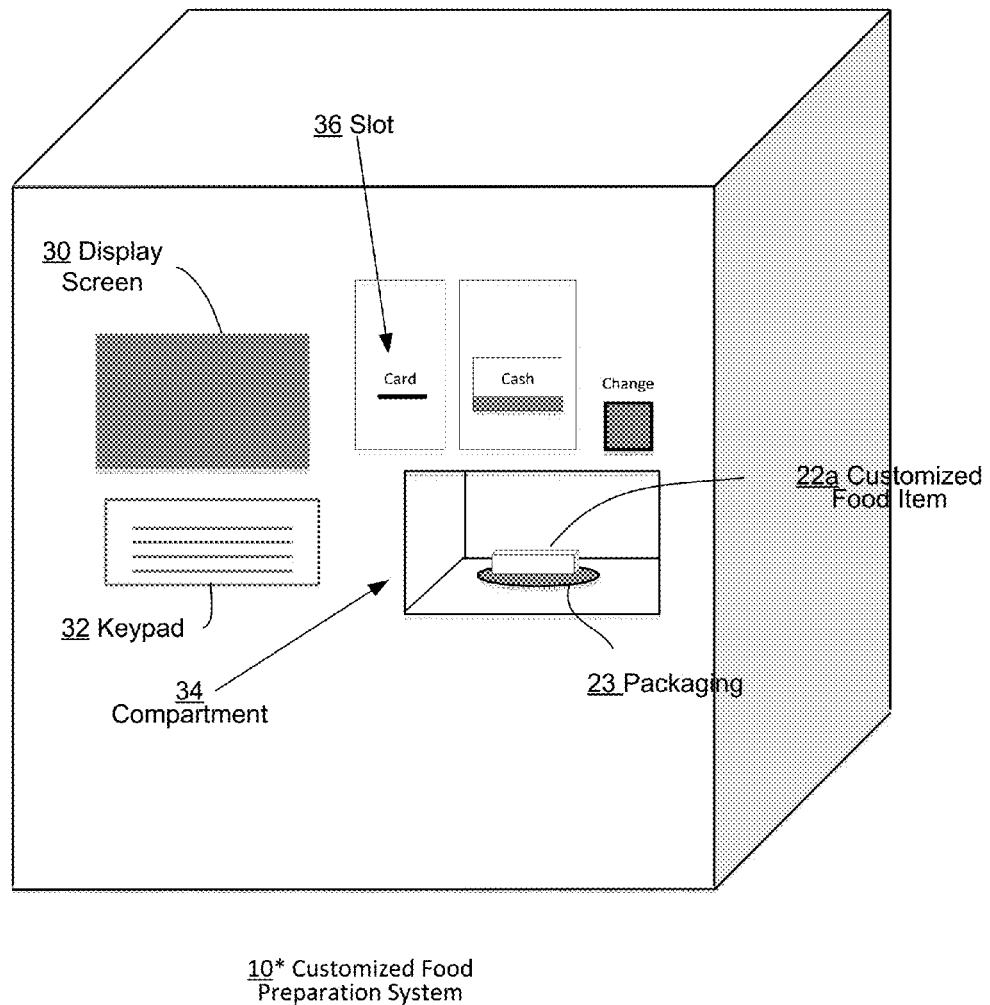
FIG. 1A illustrates an exemplary customized food preparation system 10* that is designed to prepare customized food items for users.

In the following detailed description, reference is made to the accompanying drawings, which form a part hereof. In the drawings, similar symbols typically identify similar or identical components or items, unless context dictates otherwise. The illustrative embodiments described in the detailed description, drawings, and claims are not meant to be limiting. Other embodiments may be utilized, and other changes may be made, without departing from the spirit or scope of the subject matter presented here.

The claims, description, and drawings of this application may describe one or more of the instant technologies in operational/functional language, for example as a set of operations to be performed by a computer. Such operational/functional description in most instances would be understood by one skilled the art as specifically-configured hardware (e.g., because a general purpose computer in effect becomes a special purpose computer once it is programmed to perform particular functions pursuant to instructions from program software).

Importantly, although the operational/functional descriptions described herein are understandable by the human mind, they are not abstract ideas of the operations/functions divorced from computational implementation of those operations/functions. Rather, the operations/functions represent a specification for the massively complex computational machines or other means. As discussed in detail below, the operational/functional language must be read in its proper technological context, i.e., as concrete specifications for physical implementations.

The logical operations/functions described herein are a distillation of machine specifications or other physical mechanisms specified by the operations/functions such that the otherwise inscrutable machine specifications may be comprehensible to the human mind. The distillation also allows one of skill in the art to adapt the operational/functional description of the technology across many different specific vendors' hardware configurations or platforms, without being limited to specific vendors' hardware configurations or platforms.

Some of the present technical description (e.g., detailed description, drawings, claims, etc.) may be set forth in terms of logical operations/functions. As described in more detail in the following paragraphs, these logical operations/functions are not representations of abstract ideas, but rather representative of static or sequenced specifications of various hardware elements. Differently stated, unless context dictates otherwise, the logical operations/functions will be understood by those of skill in the art to be representative of static or sequenced specifications of various hardware elements. This is true because tools available to one of skill in the art to implement technical disclosures set forth in operational/functional formats—tools in the form of a high-level programming language (e.g., C, java, visual basic, etc.), or tools in the form of Very high speed Hardware Description Language ("VHDL," which is a language that uses text to describe logic circuits)—are generators of static or sequenced specifications of various hardware configurations. This fact is sometimes obscured by the broad term "software," but, as shown by the following explanation, those skilled in the art understand that what is termed "software" is a shorthand for a massively complex interchaining/specification of ordered-matter elements. The term "ordered-matter elements" may refer to physical components of computation, such as assemblies of electronic logic gates, molecular computing logic constituents, quantum computing mechanisms, etc.

For example, a high-level programming language is a programming language with strong abstraction, e.g., multiple levels of abstraction, from the details of the sequential organizations, states, inputs, outputs, etc., of the machines that a high-level programming language actually specifies. See, e.g., Wikipedia, High-level programming language, http://en.wikipedia.org/wiki/High-level_programming_language (as of Jun. 5, 2012, 21:00 GMT). In order to facilitate human comprehension, in many instances, high-level programming languages resemble or even share symbols with natural languages. See, e.g., Wikipedia, Natural language, http://en.wikipedia.org/wiki/Natural_language (as of Jun. 5, 2012, 21:00 GMT).

It has been argued that because high-level programming languages use strong abstraction (e.g., that they may resemble or share symbols with natural languages), they are therefore a "purely mental construct" (e.g., that "software"—a computer program or computer programming—is somehow an ineffable mental construct, because at a high level of abstraction, it can be conceived and understood in the human mind). This argument has been used to characterize technical description in the form of functions/operations as somehow "abstract ideas." In fact, in technological arts (e.g., the information and communication technologies) this is not true.

The fact that high-level programming languages use strong abstraction to facilitate human understanding should not be taken as an indication that what is expressed is an abstract idea. In fact, those skilled in the art understand that just the opposite is true. If a high-level programming language is the tool used to implement a technical disclosure in the form of functions/operations, those skilled in the art will recognize that, far from being abstract, imprecise, "fuzzy," or "mental" in any significant semantic sense, such a tool is instead a near incomprehensibly precise sequential specification of specific computational machines—the parts of which are built up by activating/selecting such parts from typically more general computational machines over time (e.g., clocked time). This fact is sometimes obscured by the superficial similarities between high-level programming languages and natural languages. These superficial similarities also may cause a glossing over of the fact that high-level programming language implementations ultimately perform valuable work by creating/controlling many different computational machines.

The many different computational machines that a high-level programming language specifies are almost unimaginably complex. At base, the hardware used in the computational machines typically consists of some type of ordered matter (e.g., traditional external linking devices (e.g., transistors), deoxyribonucleic acid (DNA), quantum devices, mechanical switches, optics, fluidics, pneumatics, optical devices (e.g., optical interference devices), molecules, etc.) that are arranged to form logic gates. Logic gates are typically physical devices that may be electrically, mechanically, chemically, or otherwise driven to change physical state in order to create a physical reality of Boolean logic.

Logic gates may be arranged to form logic circuits, which are typically physical devices that may be electrically, mechanically, chemically, or otherwise driven to create a physical reality of certain logical functions. Types of logic circuits include such devices as multiplexers, registers, arithmetic logic units (ALUs), computer memory, etc., each type of which may be combined to form yet other types of physical devices, such as a central processing unit (CPU)—the best known of which is the microprocessor. A modern microprocessor will often contain more than one hundred million logic gates in its many logic circuits (and often more than a billion transistors). See, e.g., Wikipedia, Logic gates, http://en.wikipedia.org/wiki/Logic_gates (as of Jun. 5, 2012, 21:03 GMT).

The logic circuits forming the microprocessor are arranged to provide a microarchitecture that will carry out the instructions defined by that microprocessor's defined Instruction Set Architecture. The Instruction Set Architecture is the part of the microprocessor architecture related to programming, including the native data types, instructions, registers, addressing modes, memory architecture, interrupt and exception handling, and external Input/Output. See, e.g., Wikipedia, Computer architecture, http://en.wikipedia.org/wiki/Computer_architecture (as of Jun. 5, 2012, 21:03 GMT).

The Instruction Set Architecture includes a specification of the machine language that can be used by programmers to use/control the microprocessor. Since the machine language instructions are such that they may be executed directly by the microprocessor, typically they consist of strings of binary digits, or bits. For example, a typical machine language instruction might be many bits long (e.g., 32, 64, or 128 bit strings are currently common). A typical machine language instruction might take the form "111100001010111100001111111" (a 32 bit instruction).

It is significant here that, although the machine language instructions are written as sequences of binary digits, in actuality those binary digits specify physical reality. For example, if certain semiconductors are used to make the operations of Boolean logic a physical reality, the apparently mathematical bits "1" and "0" in a machine language instruction actually constitute shorthand that specifies the application of specific voltages to specific wires. For example, in some semiconductor technologies, the binary number "1" (e.g., logical "1") in a machine language instruction specifies around +5 volts applied to a specific "wire" (e.g., metallic traces on a printed circuit board) and the binary number "0" (e.g., logical "0") in a machine language instruction specifies around −5 volts applied to a specific "wire." In addition to specifying voltages of the machines' configuration, such machine language instructions also select out and activate specific groupings of logic gates from the millions of logic gates of the more general machine. Thus, far from abstract mathematical expressions, machine language instruction programs, even though written as a string of zeros and ones, specify many, many constructed physical machines or physical machine states.

Machine language is typically incomprehensible by most humans (e.g., the above example was just ONE instruction, and some personal computers execute more than two billion instructions every second). See, e.g., Wikipedia, Instructions per second, http://en.wikipedia.org/wiki/Instructions_per_second (as of Jun. 5, 2012, 21:04 GMT). Thus, programs written in machine language—which may be tens of millions of machine language instructions long—are incomprehensible. In view of this, early assembly languages were developed that used mnemonic codes to refer to machine language instructions, rather than using the machine language instructions' numeric values directly (e.g., for performing a multiplication operation, programmers coded the abbreviation "mult," which represents the binary number "011000" in MIPS machine code). While assembly languages were initially a great aid to humans controlling the microprocessors to perform work, in time the complexity of the work that needed to be done by the humans outstripped the ability of humans to control the microprocessors using merely assembly languages.

At this point, it was noted that the same tasks needed to be done over and over, and the machine language necessary to do those repetitive tasks was the same. In view of this, compilers were created. A compiler is a device that takes a statement that is more comprehensible to a human than either machine or assembly language, such as "add 2+2 and output the result," and translates that human understandable statement into a complicated, tedious, and immense machine language code (e.g., millions of 32, 64, or 128 bit length strings). Compilers thus translate high-level programming language into machine language.

This compiled machine language, as described above, is then used as the technical specification which sequentially constructs and causes the interoperation of many different computational machines such that humanly useful, tangible, and concrete work is done. For example, as indicated above, such machine language—the compiled version of the higher-level language—functions as a technical specification which selects out hardware logic gates, specifies voltage levels, voltage transition timings, etc., such that the humanly useful work is accomplished by the hardware.

Thus, a functional/operational technical description, when viewed by one of skill in the art, is far from an abstract idea. Rather, such a functional/operational technical description, when understood through the tools available in the art such as those just described, is instead understood to be a humanly understandable representation of a hardware specification, the complexity and specificity of which far exceeds the comprehension of most any one human. With this in mind, those skilled in the art will understand that any such operational/functional technical descriptions—in view of the disclosures herein and the knowledge of those skilled in the art—may be understood as operations made into physical reality by (a) one or more interchained physical machines, (b) interchained logic gates configured to create one or more physical machine(s) representative of sequential/combinatorial logic(s), (c) interchained ordered matter making up logic gates (e.g., interchained electronic devices (e.g., transistors), DNA, quantum devices, mechanical switches, optics, fluidics, pneumatics, molecules, etc.) that create physical reality representative of logic(s), or (d) virtually any combination of the foregoing. Indeed, any physical object which has a stable, measurable, and changeable state may be used to construct a machine based on the above technical description. Charles Babbage, for example, constructed the first computer out of wood and powered by cranking a handle.

Thus, far from being understood as an abstract idea, those skilled in the art will recognize a functional/operational technical description as a humanly-understandable representation of one or more almost unimaginably complex and time sequenced hardware instantiations. The fact that functional/operational technical descriptions might lend themselves readily to high-level computing languages (or high-level block diagrams for that matter) that share some words, structures, phrases, etc. with natural language simply cannot be taken as an indication that such functional/operational technical descriptions are abstract ideas, or mere expressions of abstract ideas. In fact, as outlined herein, in the technological arts this is simply not true. When viewed through the tools available to those of skill in the art, such functional/operational technical descriptions are seen as specifying hardware configurations of almost unimaginable complexity.

As outlined above, the reason for the use of functional/operational technical descriptions is at least twofold. First, the use of functional/operational technical descriptions allows near-infinitely complex machines and machine operations arising from interchained hardware elements to be described in a manner that the human mind can process (e.g., by mimicking natural language and logical narrative flow). Second, the use of functional/operational technical descriptions assists the person of skill in the art in understanding the described subject matter by providing a description that is more or less independent of any specific vendor's piece(s) of hardware.

The use of functional/operational technical descriptions assists the person of skill in the art in understanding the described subject matter since, as is evident from the above discussion, one could easily, although not quickly, transcribe the technical descriptions set forth in this document as trillions of ones and zeros, billions of single lines of assembly-level machine code, millions of logic gates, thousands of gate arrays, or any number of intermediate levels of abstractions. However, if any such low-level technical descriptions were to replace the present technical description, a person of skill in the art could encounter undue difficulty in implementing the disclosure, because such a low-level technical description would likely add complexity without a corresponding benefit (e.g., by describing the subject matter utilizing the conventions of one or more vendor-specific pieces of hardware). Thus, the use of functional/operational technical descriptions assists those of skill in the art by separating the technical descriptions from the conventions of any vendor-specific piece of hardware.

In view of the foregoing, the logical operations/functions set forth in the present technical description are representative of static or sequenced specifications of various ordered-matter elements, in order that such specifications may be comprehensible to the human mind and adaptable to create many various hardware configurations. The logical operations/functions disclosed herein should be treated as such, and should not be disparagingly characterized as abstract ideas merely because the specifications they represent are presented in a manner that one of skill in the art can readily understand and apply in a manner independent of a specific vendor's hardware implementation.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware in one or more machines, compositions of matter, and articles of manufacture, limited to patentable subject matter under 35 USC 101. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media holds or transmits device detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled//implemented/translated/converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

Those skilled in the art will recognize that it is common within the art to implement devices and/or processes and/or systems, and thereafter use engineering and/or other practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems of (a) an air conveyance (e.g., an airplane, rocket, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Qwest, Southwestern Bell, etc.), or (g) a wired/wireless services entity (e.g., Sprint, Cingular, Nextel, etc.), etc.

In certain cases, use of a system or method may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory).

A sale of a system or method may likewise occur in a territory even if components of the system or method are located and/or used outside the territory. Further, implementation of at least part of a system for performing a method in one territory does not preclude use of the system in another territory In a general sense, those skilled in the art will recognize that the various embodiments described herein can be implemented, individually and/or collectively, by various types of electro-mechanical systems having a wide range of electrical components such as hardware, software, firmware, and/or virtually any combination thereof, limited to patentable subject matter under 35 U.S.C. 101; and a wide range of components that may impart mechanical force or motion such as rigid bodies, spring or torsional bodies, hydraulics, electro-magnetically actuated devices, and/or virtually any combination thereof. Consequently, as used herein, "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs (e.g., graphene based circuitry). Those skilled in the art will also appreciate that examples of electro-mechanical systems include, but are not limited to, a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will recognize that at least a portion of the devices and/or processes described herein can be integrated into an image processing system. Those having skill in the art will recognize that a typical image processing system generally includes one or more of a system unit housing, a video display device, memory such as volatile or non-volatile memory, processors such as microprocessors or digital signal processors, computational entities such as operating systems, drivers, application programs, one or more interaction devices (e.g., a touch pad, a touch screen, an antenna, etc.), and/or control systems including feedback loops and control motors (e.g., feedback for sensing lens position and/or velocity; control motors for moving/distorting lenses to give desired focuses). An image processing system may be implemented utilizing suitable commercially available components, such as those typically found in digital still systems and/or digital motion systems.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and application programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

Those skilled in the art will recognize that at least a portion of the devices and/or processes described herein can be integrated into a mote system. Those having skill in the art will recognize that a typical mote system generally includes one or more memories such as volatile or non-volatile memories, processors such as microprocessors or digital signal processors, computational entities such as operating systems, user interfaces, drivers, sensors, actuators, application programs, one or more interaction devices (e.g., an antenna USB ports, acoustic ports, etc.), control systems including feedback loops and control motors (e.g., feedback for sensing or estimating position and/or velocity; control motors for moving and/or adjusting components and/or quantities). A mote system may be implemented utilizing suitable components, such as those found in mote computing/communication systems. Specific examples of such components entail such as Intel Corporation's and/or Crossbow Corporation's mote components and supporting hardware, software, and/or firmware.

For the purposes of this application, "cloud" computing may be understood as described in the cloud computing literature. For example, cloud computing may be methods and/or systems for the delivery of computational capacity and/or storage capacity as a service. The "cloud" may refer to one or more hardware and/or software components that deliver or assist in the delivery of computational and/or storage capacity, including, but not limited to, one or more of a client, an application, a platform, an infrastructure, and/or a server. The cloud may refer to any of the hardware and/or software associated with a client, an application, a platform, an infrastructure, and/or a server. For example, cloud and cloud computing may refer to one or more of a computer, a processor, a storage medium, a router, a switch, a modem, a virtual machine (e.g., a virtual server), a data center, an operating system, a middleware, a firmware, a hardware back-end, a software back-end, and/or a software application. A cloud may refer to a private cloud, a public cloud, a hybrid cloud, and/or a community cloud. A cloud may be a shared pool of configurable computing resources, which may be public, private, semi-private, distributable, scaleable, flexible, temporary, virtual, and/or physical. A cloud or cloud service may be delivered over one or more types of network, e.g., a mobile communication network, and the Internet.

As used in this application, a cloud or a cloud service may include one or more of infrastructure-as-a-service ("IaaS"), platform-as-a-service ("PaaS"), software-as-a-service ("SaaS"), and/or desktop-as-a-service ("DaaS"). As a non-exclusive example, IaaS may include, e.g., one or more virtual server instantiations that may start, stop, access, and/or configure virtual servers and/or storage centers (e.g., providing one or more processors, storage space, and/or network resources on-demand, e.g., EMC and Rackspace). PaaS may include, e.g., one or more software and/or development tools hosted on an infrastructure (e.g., a computing platform and/or a solution stack from which the client can create software interfaces and applications, e.g., Microsoft Azure). SaaS may include, e.g., software hosted by a service provider and accessible over a network (e.g., the software for the application and/or the data associated with that software application may be kept on the network, e.g., Google Apps, SalesForce). DaaS may include, e.g., providing desktop, applications, data, and/or services for the user over a network (e.g., providing a multi-application framework, the applications in the framework, the data associated with the applications, and/or services related to the applications and/or the data over the network, e.g., Citrix). The foregoing is intended to be exemplary of the types of systems and/or methods referred to in this application as "cloud" or "cloud computing" and should not be considered complete or exhaustive.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Specific examples of operably couplable include, but are not limited, to physically mateable and/or physically interacting components, and/or wirelessly interactable, and/or wirelessly interacting components, and/or logically interacting, and/or logically interactable components.

To the extent that formal outline headings are present in this application, it is to be understood that the outline headings are for presentation purposes, and that different types of subject matter may be discussed throughout the application (e.g., device(s)/structure(s) may be described under process(es)/operations heading(s) and/or process(es)/operations may be discussed under structure(s)/process(es) headings and/or descriptions of single topics may span two or more topic headings). Hence, any use of formal outline headings in this application is for presentation purposes, and is not intended to be in any way limiting.

Throughout this application, examples and lists are given, with parentheses, the abbreviation "e.g.," or both. Unless explicitly otherwise stated, these examples and lists are merely exemplary and are non-exhaustive. In most cases, it would be prohibitive to list every example and every combination. Thus, smaller, illustrative lists and examples are used, with focus on imparting understanding of the claim terms rather than limiting the scope of such terms.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

Although one or more users may be shown and/or described herein as a single illustrated figure, those skilled in the art will appreciate that one or more users may be representative of one or more human users, robotic users (e.g., computational entity), and/or substantially any combination thereof (e.g., a user may be assisted by one or more robotic agents) unless context dictates otherwise. Those skilled in the art will appreciate that, in general, the same may be said of "sender" and/or other entity-oriented terms as such terms are used herein unless context dictates otherwise.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") generally encompass active-state components and/or inactive-state components and/or standby-state components, unless context requires otherwise.

In the following detailed description, reference is made to the accompanying drawings, which form a part hereof. In the drawings, similar symbols typically identify similar or identical components or items, unless context dictates otherwise. The illustrative embodiments described in the detailed description, drawings, and claims are not meant to be limiting. Other embodiments may be utilized, and other changes may be made, without departing from the spirit or scope of the subject matter presented here.

The development and evolution of food vending machine technology has remained relatively stagnant over the last few decades even though there have been substantial technological advancements in the fields of microelectronics, automated manufacturing, and robotics. That is, today's food vending machines are not that different from vending machines of thirty or even forty years ago. With the exception of a very limited number vending machines (such as coffee machines that allow users to make certain limited customizations of their order such as making their coffee sweeter or adding cream), the vast majority of today's food vending machines do not allow any customization of customer purchases. That is, the vast majority of today's food vending machines only allow a user/customer to select and purchase a food item (e.g., candy bars, chips, sandwiches, drinks, and so forth) from a plurality of ready-to-eat or substantially ready-to-eat food items (note that some current food vending machines do offer food items that will need to be heated using a microwave oven) and that do not allow the user to customize their purchased food item.

With the advancement of microelectronics, robotics, and automated manufacturing technologies such as 3-D (three-dimensional) printing, it is envisioned that future food vending machines will not only be able to manufacture food items "on the spot" but will also be able to customize food items to the specific needs/preferences of users. For example, with the development of 3-D (three-dimensional) printing technology, it is envisioned that customized food bars (e.g., customized energy bars) may be printed for users based on their needs or preferences (e.g., if a user is allergic to peanuts, no peanut ingredients are used in forming an energy bar for the user). It is also envisioned that with the use of robotics, fully customized meals (e.g., customized sandwiches, breads, and so forth) may be manufactured using automated vending machines that employ robotics or other forms of automation.

It is also envisioned that the simple manufacture of customized food items through automated systems (e.g., automated food vending machines) will not be satisfactory in many cases. That is, it is envisioned that at least some users may also want be provided with certain information related to the customized food items that they order through automated systems including, for example, information related to listing of customized ingredients, user dietary information such as total salt consumption for the week, warnings related to presence of specific ingredients, and so forth.

It is also noted that many of today's sophisticated consumers are very concerned about the integrity (e.g., purity, cleanliness, and so forth) of our food supply. It seems as though in recent years, food supply contamination (e.g., *salmonella*, mad-cow disease, *E-coli*, and so forth) stories are reported on a regular basis. That is, there are many sources for today's food supply from a vast number of food vendors located across the globe from countries in the southern hemisphere that supply meats, fruits, and vegetables, to the countless domestic farms and ranches that supply chickens, pork, and beef, to the vegetable and fruit farms of California and Florida. It is often very difficult for end consumers to ensure that the ingredients used to make, for example, ready-to-eat foods are of high purity and free of any disease or pesticides.

Accordingly, methods, systems, and articles of manufactures are presented herein that are designed to, among other things, acquire or obtain user information (e.g., user preference regarding food item integrity, user identification, user food selection, user customization selections, ingredient preferences, and so forth) associated with one or more users as a basis, at least in part, for generating one or more customized food items (e.g., customized energy bars, customized sandwiches, customized meals, and so forth) for the one or more users; and directing generation of the one or more customized food items that are customized to show one or more visual indicators that provide customized information that has been customized in accordance, at least in part, with the acquired user information. In various embodiments, the one or more customized food items may be generated through one or more automated customized food preparation systems that are designed to prepare/manufacture customized food items.

Figure 1B:
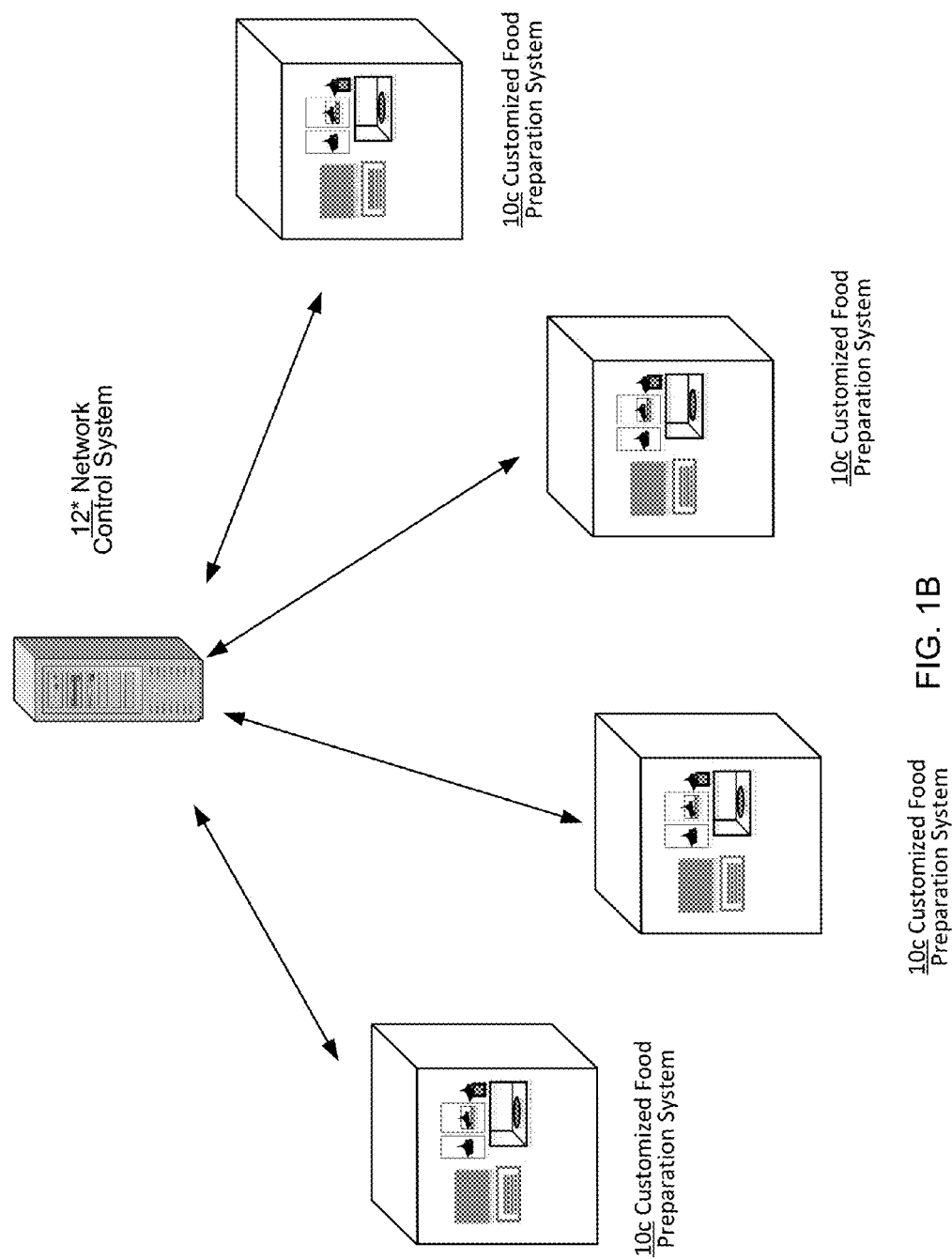
FIG. 1B shows a network control system 12* in communication with a plurality of customized food preparation systems 10c.

Referring now to FIG. 1A, which illustrates an exemplary customized food preparation system 10* that is designed to generate customized food items 22a that is desposed onto a packaging 23 (e.g., illustrated in this case as being a plate). In some embodiments, the exemplary customized food preparation system 10* may be a standalone system that is self-contained with all of the logic needed to execute its various operations, or in alternative embodiments and as illustrated in FIG. 1B, the exemplary customized food preparation system 10* may be one of one or more network devices (e.g., illustrated as exemplary customized food preparation systems 10c) that are controlled by a network control system 12* (e.g., a server, a workstation, a laptop, and so forth).

Figure 3A:
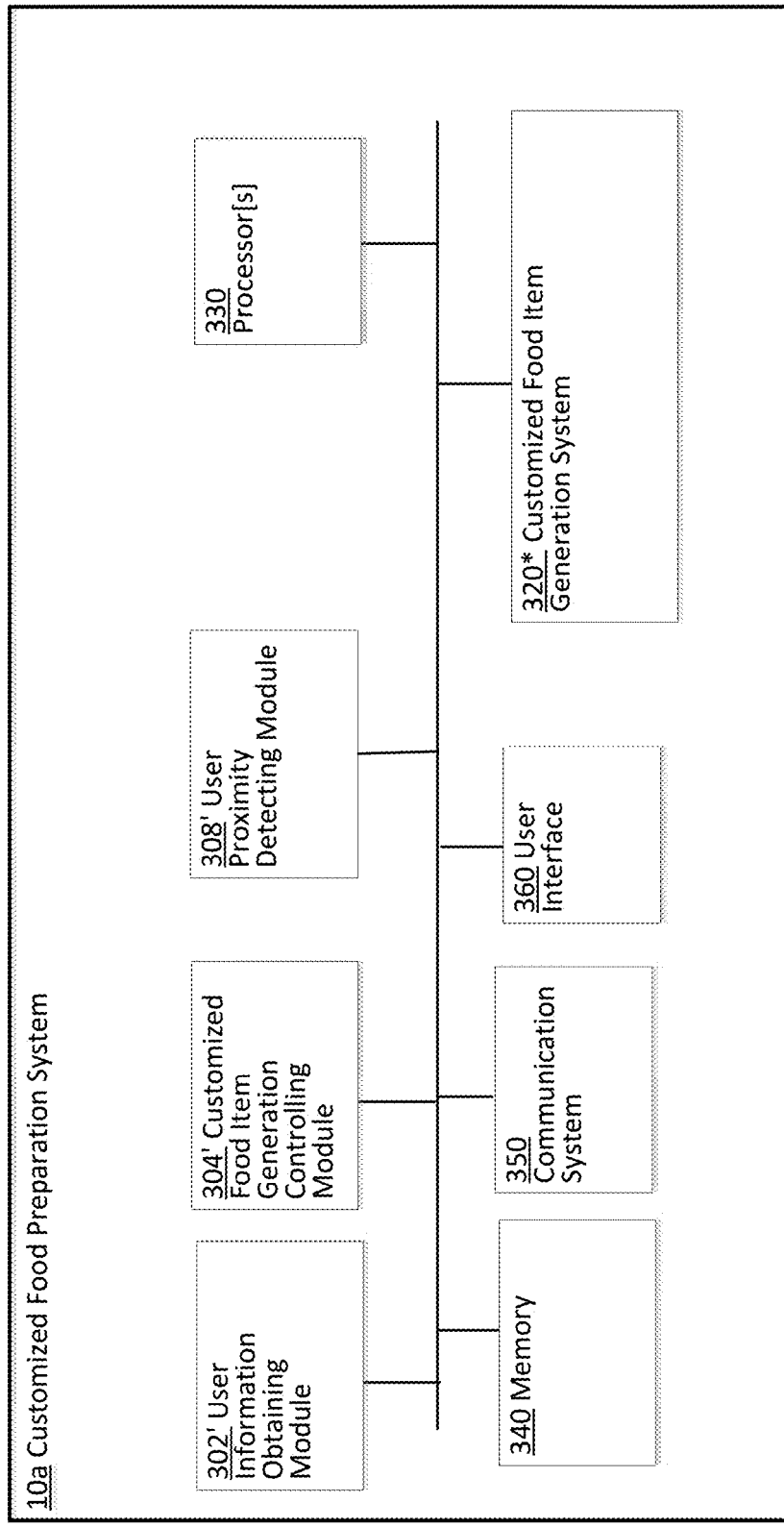
Figure 3B:
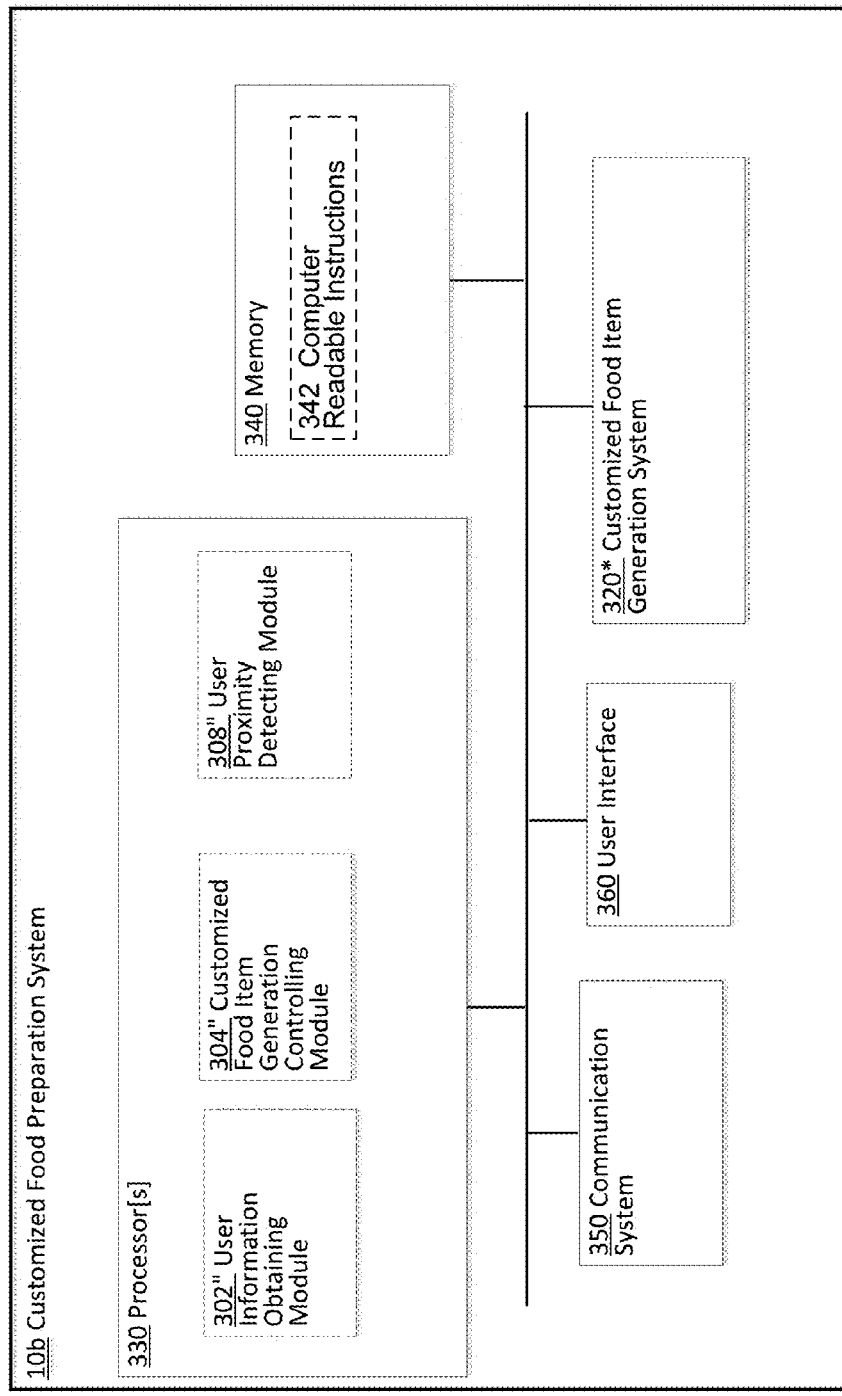
FIG. 3B shows a block diagram of another implementation of the customized food preparation system 10* of FIG. 1A illustrated as customized food preparation system 10b.
Figure 3C:
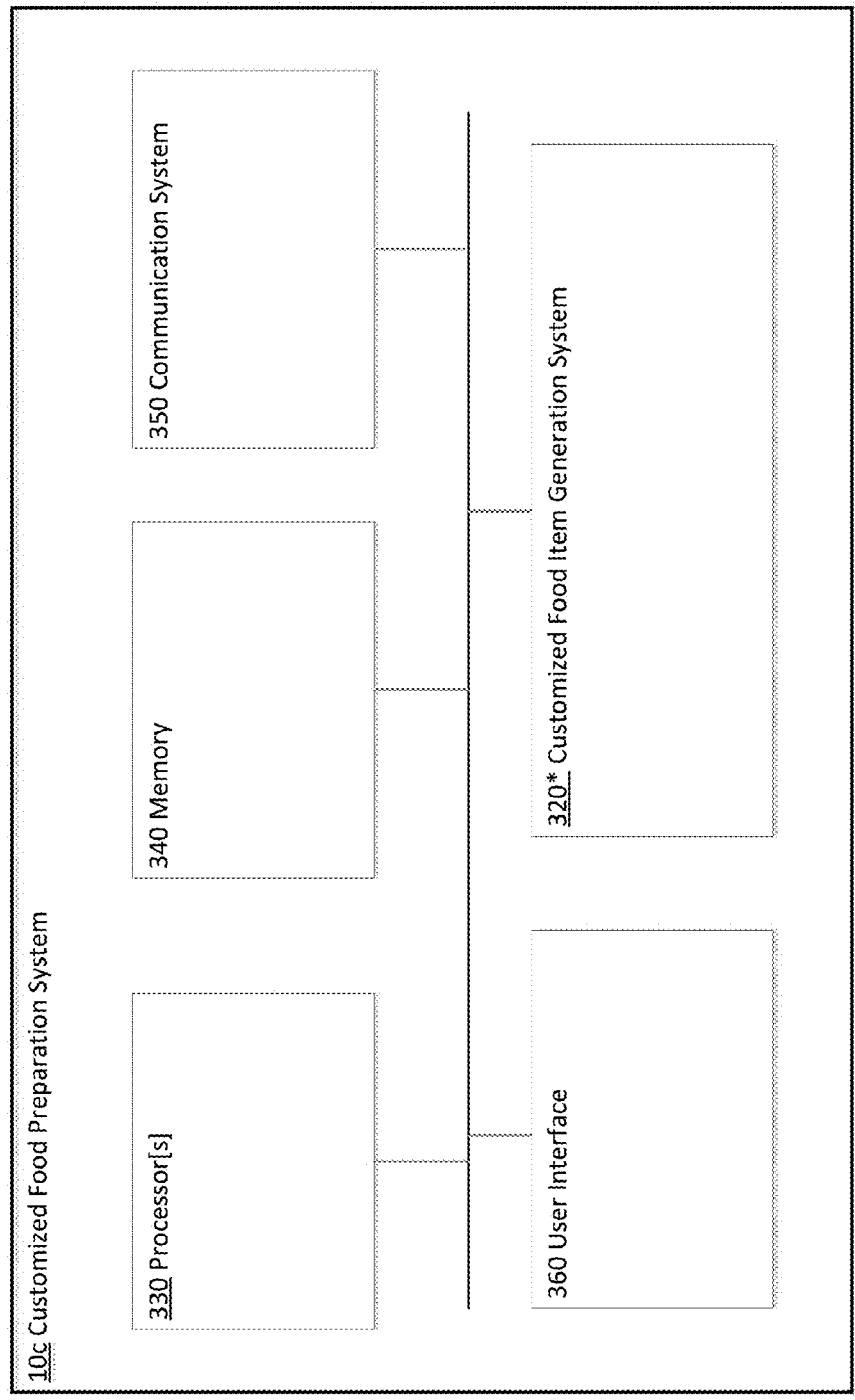
FIG. 3C shows a block diagram of another implementation of the customized food preparation system 10* of FIG. 1A illustrated as customized food preparation system 10c.

Note that FIGS. 3A, 3B, and 3C are three block diagrams of three different implementations of the exemplary customized food preparation system 10* of FIG. 1 illustrated in FIG. 3A as exemplary customized food preparation system 10a, illustrated in FIG. 3B as exemplary customized food preparation system 10b, and illustrated in FIG. 3C as exemplary customized food preparation system 10c. Further note that for purposes of the following description, "*" represents a wildcard. Thus, references in the following description to, for example, "exemplary customized food preparation system 10*" may be in reference to the exemplary customized food preparation system 10a of FIG. 3A, the exemplary customized food preparation system 10b of FIG. 3B, or the exemplary customized food preparation system 10c of FIG. 3C, which again are three different implementations of the exemplary customized food preparation system 10* of FIG. 1A.

Referring back to the exemplary customized food preparation system 10* of FIG. 1A, the exemplary customized food preparation system 10*, as illustrated, includes a display screen 30 (which may be a touchscreen), a keypad 32, and a compartment 34 for providing a customized food item 22a deposited on packaging 23 in the form of a disposable plate. In the example customized food preparation system 10* illustrated in FIG. 1A, the customized food item 22a that is generated is illustrated as being in the form of a food bar such as an energy bar. As will be further described, the customized food item 22a that may be generated by the customized food item preparation system 10* may be generated with visual indicators (e.g., printed text or images) directly placed onto the customized food item 22a that indicate customized information related to, for example, ingredients of the customized food item 22a, dietary information related to the user that the customized food item 22a is generated for, purity information related to the ingredients, and so forth.

The display screen 30 may be employed to display (as well as to enter user input if it is a touchscreen) food menus, customization options, ingredient options, food item integrity preferences (e.g., preference that ingredients of a customized food item being tested to be free of antibiotics, preference that ingredients be obtained from a particular source or location), and so forth. The display screen 30 may also be used to provide to a user an option to customize visual indicators (e.g., text or image) that may be placed (e.g., printed) onto customized food items 22a. In various embodiments, keypad 32 may be used by a user to make selections (e.g., selection of user preferences), as well as to provide input for other types of information (e.g., user identification, credit card information, dietary information, and so forth).

The customized food preparation system 10* may further include a slot 36 for reading a credit card or a Smartcard. Such cards may be a source for providing certain user information including user identification information. Such cards, particularly Smartcards, which may have connectivity to mobile devices such as Smartphones, may be used in order to obtain other types of user data including social data through their connectivity to the mobile devices or directly from such cards.

Referring briefly now to FIGS. 3A and 3B, which illustrate two block diagrams of two different implementations of the exemplary customized food preparation system 10* of FIG. 1A when the exemplary customized food preparation system 10* is a "standalone" device that has, for example, most or all of the various logic needed in order to execute its various functionalities. In particular, FIGS. 3A and 3B illustrates two extreme implementations of the standalone implementation of the customized food preparation system 10* of FIG. 1A in which all of the logic modules are implemented using purely hardware solutions (e.g., employing dedicated circuitry such as application specific integrated circuitry or ASIC) as illustrated in FIG. 3A (e.g., illustrated in FIG. 3A as customized food preparation system 10a) or in which all of the logic modules are implemented using software solutions (e.g., software executed by one or more processors or controllers) as illustrated in FIG. 3B (e.g., illustrated in FIG. 3B as customized food preparation system 10b).

Note that for purposes of simplicity and for ease of illustration, only the two extreme implementations (e.g., the "hardware" implementation as illustrated by the customized food preparation system 10a of FIG. 3A and the "software" implementation as illustrated by the customized food preparation system 10b of FIG. 3B) of the standalone customized food preparation system 10* are presented here. However, it is recognized that any combination of software and hardware solutions are possible and may be employed in various alternative embodiments. In any event, the "standalone" customized food preparation system 10a depicted in FIG. 3A is the "hard" implementation of the standalone implementation of the customized food preparation system 10* of FIG. 1A where all of the logic modules (e.g., the user information obtaining module 302', the customized food item generation controlling module 304', and the user proximity detecting module 308') are implemented using purely hardware solutions (e.g., circuitry such as application specific integrated circuit or ASIC). In contrast, the customized food preparation system 10b of FIG. 3B is the soft implementation of the standalone implementation of the customized food preparation system 10* of FIG. 1A where all of the logic modules (e.g., the user information obtaining module 302", the customized food item generation controlling module 304", and the user proximity detecting module 308") are implemented using software solutions (e.g., programmable instructions in the form of computer readable instructions 342 being executed by hardware such as one or more processors 330) as illustrated in, for example, FIG. 3B. Note that FIG. 3C illustrates a block diagram (illustrated in FIG. 3C as customized food preparation system 10c) of a particular implementation of the customized food preparation system 10* of FIG. 1 when the customized food preparation system 10* is not a standalone device (e.g., when one or more logic modules may be remotely located, such as at a network control system 12*, as illustrated in FIG. 1B)

Turning now to FIG. 1B, which illustrates a network of customized food preparation systems 10c in communication with a network control system 12*. The various customized food preparation systems 10c may be designed to generate the same or different types of customized food items 22* such as energy bars, full meals, sandwiches, burgers, hotdogs, and so forth. Each of the customized food preparation systems 10c may rely on the network control system 12* to provide at least some of the logic needed for executing various operations including, for example, operation for generating customized food items 22*. In various embodiments, the network control system 12* may be a server, a plurality of servers (e.g., the cloud), a workstation (or a plurality of workstations) a laptop, and so forth.

FIG. 3C illustrates a block diagram of one of the customized food preparation systems 10c of FIG. 1B (e.g., the customized food preparation system 10* of FIG. 1A when the customized food preparation system 10* is not a standalone device but instead relies on another device, such as a network control system 12* of FIG. 1B, to supply the logic needed to perform its various functionalities) in accordance with some embodiments.

Figure 3D:
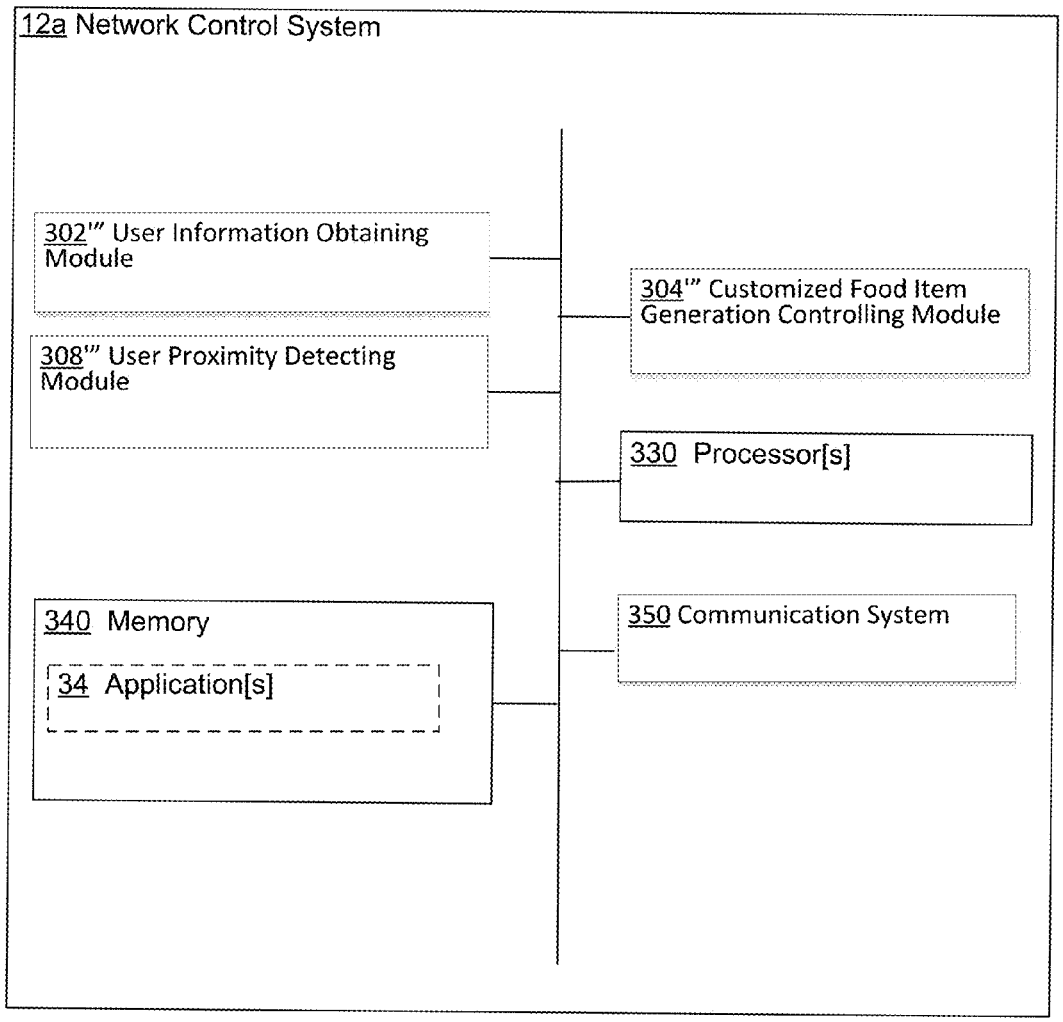
Figure 3E:
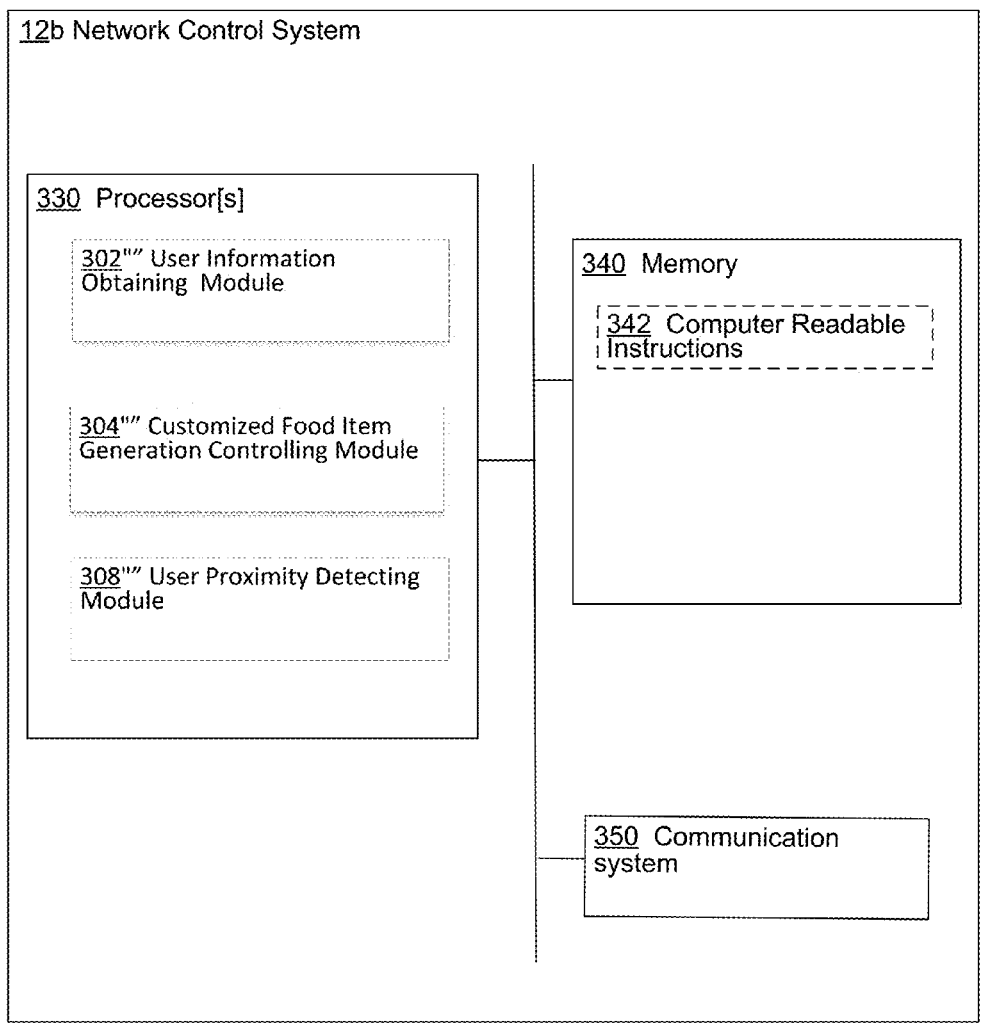
FIG. 3E shows a block diagram of a particular implementation of the network control system 12* of FIG. 1B illustrated as network control system 12b.

In contrast to FIG. 3C, FIGS. 3D and 3E illustrate two block diagrams of two extreme implementations of the network control system 12* of FIG. 1B in which all of the logic modules are implemented using purely hardware solutions (e.g., employing dedicated circuitry such as application specific integrated circuitry or ASIC) as illustrated in FIG. 3D or all of the logic modules are implemented using software solutions (e.g., software executed by one or more processors or controllers) as illustrated in FIG. 3E. Note that for purposes of simplicity and for ease of illustration only, only the two extreme implementations are presented herein. However, it is recognized that any combination of software and hardware solutions are possible and may be employed in various alternative embodiments.

In any event, the network control system 12a depicted in FIG. 3D is the "hard" implementation of the network control system 12* of FIG. 1B where all of the logic modules (e.g., the user information obtaining module 302', the customized food item generation controlling module 304', and the user proximity detecting module 308') are implemented using purely hardware solutions (e.g., circuitry such as application specific integrated circuit or ASIC). In contrast, the network control system 12b of FIG. 3E is the soft implementation of the network control system 12* of FIG. 1B where all of the logic modules (e.g., the user information obtaining module 302"", the customized food item generation controlling module 304"", and the user proximity detecting module 308"") are implemented using software solutions (e.g., programmable instructions in the form of computer readable instructions 342 being executed by hardware such as one or more processors 330) as illustrated in, for example, FIG. 3E.

Referring now to FIGS. 2A, 2B, 2C, 2D, 2E, 2F, and 2G, which illustrate some example customized food items 22* that may be generated by, for example, the customized food item preparation system 10*. In particular, the example customized food items 22* illustrated in FIGS. 2A, 2B, 2C, 2D, 2E, 2F, and 2G are shown to have been customized to provide one or more visual indicators 204* that provide customized information related to, for example, the customized food items 22* or related to the one or more users that the customized food items 22* are generated for. FIGS. 2A, 2B, 2C, 2D, 2E, 2F, and 2G also show some examples of the various types of customized information that may be indicated by the one or more visual indicators (e.g., identifying ingredients included in the one or more customized food items 22*, indicating integrity or purity of the one or more customized food items 22*, indicating dietary information related to the one or more users that the one or more customized food items 22* are generated for, and so forth).

Figure 2A:
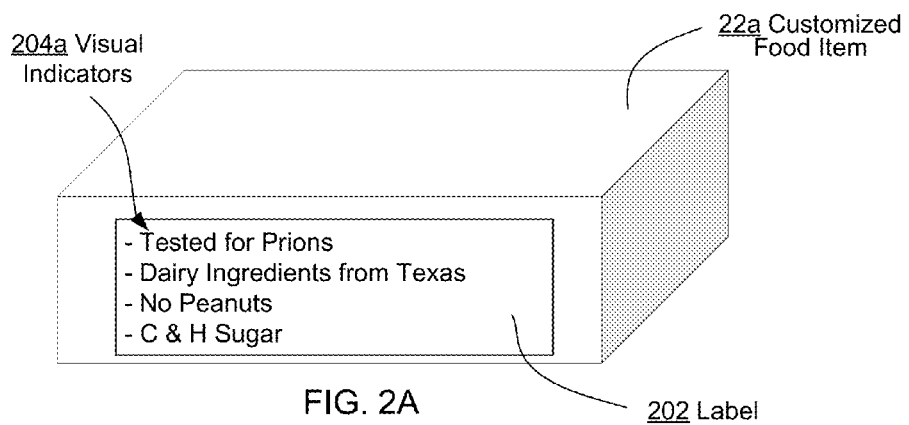

Referring particularly now to FIG. 2A, which shows an example customized food item 22a that may be generated by, for example, the customized food preparation system 10* of FIG. 1A in accordance with various embodiments. As illustrated in FIG. 2A, the customized food item 22a being in the form of a food bar (e.g., an energy bar) that may be generated using, for example, three-dimensional (3-D) printing technology or using robotic technology. As further illustrated in FIG. 2A, affixed on the side of the customized food item 22a is a label 202 (which may be an edible label such as rice paper) with visual indicators 204a (e.g., printed text) that provides customized information related to the customized food item 22a. In this case, the customized information provided through the visual indicators 204a indicates that the ingredients of the customized food item 22a have been tested for prions (e.g., infectious agent related to mad cow disease), that the customized food item 22a includes dairy ingredients from Texas, that no peanuts are included, and that the customized food item 22a includes C & H sugar. In some cases, edible ink may be used to print the visual indicators 204a onto the label 202. In some cases, the label 202 may be affixed to the customized food item 22a before the visual indicators 204a are printed onto the label 202. In other cases, however, the visual indicators 204a may be printed onto the label 202 before the label 202 is affixed onto the customized food item 22a.

Figure 2B:
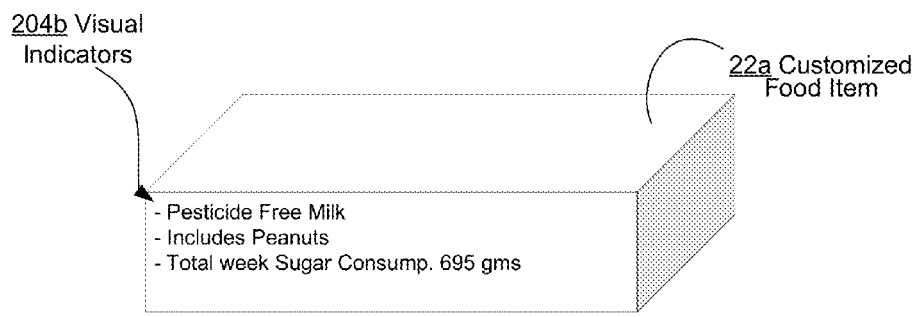
FIG. 2B illustrates an exemplary customized food item 22a with exemplary visual indicators 204b.

Turning to FIG. 2B illustrating another way in which visual indicators 204b may be placed onto a customized food item 22a. In this example, the visual indicators 204b being in the form of printed text that is directly printed onto the customized food item 22a. Note that in alternative embodiments, images or icons may additionally or alternatively be printed directly onto the customized food item 22a. Note also that in various alternative embodiments, the customized food item 22a may be in a different form other than in the form of a food bar. As illustrated, the customized information provided through the visual indicators 204b indicating that the customized food item 22a included "pesticide free milk," that the customized food item 22a included peanuts, and the "Total week Sugar Consumption [of] 695 gms" of the user that the customized food item 22a is generated for. In various embodiments, edible ink may be used to print the visual indicators 204b.

Figure 2C:
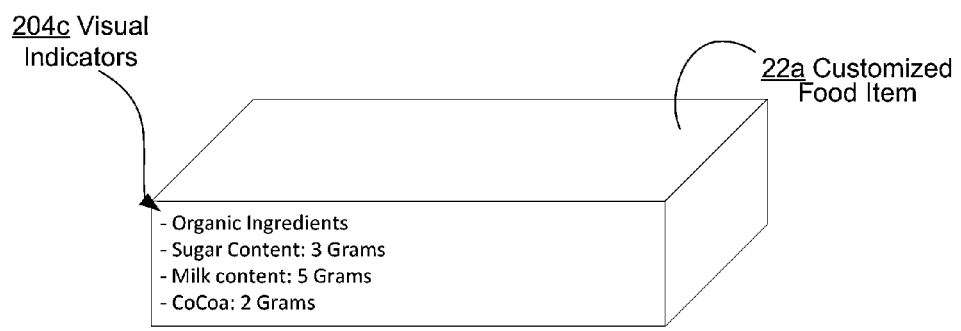
FIG. 2C illustrates an exemplary customized food item 22a with exemplary visual indicators 204c.

Referring now to FIG. 2C, which illustrates another way in which visual indicators 204c may be placed onto a customized food item 22a. In this case, the visual indicators 204c are printed onto the customized food item 22a using a press or stamp printing technique. The customized information provided through the visual indicators 204c indicating that "Organic ingredients" were used, that the sugar content of the customized food item 22a is 3 grams, that the milk content of the customized food item 22a is 5 grams, and that the Cocoa content of the customized food item 22a is 2 grams.

Figure 2D:
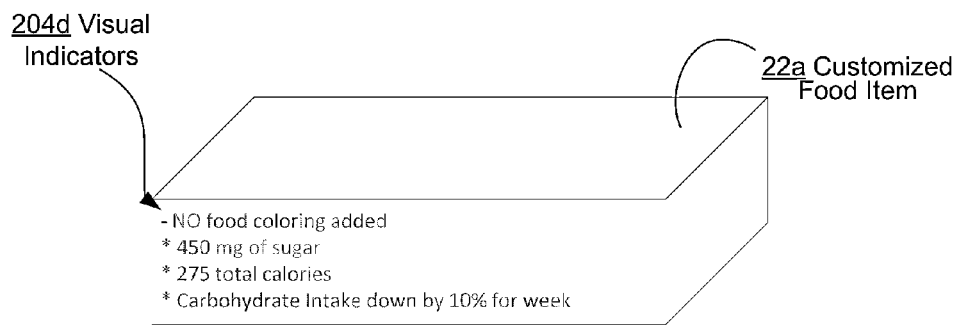
FIG. 2D illustrates an exemplary customized food item 22a with exemplary visual indicators 204d.

Referring now to FIG. 2D, which illustrates another way in which visual indicators 204d may be placed onto a customized food item 22a. In this case, the visual indicators 204d are formed onto the customized food item 22a as part of the process, such as 3-D printing, used to generate the customized food item 22a. The customized information provided through the visual indicators 204d indicating that no food coloring was added to the customized food item 22a, that "450 mg of sugar" was used, that the customized food item 22a includes "275 total calories," and that the "carbohydrate intake" of the user is "down by 10% for [the] week."

Figure 2E:
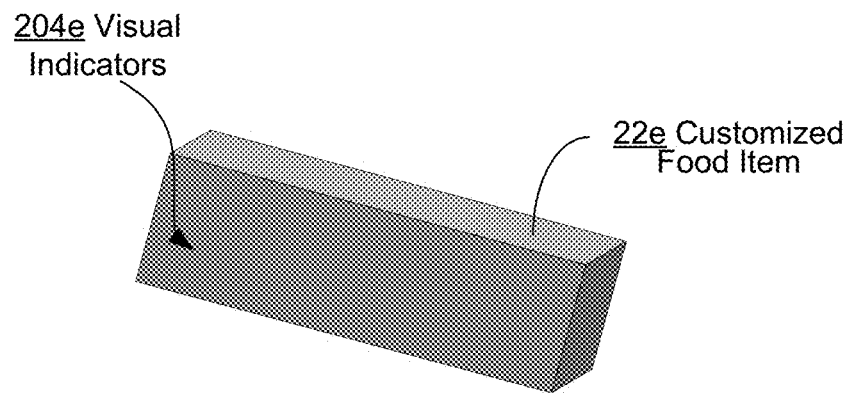
FIG. 2E illustrates an exemplary customized food item 22e with exemplary visual indicators 204e in the form of a particular color.

Turning to FIG. 2E, which illustrates another way in which a customized food item 22e may provide customized information. In particular, FIG. 2E shows a customized food item 22e that has been generated having visual indicators 204e in the form of a particular color (e.g., such coloring may be easily accomplished by adding, for example, into the customized food item 22e any one or more of a variety of food colorings). For example, if the customized food item 22e has a green color, then that may indicate to a user that only organic ingredients were used in generating the customized food item 22e, while a brown color may indicate to a user that the customized food item 22e includes meat products.

Figure 2F:
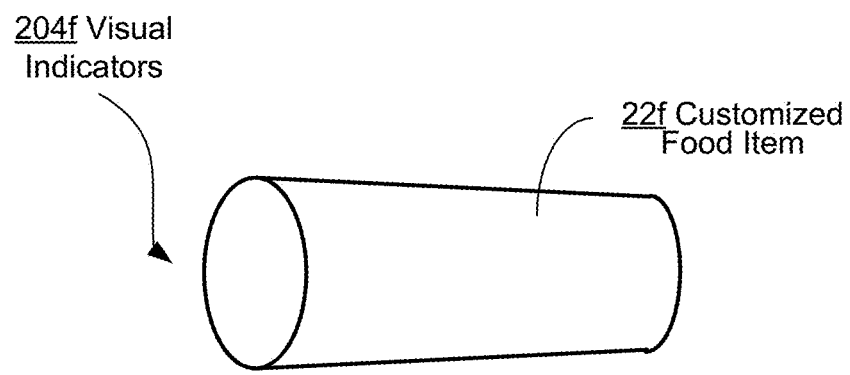
FIG. 2F illustrates an exemplary customized food item 22f with exemplary visual indicators 204f in the form of a cylindrical shape of the customized food item 22f.

Referring to FIG. 2F, which illustrates yet another way in which a customized food item 22f may provide customized information. In particular, FIG. 2F shows a customized food item 22f that has been generated having visual indicators 204f in the form of the shape of the customized food item 22f (e.g., cylindrical shape). The specific shape (e.g., rectangular, cylindrical, round wafer shape, square block, and so forth) of the customized food item 22f may have a particular meaning (e.g., only organic ingredients used, dairy products present in the customized food item 22f, ingredient source tested to be free of prions, and so forth) to a user. Of course, the meaning of the various shapes may be arbitrarily preset by the user or by a third party (e.g., operators of the automated customized food item preparation system 10*).

Figure 2G:
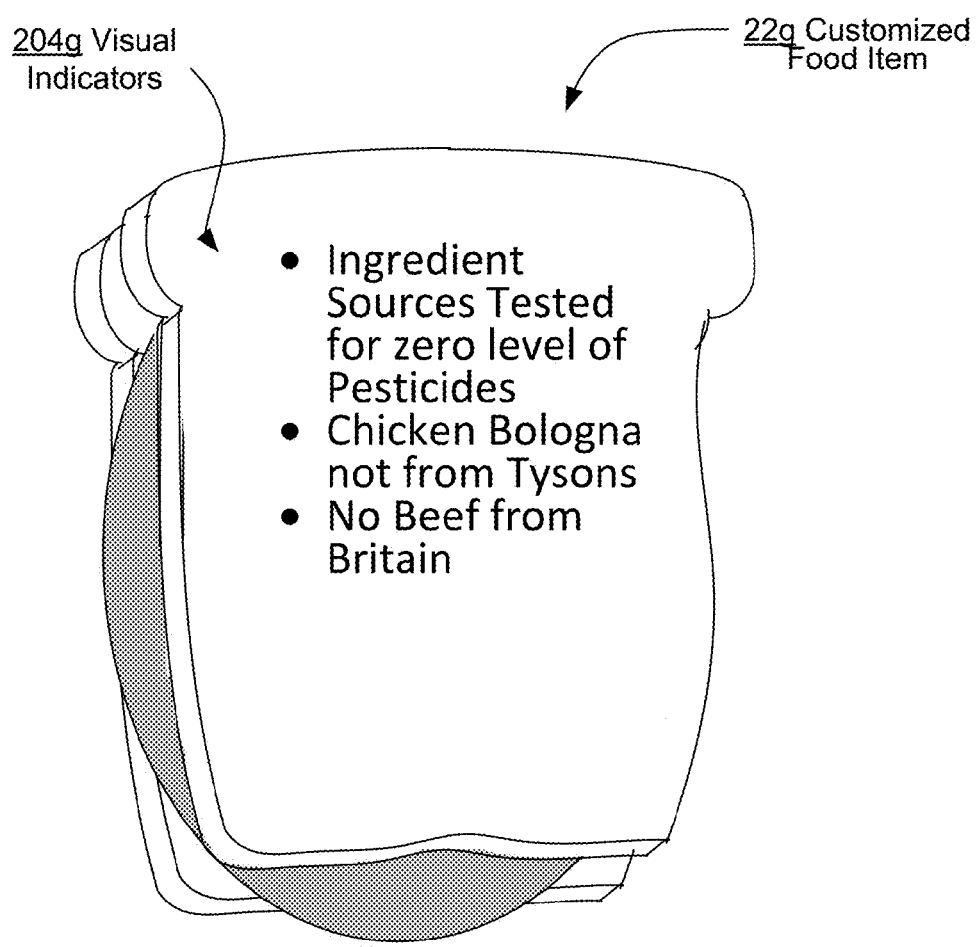
FIG. 2G illustrates an exemplary customized food item 22g in the form of a sandwich with exemplary visual indicators 204g.

Turning now to FIG. 2G, which illustrates a customized food item 22g being in the form of a sandwich. Such a customized food item 22g may be generated using a variety of manufacturing processes including, for example, employment of robotic systems. The customized food item 22g having visual indicators 204g in the form of printed text. In some embodiments, the visual indicators 204g may have been printed onto the customized food item 22g using edible ink, while in other embodiments other printing techniques (such as thermal printing using a laser) may be employed in order to print the visual indicators 204g. In this example, the visual indicators 204g provide customized information that indicates that the "ingredient sources tested for zero level of pesticides," that the "chicken bologna not from Tysons," and that "no beef from Britain" was used.

Referring now to FIGS. 3A and 3B, which as briefly described above, illustrate two block diagrams of two different implementations of the customized food preparation system 10* of FIG. 1A when the customized food preparation system 10* is a standalone device with all of the necessary logic to perform the various operations that it is designed to perform (e.g., directing or controlling) generation of one or more customized food items 22*. In particular, and as will be further described herein, FIG. 3A illustrates a customized food preparation system 10a that is the "hardwired" or "hard" implementation of an automated customized food manufacturing system that can implement the operations and processes to be described herein. The customized food preparation system 10a may comprise certain logic modules including, for example, a user information obtaining module 302', a customized food item generation controlling module 304', and/or a user proximity detecting module 308' that are implemented using purely hardware or circuitry components (e.g., application specific integrated circuit or "ASIC"). In contrast, FIG. 3B illustrates a standalone customized food preparation system 10b that is the "soft" implementation of an automated customized food manufacturing system that can implement the operations and processes to be described herein. In various embodiments, the customized food preparation system 10b may also include certain logic modules including, for example, a user information obtaining module 302'', a customized food item generation controlling module 304'', and/or a user proximity detecting module 308'' that are implemented using electronic circuitry (e.g., one or more processors 330 including one or more microprocessors, controllers, etc.) executing one or more programming instructions (e.g., software in the form of computer readable instructions 342—see FIG. 3B).

The embodiments of the standalone customized food preparation system 10* illustrated in FIGS. 3A and 3B are two extreme implementations of a standalone automated customized food manufacturing system in which all of the logic modules (e.g., the user information obtaining module 302', the customized food item generation controlling module 304', and the user proximity detecting module 308') are implemented using purely hardware solutions (e.g., circuitry such as ASIC) as illustrated in, for example, FIG. 3A or in which all of the logic modules (e.g., the user information obtaining module 302'', the customized food item generation controlling module 304'', and the user proximity detecting module 308'') are implemented using software solutions (e.g., programmable instructions in the form of computer readable instructions 342 being executed by hardware such as one or more processors 330) as illustrated in, for example, FIG. 3B. Since there are many ways of combining hardware, software, and/or firmware in order to implement the various logic modules (e.g., the user information obtaining module 302*, the customized food item generation controlling module 304*, and the user proximity detecting module 308*), only the two extreme implementations (e.g., the purely hardware solution as illustrated in FIG. 3A and the software solution of FIG. 3B) are illustrated here. It should be noted here that with respect to the "soft" implementation illustrated in FIG. 3B, hardware in the form of circuitry such as one or more processors 330 are still needed in order to execute the software. Further details related to the two implementations of the standalone customized food preparation system 10* illustrated in FIGS. 3A and 3B will be provided in greater detail below.

In still other implementations, the customized food preparation system 10* of FIG. 1A may not actually include the various logic modules (e.g., the user information obtaining module 302*, the customized food item generation controlling module 304*, and the user proximity detecting module 308*) that implements the various operations/processes described herein. For example, the customized food preparation system 10c of FIG. 3C illustrates such a device that does not have the various logic modules needed for, for example, directing or controlling generation of one or more customized food items 22*. Instead, such logic modules may be located in a remote device such as at a network control system 12* as illustrated, for example, in FIG. 1B and FIGS. 3D and 3E. In such implementations, the other device (e.g., network control system 12*) having the various logic modules may direct or control a customized food preparation system 10c (see FIGS. 1B and 3C) to perform at least some of the processes and operations to be described herein. In various implementations, the network control system 12* may be a network device (e.g., a server or a workstation) or a plurality of network devices (e.g., the cloud).

FIGS. 3D and 3E illustrates two extreme implementations of the network control system 12* of FIG. 1B in which all of the logic modules (e.g., the user information obtaining module 302''', the customized food item generation controlling module 304''', and the user proximity detecting module 308''') are implemented using purely hardware solutions (e.g., circuitry such as ASIC) as illustrated in, for example, FIG. 3D or in which all of the logic modules (e.g., the user information obtaining module 302'''', the customized food item generation controlling module 304'''', and the user proximity detecting module 308'''') are implemented using software solutions (e.g., programmable instructions in the form of computer readable instructions 342 being executed by hardware such as one or more processors 330) as illustrated in, for example, FIG. 3E. Again, although there are many ways to combine hardware, software, and/or firmware in order to implement the various logic modules (e.g., the user information obtaining module 302*, the customized food item generation controlling module 304*, and the user proximity detecting module 308*), for ease of illustration only the two extreme implementations (e.g., the purely hardware solution as illustrated in FIG. D and the software solution of FIG. 3E) are illustrated here.

In some instances, one or more components may be referred to herein as "configured to," "configured by," "configurable to," "operable/operative to," "adapted/adaptable," "able to," "conformable/conformed to," "designed to," etc. Those skilled in the art will recognize that such terms (e.g., "configured to") generally encompass active-state components and/or inactive-state components and/or standby-state components, unless context requires otherwise.

Referring particularly now to FIG. 3A, which illustrates a block diagram of a customized food preparation system 10a that includes a user information obtaining module 302', a customized food item generation controlling module 304', a the user proximity detecting module 308', memory 340, a communication system 350 (e.g., a network interface card, a transceiver, and so forth), a user interface 360 (e.g., a display, a speaker, and so forth), one or more processors 330 (e.g., one or more microprocessors), and a customized food item generation system 320*. In various embodiments, user interface 360 may include a display screen 30 such as a touchscreen, a keypad 32, and so forth.

In various embodiments, the user information obtaining module 302' of the customized food preparation system 10a of FIG. 3A is a logic module that may be designed to, among other things, obtain or acquire user information associated with one or more users that is a basis, at least in part, in generating one or more customized food items 22* that are customized specifically for the one or more users, the user information to be obtained including at least one or more user preferences related to the integrity of one or more food ingredients to be included in the one or more customized food items 22*. In contrast, the customized food item generation controlling module 304' of FIG. 3A is a logic module that may be configured to direct or control generation of the one or more customized food items 22* that are customized to show one or more visual indicators 204* that provide customized information that has been customized in accordance, at least in part, with the acquired user information. The user proximity detecting module 308' of FIG. 3A, on the other hand, is a logic module that may be configured to detect, among other things, presence of one or more users in the proximity (e.g., within 20 or 30 feet) of the customized food preparation system 10a.

Turning now to FIG. 3B, which illustrates a block diagram of another customized food preparation system 10b that can implement the operations and processes to be described herein. As indicated earlier, the customized food preparation system 10b in FIG. 3B is merely the "soft" version of the customized food preparation system 10a of FIG. 3A because the various logic modules: the user information obtaining module 302", the customized food item generation controlling module 304", and the user proximity detecting module 308" are implemented using one or more processors 330 (e.g., one or more microprocessors or controllers) executing software (e.g., computer readable instructions 342) rather than being implemented using purely hardware (e.g., ASIC) solutions as was the case in the customized food preparation system 10a of FIG. 3A. Thus, the user information obtaining module 302", the customized food item generation controlling module 304", and the user proximity detecting module 308" of FIG. 3B may be designed to execute the same functions as the user information obtaining module 302', the customized food item generation controlling module 304', and the user proximity detecting module 308' of FIG. 3A. The customized food preparation system 10b, as illustrated in FIG. 3B, may include other components (e.g., the user interface 360, the communication system 350, the memory 340 that stores the computer readable instructions 342, the customized food item generation system 320*, and so forth) that are the same or similar to the other components that may be included in the customized food preparation system 10a of FIG. 3A. Note that in the embodiment of the customized food preparation system 10b illustrated in FIG. 3B, the various logic modules (e.g., the user information obtaining module 302", the customized food item generation controlling module 304", and the user proximity detecting module 308") may be implemented by the one or more processors 330 (or other types of circuitry such as field programmable gate arrays or FPGAs) executing one or more computer readable instructions 342 stored in memory 340.

In various embodiments, the memory 340 of the customized food preparation system 10a of FIG. 3A and the customized food preparation system 10b of FIG. 3B may comprise one or more of mass storage device, read-only memory (ROM), programmable read-only memory (PROM), erasable programmable read-only memory (EPROM), cache memory such as random access memory (RAM), flash memory, synchronous random access memory (SRAM), dynamic random access memory (DRAM), and/or other types of memory devices.

FIG. 3C illustrates the customized food preparation system 10* of FIG. 1A (e.g., illustrated in FIG. 3C as customized food preparation system 10c) when the customized food preparation system 10* of FIG. 1A is not a standalone device but instead, relies on another device (e.g., the network control system 12* of FIG. 1B) to provide the various logic needed in order to, for example, generate one or more customized food items 22*. In contrast, FIGS. 3D and 3E illustrates two extreme implementations (e.g., in which all of the logic modules are implemented using hardware solutions as illustrated in the network control system 12a of FIG. 3D or in which all of the logic modules are implemented using software solutions as illustrated in the network control system 12b of FIG. 3E) of the network control system 12* of FIG. 1B that may control or direct the customized food preparation system 10c of FIG. 3C. Note that both the network control system 12a of FIG. 3D and the network control system 12b of FIG. FIG. 3E have the same logic modules as those logic modules included in the customized food preparation systems 10a and 10b of FIGS. 3A and 3B performing the same or similar functionalities.

Figure 4A:
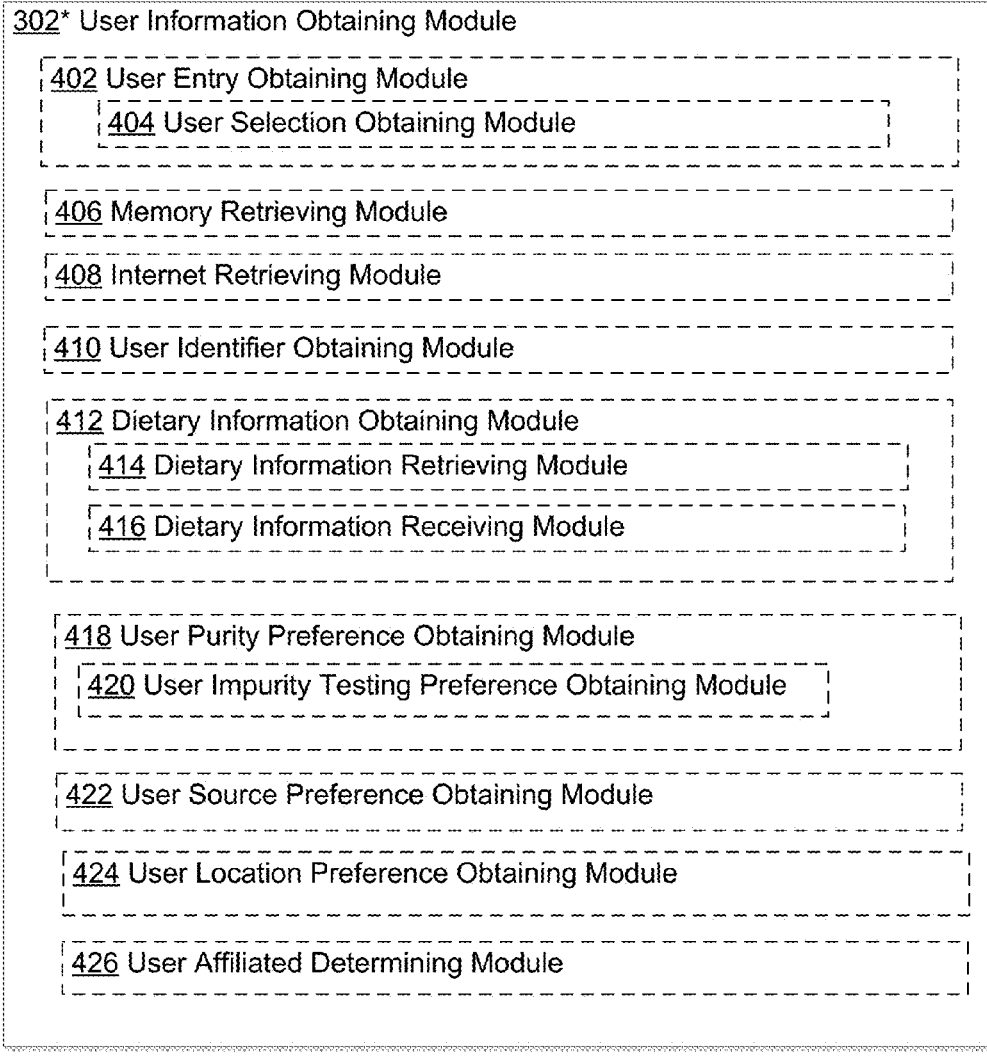
FIG. 4A shows another perspective of the user information obtaining module 302* of FIGS. 3A, 3B, 3D, and 3E (e.g., the user information obtaining module 302' of FIG. 3A, the user information obtaining module 302" of FIG. 3B, the user information obtaining module 302''' of FIG. 3D, or the user information obtaining module 302'''' of FIG. 3E) in accordance with various implementations.

Turning now to FIG. 4A illustrating a particular implementation of the user information obtaining module 302* (e.g., the user information obtaining module 302', the user information obtaining module 302", the user information obtaining module 302''', and the user information obtaining module 302'''') of FIGS. 3A, 3B, 3D, and 3E. As illustrated, the user information obtaining module 302* may include one or more sub-logic modules in various alternative implementations. For example, in various embodiments, the user information obtaining module 302* may include a user entry obtaining module 402 (which may further include a user selection obtaining module 404), a memory retrieving module 406, an Internet retrieving module 408, a user identifier obtaining module 410, a dietary information obtaining module 412 (which may further include a dietary information retrieving module 414 and/or a dietary information receiving module 416), a user purity preference obtaining module 418 (which may further include a user impurity testing preference obtaining module 420), a user source preference obtaining module 422, a user location preference obtaining module 424, and/or a user affiliated determining module 426. Specific details related to the user information obtaining module 302* as well as the above-described sub-modules of the user information obtaining module 302* will be provided below with respect to the operations and processes to be described herein.

Figure 4B:
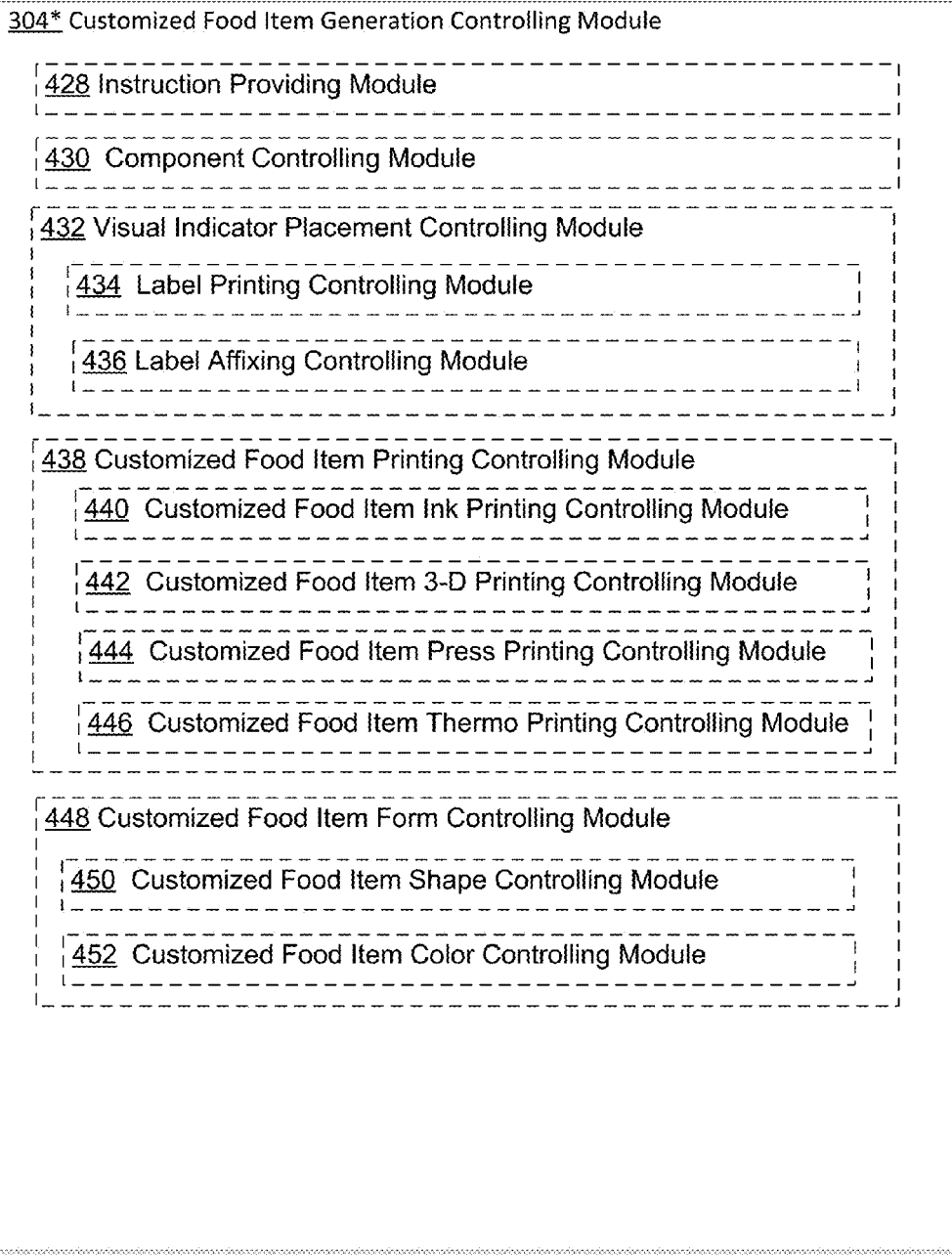
FIG. 4B shows another perspective of the customized food item generation controlling module 304* of FIGS. 3A, 3B, 3D, and 3E (e.g., the customized food item generation controlling module 304' of FIG. 3A, the customized food item generation controlling module 304" of FIG. 3B, the customized food item generation controlling module 304''' of FIG. 3D, or the customized food item generation controlling module 304'''' of FIG. 3E) in accordance with various implementations.

Turning now to FIG. 4B illustrating a particular implementation of the customized food item generation controlling module 304* (e.g., the customized food item generation controlling module 304', the customized food item generation controlling module 304", the customized food item generation controlling module 304''', or the customized food item generation controlling module 304'''') of FIG. 3A, 3B, 3D, or 3E. As illustrated, the customized food item generation controlling module 304* may include one or more sub-logic modules in various alternative implementations. For example, in various embodiments, the customized food item generation controlling module 304* may include an instruction providing module 428, a component controlling module 430, a visual indicator placement controlling module 432 (which may further include a label printing controlling module 434 and/or a label affixing controlling module 436), a customized food item printing controlling module 438 (which may further include a customized food item ink printing controlling module 440, a customized food item 3-D printing controlling module 442, a customized food item press printing controlling module 444, and/or a customized food item thermo printing controlling module 446), and/or a customized food item form controlling module 448 (which may further include a customized food item shape controlling module 450 and/or a customized food item color controlling module 452). Specific details related to the customized food item generation controlling module 304* as well as the above-described sub-modules of the customized food item generation controlling module 304* will be provided below with respect to the operations and processes to be described herein.

FIG. 4C illustrates a particular implementation of the customized food item generation system 320* of FIGS. 3A, 3B, and 3C illustrated in FIG. 4C as customized food item generation system 320'. In various embodiments, the customized food item generation system 320' may be designed to generate one or more customized food items (e.g., customized food item 22a, 22e, or 22f of FIG. 2D, 2E, or 2F) that includes one or more visual indicators (e.g., visual indicators 204d, 204e, or 204f of FIG. 2D, 2E, or 2F). The customized food item generation system 320' includes a customized food item production system 460' that is designed to form (e.g., via a 3-D printing process or other manufacturing processes) one or more customized food items (e.g., customized food item 22a, 22e, or 220 that have one or more visual indicators (e.g., visual indicators 204d, 204e, or 204O providing customized information (e.g., ingredient information, integrity or purity information, and so forth). Thus, in this implementation of the customized food item generation system 320*, the customized food items 22a, 22e, or 22f that are manufactured are manufactured already with the visual indicators (e.g., visual indicators 204d, 204e, or 204f) provided on the customized food items (e.g., customized food items 22a, 22e, or 22f).

FIG. 4D illustrates another implementation of the customized food item generation system 320* of FIGS. 3A, 3B, and 3C illustrated in FIG. 4D as customized food item generation system 320". In contrast to the customized food item generation system 320' of FIG. 4C in which the manufacture of the customized food items 22* and the placement of the visual indicators 204* are performed during the same manufacturing process, the customized food item generation system 320" of FIG. 4D separates the manufacturing operation of the customized food items (e.g., customized food items 22* of FIG. 2A, 2B, 2C or 2G) and the operation for placement of the visual indicators (e.g., visual indicators 204* of FIG. 2A, 2B, 2C or 2G) onto the customized food items 22* into two distinct processes. As illustrated in FIG. 4D, the customized food item generation system 320" may include a customized food item production system 460" and a visual indicator placement system 462*. In various implementations, the customized food item production system 460" may be designed to generate customized food items 22* (e.g., see customized food items 22* of FIG. 2A, 2B, 2C, or 2G). In contrast, the visual indicator placement system 462* may be designed to place visual indicators 204* (e.g., visual indicators 204* of FIGS. 2A, 2B, 2C, and 2G) onto the customized food items 22* after the customized food items 22* have been generated or while being generated.

Figure 4E:
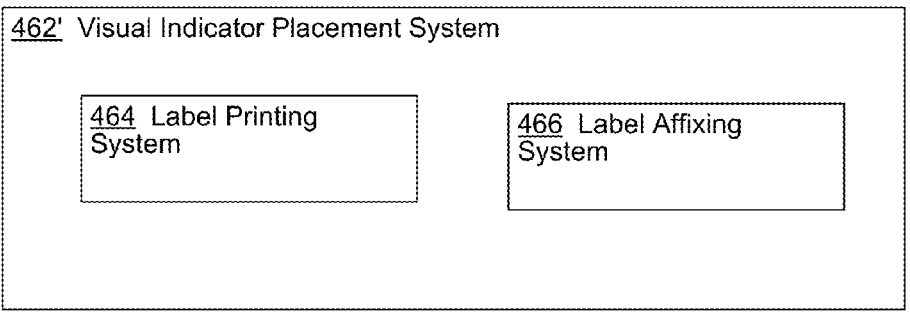
FIG. 4E shows a particular embodiment of the visual indicator placement system 462* of FIG. 4D illustrated as the visual indicator placement system 462'.

Turning now to FIG. 4E, which illustrates a particular implementation of the visual indicator placement system 462* of FIG. 4D illustrated in FIG. 4E as visual indicator placement system 462'. The visual indicator placement system 462' includes a label printing system 464 and a label affixing system 466. Thus, the visual indicator placement system 462' of FIG. 4E may be designed to generate the customized food item 22a and the affixed label 202 of FIG. 2A. In various implementations, edible ink and edible labels may be used for affixing the visual indicators (e.g., visual indicators 204a of FIG. 2A) onto the customized food items (e.g., customized food item 22a of FIG. 2A)

Figure 4F:
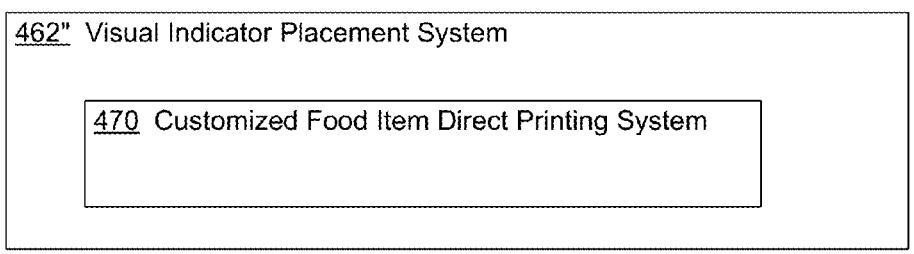
FIG. 4F shows another particular embodiment of the visual indicator placement system 462* of FIG. 4D illustrated as the visual indicator placement system 462".

FIG. 4F illustrates another implementation of the visual indicator placement system 462* of FIG. 4D illustrated in FIG. 4F as visual indicator placement system 462". As illustrated, the visual indicator placement system 462" includes a customized food item direct printing system 470 that is designed to print visual indicators 22* (e.g., visual indicators 22* of FIG. 2B, 2C, or 2G in the form of text, icons, or images) directly onto customized food items 22* (e.g., customized food items 22* of FIG. 2B, 2C, or 2G). Various printing systems may be employed in various alternative implementations in order to print directly onto the customized food items 22*. For example, in some cases, edible ink may be printed directly onto a customized food item 22* while in other cases press or stamp printing systems may be employed. In still other cases, thermal printing systems (which may employ lasers) may be used in order to write text (or images) onto customized food items 22*.

Figure 5:
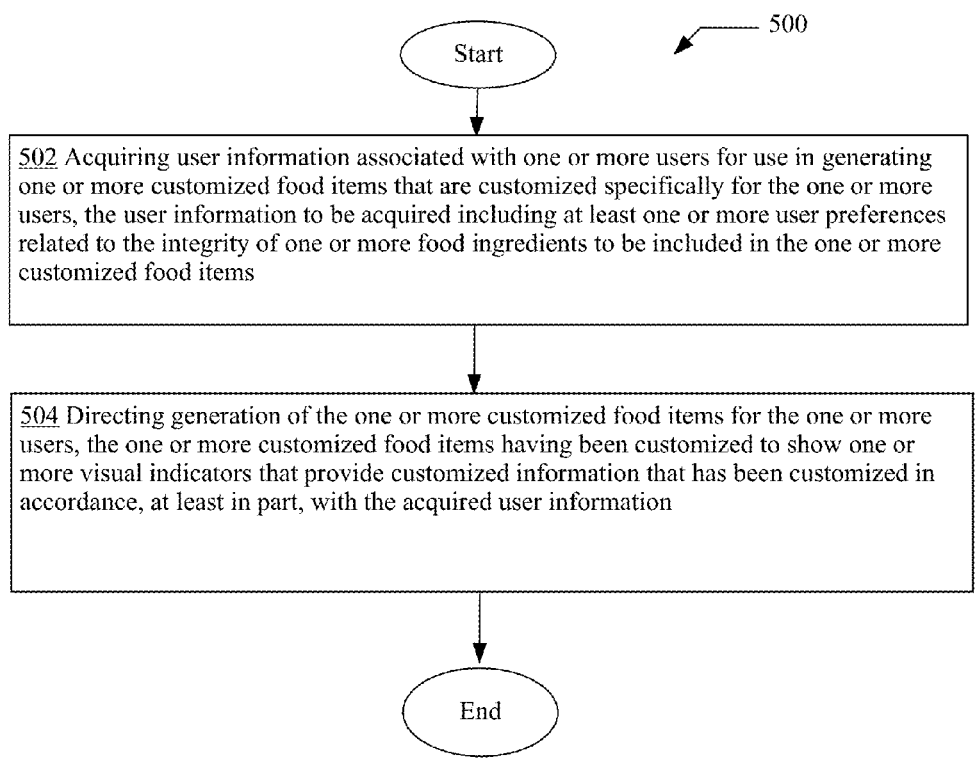
FIG. 5 is a high-level logic flowchart of a process, e.g., operational flow 500, according to some embodiments.

In the following, various operations are presented in accordance with various embodiments that may be implemented by the customized food preparation system 10* of FIG. 3A, 3B, or 3C, or that may be implemented by the network control system 12* of FIG. 3D or 3E. FIG. 5, for example, illustrates an operational flow 500 representing example computationally-implemented operations that may be implemented for, among other things, directing generation of one or more customized food items that are customized for, for example, one or more specific users and that have been customized to show one or more visual indicators that provide customized information that has been customized in accordance, at least in part, with user information associated with the particular user, the user information including at least one or more user preferences related to the integrity of one or more food ingredients to be included in the one or more customized food items. In some implementations, at least some portions of these operations may be implemented through the customized food preparation system 10* (e.g., the customized food preparation system 10a, customized food preparation system 10b, or the customized food preparation system 10c) of, for example, FIG. 3A, 3B, or 3C or through the network control system 12* (e.g., the network control system 12a or the network control system 12b) of FIG. 3D or 3E.

In FIG. 5 and in the following figures that include various examples of operational flows, discussions and explanations will be provided with respect to the customized food preparation system 10* or the network control system 12* described above and as illustrated in FIGS. 3A, 3B, 3C, 3D, 3E, 4A, 4B, 4C, 4D, 4E, and 4F, and/or with respect to other examples (e.g., as provided in FIGS. 1A, 1B, 2A, 2B, 2C, 2D, 2E, 2F, and 2G) and contexts. However, it should be understood that the operational flows may be executed in a number of other environments and contexts, and/or in modified versions of FIGS. 1A, 1B, 2A, 2B, 2C, 2D, 2E, 2F, 2G, 3A, 3B, 3C, 3D, 3E, 4A, 4B, 4C, 4D, 4E, and 4F. Also, although the various operational flows are presented in the sequence(s) illustrated, it should be understood that the various operations may be performed in orders other than those which are illustrated, or may be performed concurrently.

Further, in FIG. 5 and in the figures to follow thereafter, various operations may be depicted in a box-within-a-box manner. Such depictions may indicate that an operation in an internal box may comprise an optional example embodiment of the operational step illustrated in one or more external boxes. However, it should be understood that internal box operations may be viewed as independent operations separate from any associated external boxes and may be performed in any sequence with respect to all other illustrated operations, or may be performed concurrently. Still further, these operations illustrated in FIG. 5 as well as the other operations to be described herein are performed by at least one of a machine, an article of manufacture, or a composition of matter unless indicated otherwise.

For ease of understanding, the flowcharts are organized such that the initial flowcharts present implementations via an example implementation and thereafter the following flowcharts present alternate implementations and/or expansions of the initial flowchart(s) as either sub-component operations or additional component operations building on one or more earlier-presented flowcharts. Those having skill in the art will appreciate that the style of presentation utilized herein (e.g., beginning with a presentation of a flowchart(s) presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

In any event, after a start operation, the operational flow 500 of FIG. 5 may move to a user information acquiring operation 502 for acquiring user information associated with one or more users for use in generating one or more customized food items that are customized specifically for the one or more users, the user information to be acquired including at least one or more user preferences related to integrity of one or more food ingredients to be included in the one or more customized food items. For instance, and as illustration, the user information obtaining module 302* of the customized food preparation system 10* of FIG. 3A or 3B (e.g., the user information obtaining module 302' of FIG. 3A or the user information obtaining module 302" of FIG. 3B) or of the network control system 12* of FIG. 3D or 3E (e.g., the user information obtaining module 302'" of FIG. 3D or the user information obtaining module 302'" of FIG. 3E) acquiring or obtaining user information (e.g., user dietary information, user dietary preferences, user dietary restrictions, and so forth) associated with one or more users for use (e.g., that is a basis, at least in part) in generating one or more customized food items 22* that are customized specifically for the one or more users, the user information to be acquired including at least one or more user preferences related to integrity (e.g., free of impurities, or obtained from an acceptable source) of one or more food ingredients (e.g., meats, dairy products, vegetables, processed ingredients such as flower, and so forth) to be included in the one or more customized food items 22* (e.g., energy bar, prepared foods such as sandwiches, and so forth).

Operational flow 500 may also include a customized food item generation directing operation 504 for directing generation of the one or more customized food items for the one or more users, the one or more customized food items having been customized to show one or more visual indicators that provide customized information that has been customized in accordance, at least in part, with the acquired user information. For instance, the customized food item generation controlling module 304* of the customized food preparation system 10* of FIG. 3A or 3B (e.g., the customized food item generation controlling module 304' of FIG. 3A or the customized food item generation controlling module 304" of FIG. 3B) or of the network control system 12* of FIG. 3D or 3E (e.g., the customized food item generation controlling module 304'" of FIG. 3D or the customized food item generation controlling module 304"" of FIG. 3E) directing or controlling generation of the one or more customized food items 22* for the one or more users, the one or more customized food items 22* having been customized to show one or more visual indicators 204* (e.g., printed text, coloring, and so forth) that provide customized information (e.g., customized textual information) that has been customized in accordance, at least in part, with the acquired user information. As will be further described herein, the customized information that is provided through the one or more visual indicators (e.g., printed text or image) on the one or more customized food items 22* may indicate a variety of information including, for example, the integrity or purity of the ingredients used to generate the one or more customized food items 22*, the ingredients and the amounts of the ingredients used to generate the one or more customized food items 22*, the dietary information (e.g., dietary history) of the user that the one or more customized food items are customized for, and so forth.

Figure 6A:
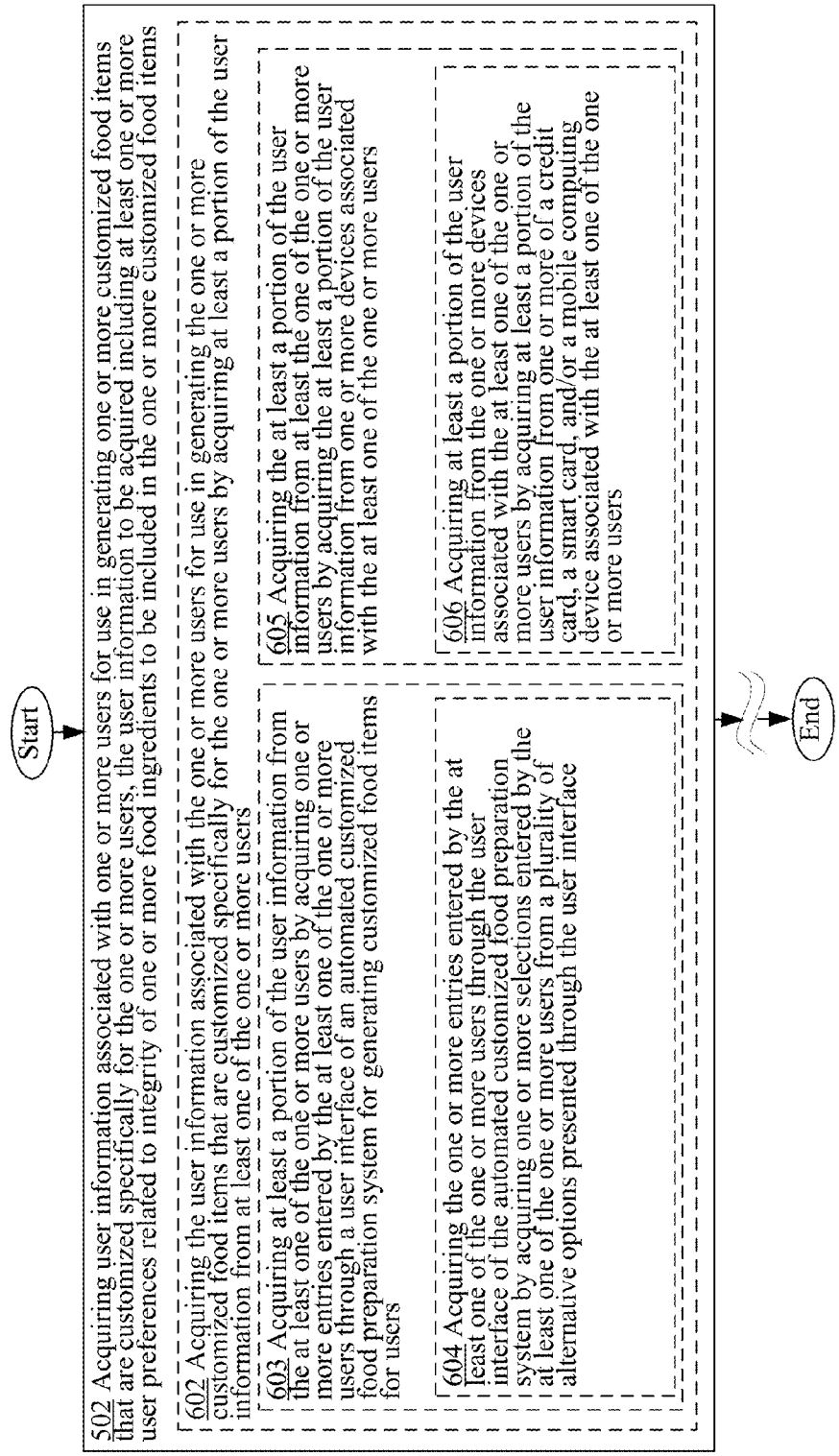
FIG. 6A is a high-level logic flowchart of a process depicting alternate implementations of the user information acquiring operation 502 of FIG. 5.

As will be described below, the user information acquiring operation 502 and the customized food item generation directing operation 504 may be executed in a variety of different ways in various alternative implementations. FIGS. 6A, 6B, 6C, 6D, 6E, 6F, 6G, 6H, 6J, 6K, and 6L for example, illustrate at least some of the alternative ways that the user information acquiring operation 502 of FIG. 5 may be executed in various alternative implementations. In some cases, for example, the user information acquiring operation 502 may include an operation 602 for acquiring the user information associated with the one or more users for use in generating the one or more customized food items that are customized specifically for the one or more users by acquiring at least a portion of the user information from at least one of the one or more users as illustrated in FIG. 6A. For instance, the user information obtaining module 302* of the customized food preparation system 10a or 10b of FIG. 3A or 3B (or of the network control system 12a or 12b of FIG. 3D or 3E) acquiring the user information associated with the one or more users for use (e.g., as a basis) in generating the one or more customized food items 22* that are customized specifically for the one or more users by acquiring (e.g., obtaining) at least a portion of the user information from at least one of the one or more users as entered via, for example, user interface 360 (e.g., touchscreen and/or keypad) of FIG. 3A, 3B, or 3C.

In various implementations, operation 602 may further include one or more additional operations including, in some cases, an operation 603 for acquiring at least a portion of the user information from the at least one of the one or more users by acquiring one or more entries entered by the at least one of the one or more users through a user interface of an automated customized food preparation system for generating customized food items for users. For instance, the user information obtaining module 302* including the user entry obtaining module 402 (see FIG. 4A) of the customized food preparation system 10a or 10b of FIG. 3A or 3B (or of the network control system 12a or 12b of FIG. 3D or 3E) acquiring at least a portion of the user information from the at least one of the one or more users by having the user entry obtaining module 402 acquire or obtain one or more entries entered by the at least one of the one or more users through a user interface 360 of an automated customized food preparation system 10* for generating customized food items 22* for users.

In some implementations, operation 603 may further include an operation 604 for acquiring the one or more entries entered by the at least one of the one or more users through the user interface of the automated customized food preparation system by acquiring one or more selections entered by the at least one of the one or more users from a plurality of alternative options presented through the user interface. For instance, the user entry obtaining module 402 including the user selection obtaining module 404 (see FIG. 4A) of the customized food preparation system 10a or 10b of FIG. 3A or 3B (or of the network control system 12a or 12b of FIG. 3D or 3E) acquiring the one or more entries entered by the at least one of the one or more users through the user interface 360 of the automated customized food preparation system 10* by having the user selection obtaining module 404 acquire or obtain one or more selections (e.g., food selections, customization selections that include taste preferences, ingredient preferences, and/or textual preferences—other possibilities include preparation preferences such as heating, cooling, etc.) entered by the at least one of the one or more users from a plurality of alternative options presented through the user interface 360 (e.g., display 30 of FIG. 1A).

In some cases, operation 602 may include an operation 605 for acquiring the at least a portion of the user information from at least the one of the one or more users by acquiring the at least a portion of the user information from one or more devices associated with the at least one of the one or more users. For instance, the user information obtaining module 302* of the customized food preparation system 10a or 10b of FIG. 3A or 3B (or of the network control system 12a or 12b of FIG. 3D or 3E) acquiring the at least a portion of the user information from at least the one of the one or more users by acquiring or obtaining the at least a portion of the user information from one or more devices (e.g., mobile devices in the possession of users) associated with the at least one of the one or more users.

In some implementations, operation 605 may include an operation 606 for acquiring at least a portion of the user information from the one or more devices associated with the at least one of the one or more users by acquiring at least a portion of the user information from one or more of a credit card, a smart card, and/or a mobile computing device associated with the at least one of the one or more users. For instance, the user information obtaining module 302* of the customized food preparation system 10a or 10b of FIG. 3A or 3B (or of the network control system 12a or 12b of FIG. 3D or 3E) acquiring at least a portion of the user information from the one or more devices associated with the at least one of the one or more users by acquiring or obtaining at least a portion of the user information (e.g., user ID, user preferences, user dietary information, etc.) from one or more of a credit card, a smart card, and/or a mobile computing device (e.g., a smartphone, a tablet computer, a laptop, and so forth) associated with the at least one of the one or more users.

Figure 6B:
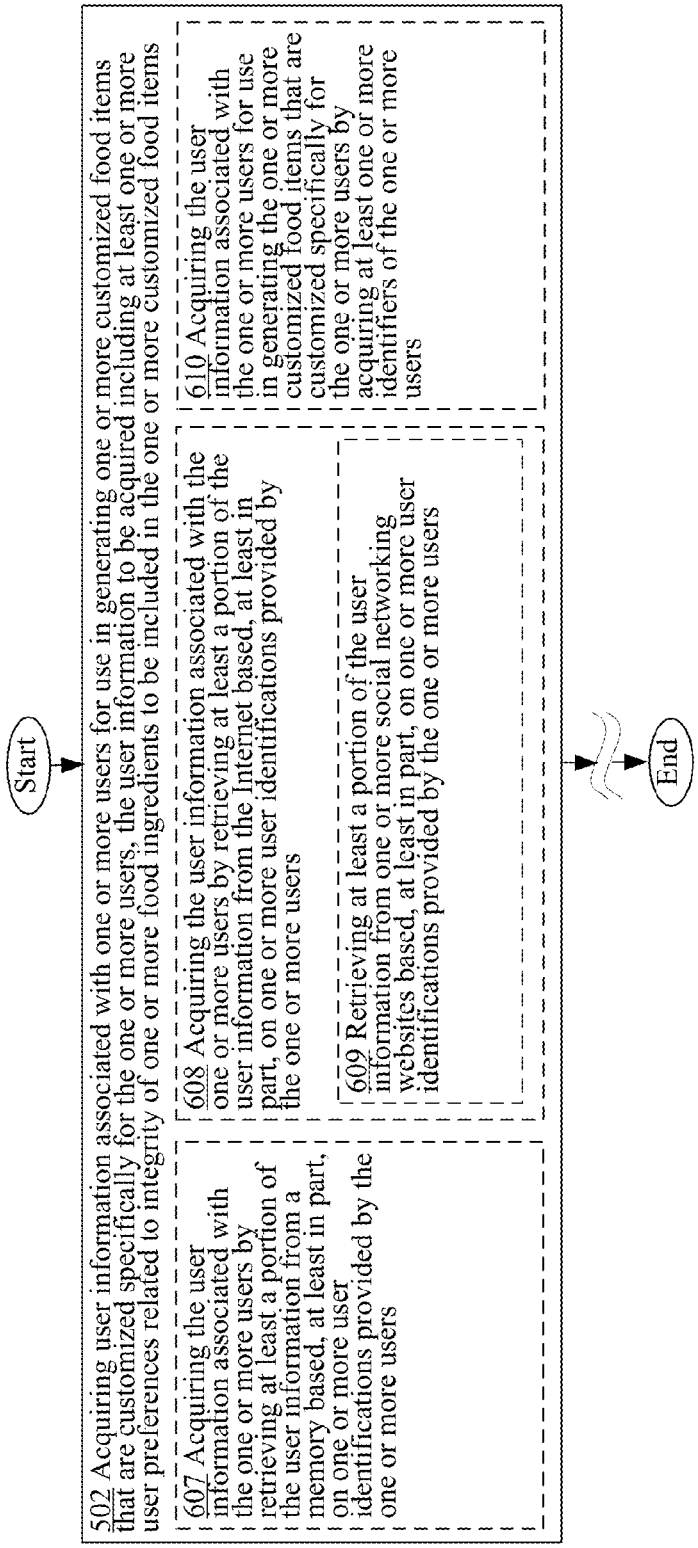
FIG. 6B is a high-level logic flowchart of a process depicting alternate implementations of the user information acquiring operation 502 of FIG. 5.

Referring now to FIG. 6B, in some cases, the user information acquiring operation 502 may actually include an operation 607 for acquiring the user information associated with the one or more users by retrieving at least a portion of the user information from a memory based, at least in part, on one or more user identifications provided by the one or more users. For instance, the user information obtaining module 302* including the memory retrieving module 406 (see FIG. 4A) of the customized food preparation system 10a or 10b of FIG. 3A or 3B (or of the network control system 12a or 12b of FIG. 3D or 3E) acquiring the user information associated with the one or more users by having the memory retrieving module 406 retrieve at least a portion of the user information (e.g., dietary schedules of a particular user, dietary restrictions of a particular user, historical dietary consumption data of a particular user, and so forth) from a memory 340 based, at least in part, on one or more user identifications (e.g., actual name, username, identification number, and so forth) provided by the one or more users.

In the same or alternative implementations, the user information acquiring operation 502 may include an operation 608 for acquiring the user information associated with the one or more users by retrieving at least a portion of the user information from the Internet based, at least in part, on one or more user identifications provided by the one or more users. For instance, the user information obtaining module 302* including the Internet retrieving module 408 (see FIG. 4A) of the customized food preparation system 10a or 10b of FIG. 3A or 3B (or of the network control system 12a or 12b of FIG. 3D or 3E) acquiring the user information associated with the one or more users by having the Internet retrieving module 408 retrieve at least a portion of the user information from the Internet based, at least in part, on one or more user identifications (e.g., usernames and passwords) provided by the one or more users.

In some cases, operation 608 may further include an operation 609 for retrieving at least a portion of the user information from one or more social networking websites based, at least in part, on one or more user identifications provided by the one or more users. For instance, the Internet retrieving module 408 of the customized food preparation system 10a or 10b of FIG. 3A or 3B (or of the network control system 12a or 12b of FIG. 3D or 3E) retrieving at least a portion of the user information from one or more social networking websites based, at least in part, on one or more user identifications (e.g., usernames and passwords) provided by the one or more users.

In the same or alternative implementations, the user information acquiring operation 502 may include an operation 610 for acquiring the user information associated with the one or more users for use in generating the one or more customized food items that are customized specifically for the one or more users by acquiring at least one or more identifiers of the one or more users. For instance, the user information obtaining module 302* including the user identifier obtaining module 410 (see FIG. 4A) of the customized food preparation system 10a or 10b of FIG. 3A or 3B (or of the network control system 12a or 12b of FIG. 3D or 3E) acquiring the user information associated with the one or more users for use in (e.g., that is the basis, at least in part, for) generating the one or more customized food items 22* that are customized specifically for the one or more users by having the user identifier obtaining module 410 acquire or obtain at least one or more identifiers (e.g., usernames, user number, etc.) of the one or more users.

Figure 6C:
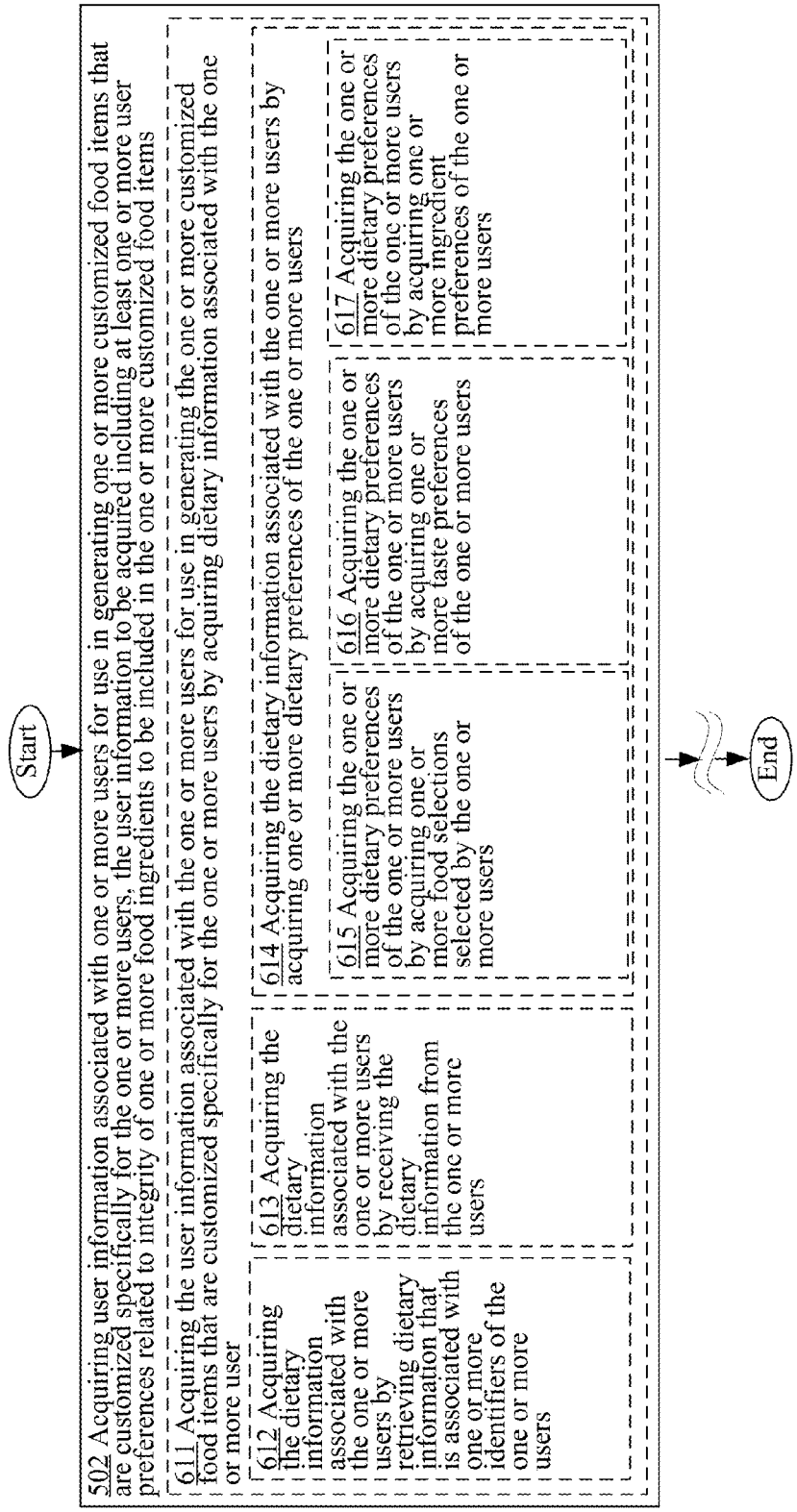
FIG. 6C is a high-level logic flowchart of a process depicting alternate implementations of the user information acquiring operation 502 of FIG. 5.

Turning now to FIG. 6C, in various implementations, the user information acquiring operation 502 may actually involve an operation 611 for acquiring the user information associated with the one or more users for use in generating the one or more customized food items that are customized specifically for the one or more users by acquiring dietary information associated with the one or more user. For instance, the user information obtaining module 302* including the dietary information obtaining module 412 (see FIG. 4A) of the customized food preparation system 10a or 10b of FIG. 3A or 3B (or of the network control system 12a or 12b of FIG. 3D or 3E) acquiring the user information associated with the one or more users for use (e.g., as a basis) in generating the one or more customized food items that are customized specifically for the one or more users by having the dietary information obtaining module 412 acquire or obtain dietary information associated with the one or more user.

Figure 6D:
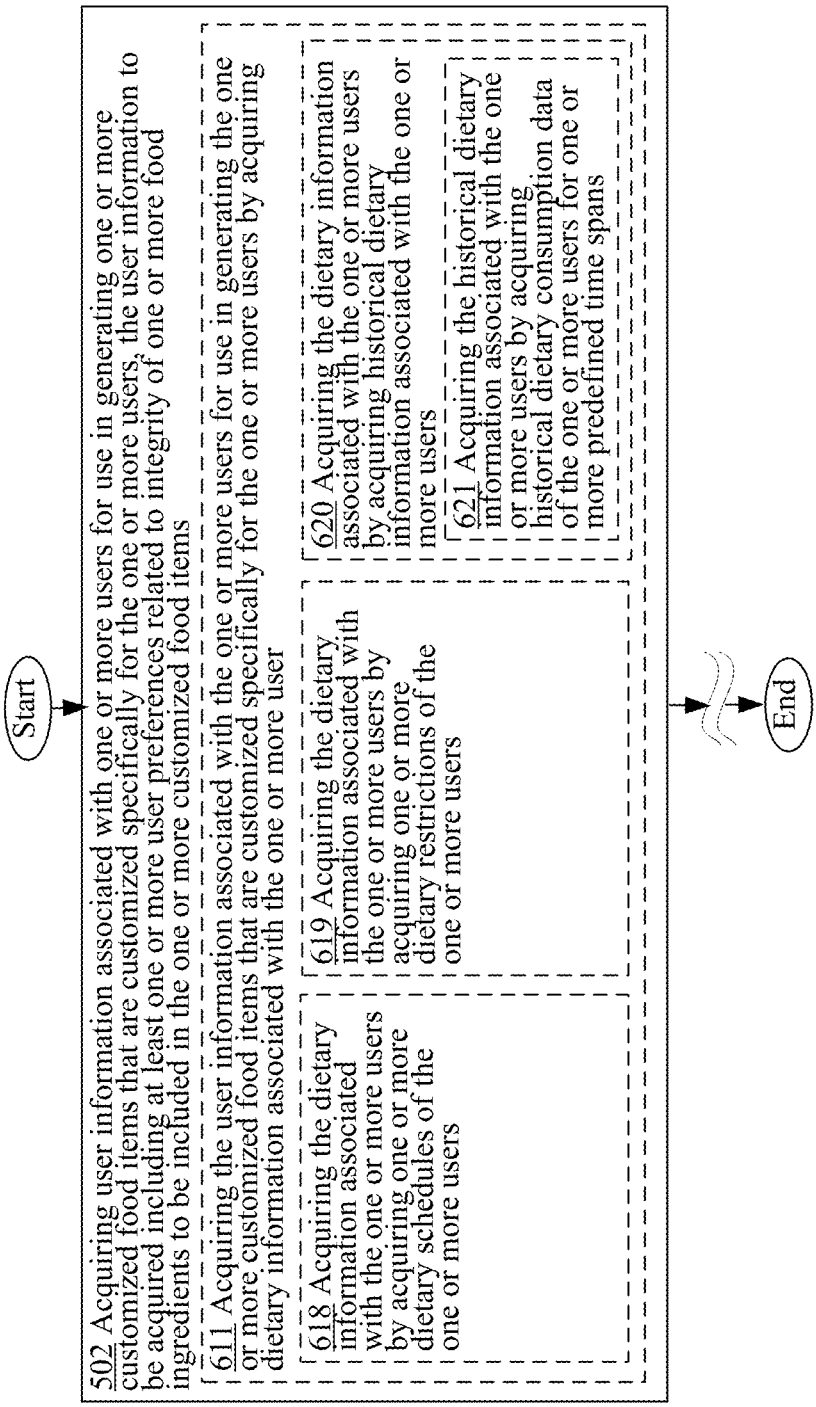
FIG. 6D is a high-level logic flowchart of a process depicting alternate implementations of the user information acquiring operation 502 of FIG. 5.

As further illustrated in FIGS. 6C and 6D, operation 611 may include one or more additional operations in various alternative implementations including, in some cases, an operation 612 for acquiring the dietary information associated with the one or more users by retrieving dietary information that is associated with one or more identifiers of the one or more users as illustrated in FIG. 6C. For instance, the dietary information obtaining module 412 including the dietary information retrieving module 414 (see FIG. 4A) of the customized food preparation system 10a or 10b of FIG. 3A or 3B (or of the network control system 12a or 12b of FIG. 3D or 3E) acquiring or obtaining the dietary information associated with the one or more users by having the dietary information retrieving module 414 retrieve (e.g., retrieve or query from a memory 340 or from the Cloud) dietary information (e.g., dietary restrictions, dietary plans, dietary preferences, and so forth) that is associated with one or more identifiers (e.g., legal name, username, and so froth) of the one or more users.

In the same or alternative implementations, operation 611 may include an operation 613 for acquiring the dietary information associated with the one or more users by receiving the dietary information from the one or more users. For instance, the dietary information obtaining module 412 including the dietary information receiving module 416 (see FIG. 4A) of the customized food preparation system 10a or 10b of FIG. 3A or 3B (or of the network control system 12a or 12b of FIG. 3D or 3E) acquiring or obtaining the dietary information associated with the one or more users by having the dietary information receiving module 416 receive the dietary information (e.g., food item selection) from the one or more users.

In the same or alternative implementations, operation 611 may include an operation 614 for acquiring the dietary information associated with the one or more users by acquiring one or more dietary preferences of the one or more users. For instance, the dietary information obtaining module 412 of the customized food preparation system 10a or 10b of FIG. 3A or 3B (or of the network control system 12a or 12b of FIG. 3D or 3E) acquiring the dietary information associated with the one or more users by acquiring or obtaining one or more dietary preferences (e.g., choices or selections) of the one or more users from, for example, a memory 340, from the one or more users, or from the Cloud.

In some implementations, operation 614 may actually include or involve an operation 615 for acquiring the one or more dietary preferences of the one or more users by acquiring one or more food selections selected by the one or more users. For instance, the dietary information obtaining module 412 of the customized food preparation system 10a or 10b of FIG. 3A or 3B (or of the network control system 12a or 12b of FIG. 3D or 3E) acquiring the one or more dietary preferences of the one or more users by acquiring or obtaining one or more food selections (e.g., an energy bar rather than a fruit bar, a tuna sandwich rather than a bologna sandwich, and so forth) selected by the one or more users For example, a user selecting a peanut butter energy bar rather than a strawberry energy bar or chocolate chip-pecan energy bar.

In some implementations, operation 614 may additionally or alternatively include an operation 616 for acquiring the one or more dietary preferences of the one or more users by acquiring one or more taste preferences of the one or more users. For instance, the dietary information obtaining module 412 of the customized food preparation system 10a or 10b of FIG. 3A or 3B (or of the network control system 12a or 12b of FIG. 3D or 3E) acquiring the one or more dietary preferences of the one or more users by acquiring or obtaining one or more taste preferences (e.g., spicy, sweet, salty, and so forth) of the one or more users.

In some implementations, operation 614 may additionally or alternatively include an operation 617 for acquiring the one or more dietary preferences of the one or more users by acquiring one or more ingredient preferences of the one or more users. For instance, the dietary information obtaining module 412 of the customized food preparation system 10a or 10b of FIG. 3A or 3B (or of the network control system 12a or 12b of FIG. 3D or 3E) acquiring the one or more dietary preferences of the one or more users by acquiring or obtaining one or more ingredient preferences (e.g., reduced salt content, high fiber content, reduced sugar, organic milk, ingredient source tested for prions, use 1 percent milk rather than whole milk, and so forth) of the one or more users.

In the same or alternative implementations, operation 611 may include an operation 618 for acquiring the dietary information associated with the one or more users by acquiring one or more dietary schedules of the one or more users as illustrated in FIG. 6D. For instance, the dietary information obtaining module 412 of the customized food preparation system 10a or 10b of FIG. 3A or 3B (or of the network control system 12a or 12b of FIG. 3D or 3E) acquiring the dietary information associated with the one or more users by acquiring or obtaining one or more dietary schedules (e.g., diet plans) of the one or more users.

In some implementations, operation 611 may additionally or alternatively include an operation 619 for acquiring the dietary information associated with the one or more users by acquiring one or more dietary restrictions of the one or more users. For instance, the dietary information obtaining module 412 of the customized food preparation system 10a or 10b of FIG. 3A or 3B (or of the network control system 12a or 12b of FIG. 3D or 3E) acquiring the dietary information associated with the one or more users by acquiring or obtaining one or more dietary restrictions (e.g., low-sodium requirement, low-carbohydrate requirement, and so forth) of the one or more users.

In some implementations, operation 611 may additionally or alternatively include an operation 620 for acquiring the dietary information associated with the one or more users by acquiring historical dietary information associated with the one or more users. For instance, the dietary information obtaining module 412 of the customized food preparation system 10a or 10b of FIG. 3A or 3B (or of the network control system 12a or 12b of FIG. 3D or 3E) acquiring the dietary information associated with the one or more users by acquiring or obtaining historical dietary information (e.g., historical consumption data, previous dietary plans, etc.) associated with the one or more users. For example, previous purchases of customized food items by a particular user may have been previously recorded and tracked. Such information may be archived and may then be retrieved or made available once the particular user is, for example, ready to purchase another customized food item.

As further illustrated in FIG. 6D, operation 620 may further include an operation 621 for acquiring the historical dietary information associated with the one or more users by acquiring historical dietary consumption data of the one or more users for one or more predefined time spans. For instance, the dietary information obtaining module 412 of the customized food preparation system 10a or 10b of FIG. 3A or 3B (or of the network control system 12a or 12b of FIG. 3D or 3E) acquiring the historical dietary information associated with the one or more users by acquiring or obtaining historical dietary consumption data of the one or more users for one or more predefined time spans (e.g., food consumption information for the previous two months such as sodium consumption data for the previous two months).

Figure 6E:
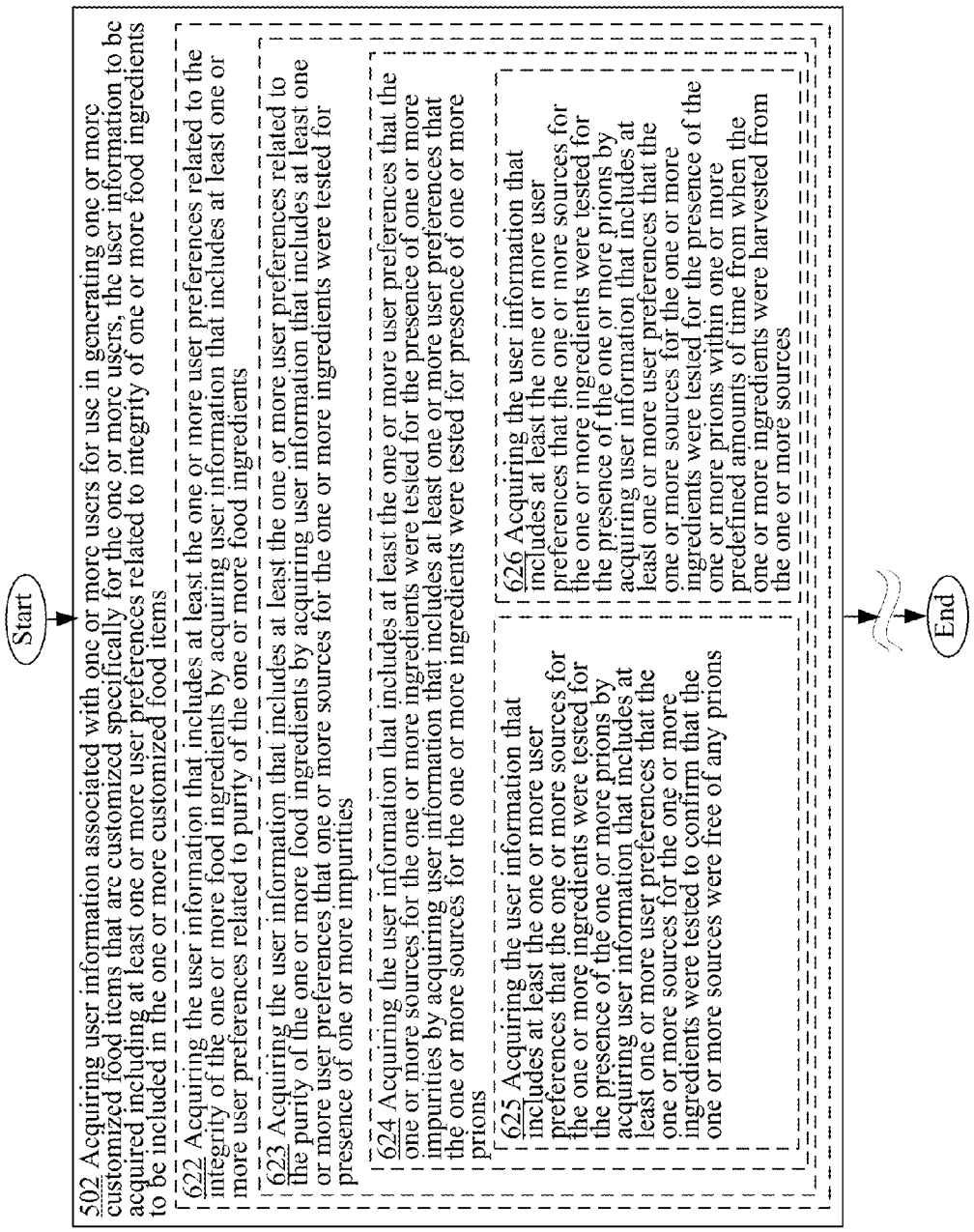
FIG. 6E is a high-level logic flowchart of a process depicting alternate implementations of the user information acquiring operation 502 of FIG. 5.

In various implementations, the user information acquiring operation 502 may include an operation 622 for acquiring the user information that includes at least the one or more user preferences related to the integrity of the one or more food ingredients by acquiring user information that includes at least one or more user preferences related to purity of the one or more food ingredients as illustrated in FIG. 6E. For instance, the user information obtaining module 302* including the user purity preference obtaining module 418 (see FIG. 4A) of the customized food preparation system 10a or 10b of FIG. 3A or 3B (or of the network control system 12a or 12b of FIG. 3D or 3E) acquiring the user information that includes at least the one or more user preferences related to the integrity of the one or more food ingredients by having the user purity preference obtaining module 418 acquire or obtain user information that includes at least one or more user preferences related to purity of the one or more food ingredients (e.g., preference that only organic ingredients be used, that only locally grown ingredients be used, that pesticide free or antibiotic free ingredients be used, and so forth).

In some cases, operation 622 may, in turn, further include an operation 623 for acquiring the user information that includes at least the one or more user preferences related to the purity of the one or more food ingredients by acquiring user information that includes at least one or more user preferences that one or more sources for the one or more ingredients were tested for presence of one or more impurities. For instance, the user purity preference obtaining module 418 including the user impurity testing preference obtaining module 420 (see FIG. 4A) of the customized food preparation system 10a or 10b of FIG. 3A or 3B (or of the network control system 12a or 12b of FIG. 3D or 3E) acquiring the user information that includes at least the one or more user preferences related to the purity of the one or more food ingredients by having the user impurity testing preference obtaining module 420 acquire or obtain user information that includes at least one or more user preferences that one or more sources (e.g., harvest, farm, common batch, slaughtered animal, and so forth) for the one or more ingredients were tested for presence of one or more impurities (e.g., chemical, bacteria, or viral impurities).

In various implementations, operation 623 may further include an operation 624 for acquiring the user information that includes at least the one or more user preferences that the one or more sources for the one or more ingredients were tested for the presence of one or more impurities by acquiring user information that includes at least one or more user preferences that the one or more sources for the one or more ingredients were tested for presence of one or more prions. For instance, the user impurity testing preference obtaining module 420 of the customized food preparation system 10a or 10b of FIG. 3A or 3B (or of the network control system 12a or 12b of FIG. 3D or 3E) acquiring the user information that includes at least the one or more user preferences that the one or more sources for the one or more ingredients were tested for the presence of one or more impurities by acquiring or obtaining user information that includes at least one or more user preferences that the one or more sources (e.g., slaughtered animal or animals, common herd, and so forth) for the one or more ingredients were tested for presence of one or more prions.

In some implementations, operation 624 may include an operation 625 for acquiring the user information that includes at least the one or more user preferences that the one or more sources for the one or more ingredients were tested for the presence of the one or more prions by acquiring user information that includes at least one or more user preferences that the one or more sources for the one or more ingredients were tested to confirm that the one or more sources were free of any prions. For instance, the user impurity testing preference obtaining module 420 of the customized food preparation system 10a or 10b of FIG. 3A or 3B (or of the network control system 12a or 12b of FIG. 3D or 3E) acquiring the user information that includes at least the one or more user preferences that the one or more sources for the one or more ingredients were tested for the presence of the one or more prions by acquiring or obtaining user information that includes at least one or more user preferences that the one or more sources (e.g., slaughtered animal or animals, common herd, and so forth) for the one or more ingredients (e.g., ground beef) were tested to confirm that the one or more sources were free of any prions.

For example, in some implementations, operation 624 may include an operation 626 for acquiring the user information that includes at least the one or more user preferences that the one or more sources for the one or more ingredients were tested for the presence of the one or more prions by acquiring user information that includes at least one or more user preferences that the one or more sources for the one or more ingredients were tested for the presence of the one or more prions within one or more predefined amounts of time from when the one or more ingredients were harvested from the one or more sources. For instance, the user impurity testing preference obtaining module 420 of the customized food preparation system 10a or 10b of FIG. 3A or 3B (or of the network control system 12a or 12b of FIG. 3D or 3E) acquiring the user information that includes at least the one or more user preferences that the one or more sources for the one or more ingredients were tested for the presence of the one or more prions by acquiring or obtaining user information that includes at least one or more user preferences that the one or more sources for the one or more ingredients were tested for the presence of the one or more prions within one or more predefined amounts of time from when the one or more ingredients were harvested from the one or more sources (e.g., the cow that the beef ingredient was harvested from was tested for prions within one week of the cow being slaughtered).

Figure 6F:
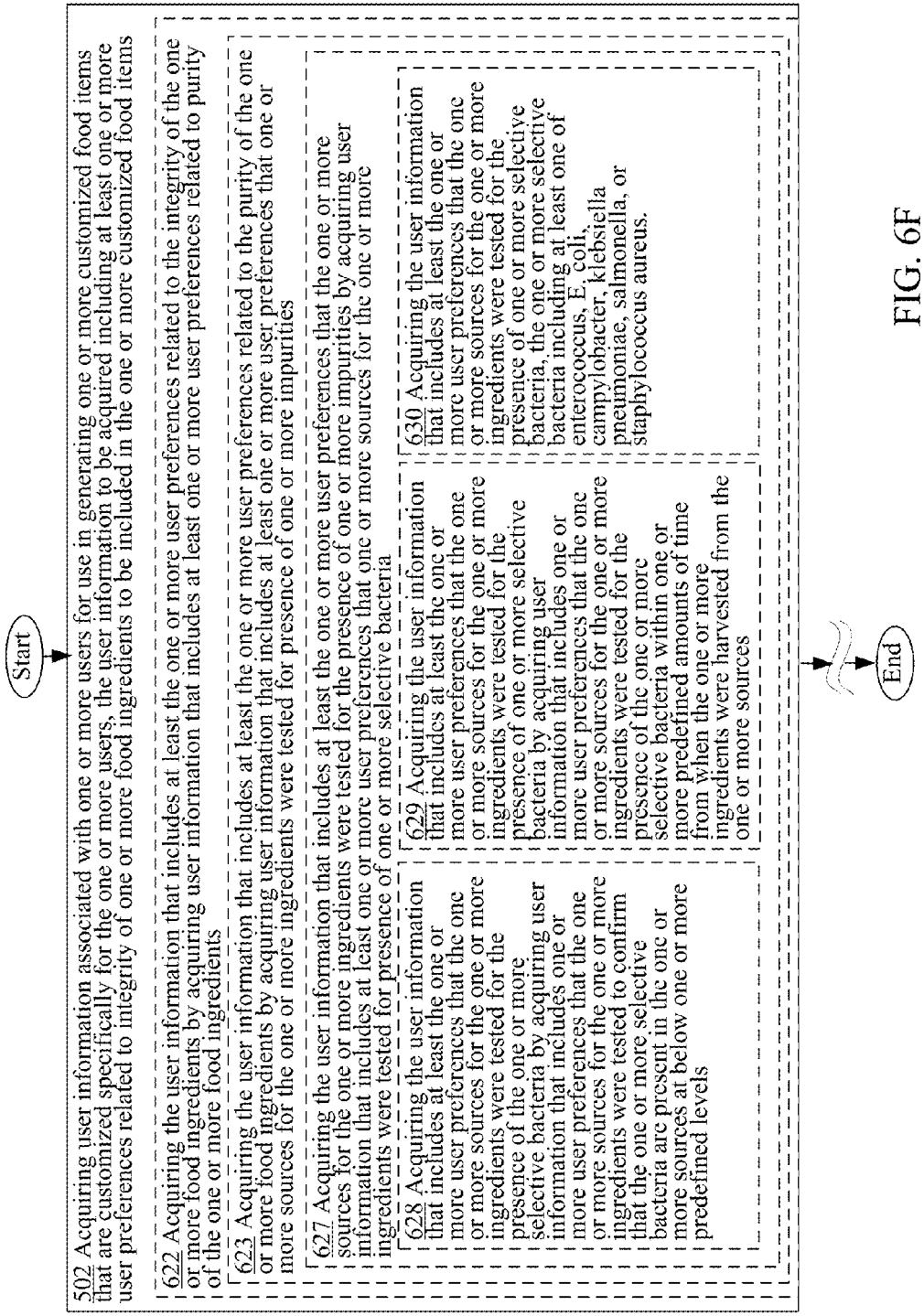
FIG. 6F is a high-level logic flowchart of a process depicting alternate implementations of the user information acquiring operation 502 of FIG. 5.

In the same or alternative implementations, operation 623 may additionally or alternatively include an operation 627 for acquiring the user information that includes at least the one or more user preferences that the one or more sources for the one or more ingredients were tested for the presence of one or more impurities by acquiring user information that includes at least one or more user preferences that one or more sources for the one or more ingredients were tested for presence of one or more selective bacteria as illustrated in FIG. 6F. For instance, the user impurity testing preference obtaining module 420 of the customized food preparation system 10a or 10b of FIG. 3A or 3B (or of the network control system 12a or 12b of FIG. 3D or 3E) acquiring the user information that includes at least the one or more user preferences that the one or more sources for the one or more ingredients were tested for the presence of one or more impurities by acquiring or obtaining user information that includes at least one or more user preferences that one or more sources (e.g., harvest batch, farms, domestic animals, and so forth) for the one or more ingredients were tested for presence of one or more selective bacteria.

As further illustrated in FIG. 6F, operation 627 may actually include or involve one or more additional operations including, in some cases, an operation 628 for acquiring the user information that includes at least the one or more user preferences that the one or more sources for the one or more ingredients were tested for the presence of the one or more selective bacteria by acquiring user information that includes one or more user preferences that the one or more sources for the one or more ingredients were tested to confirm that the one or more selective bacteria are present in the one or more sources at below one or more predefined levels. For instance, the user impurity testing preference obtaining module 420 of the customized food preparation system 10a or 10b of FIG. 3A or 3B (or of the network control system 12a or 12b of FIG. 3D or 3E) acquiring the user information that includes at least the one or more user preferences that the one or more sources for the one or more ingredients were tested for the presence of the one or more selective bacteria by acquiring or obtaining user information that includes one or more user preferences that the one or more sources for the one or more ingredients were tested to confirm that the one or more selective bacteria are present in the one or more sources (e.g., batch milk) at below one or more predefined levels (e.g., less than 1×108 cells/mL).

In the same or alternative implementations, operation 627 may additionally or alternatively include an operation 629 for acquiring the user information that includes at least the one or more user preferences that the one or more sources for the one or more ingredients were tested for the presence of one or more selective bacteria by acquiring user information that includes one or more user preferences that the one or more sources for the one or more ingredients were tested for the presence of the one or more selective bacteria within one or more predefined amounts of time from when the one or more ingredients were harvested from the one or more sources. For instance, the user impurity testing preference obtaining module 420 of the customized food preparation system 10a or 10b of FIG. 3A or 3B (or of the network control system 12a or 12b of FIG. 3D or 3E) acquiring the user information that includes at least the one or more user preferences that the one or more sources for the one or more ingredients were tested for the presence of one or more selective bacteria by acquiring or obtaining user information that includes one or more user preferences that the one or more sources (e.g., chicken or milk batch) for the one or more ingredients were tested for the presence of the one or more selective bacteria within one or more predefined amounts of time (e.g., one week) from when the one or more ingredients were harvested (e.g., slaughter of a chicken or drawing milk from a milk batch) from the one or more sources (e.g., chicken or milk batch).

In the same or alternative implementations, operation 627 may additionally or alternatively include an operation 630 for acquiring the user information that includes at least the one or more user preferences that the one or more sources for the one or more ingredients were tested for the presence of one or more selective bacteria, the one or more selective bacteria including at least one of *enterococcus, E. coli, campylobacter, klebsiella pneumoniae, salmonella,* or *staphylococcus aureus*. For instance, the user impurity testing preference obtaining module 420 of the customized food preparation system 10a or 10b of FIG. 3A or 3B (or of the network control system 12a or 12b of FIG. 3D or 3E) acquiring the user information that includes at least the one or more user preferences that the one or more sources for the one or more ingredients were tested for the presence (or absence) of one or more selective bacteria, the one or more selective bacteria including at least one of *enterococcus, E. coli, campylobacter, klebsiella pneumoniae, salmonella,* or *staphylococcus aureus*.

Figure 6G:
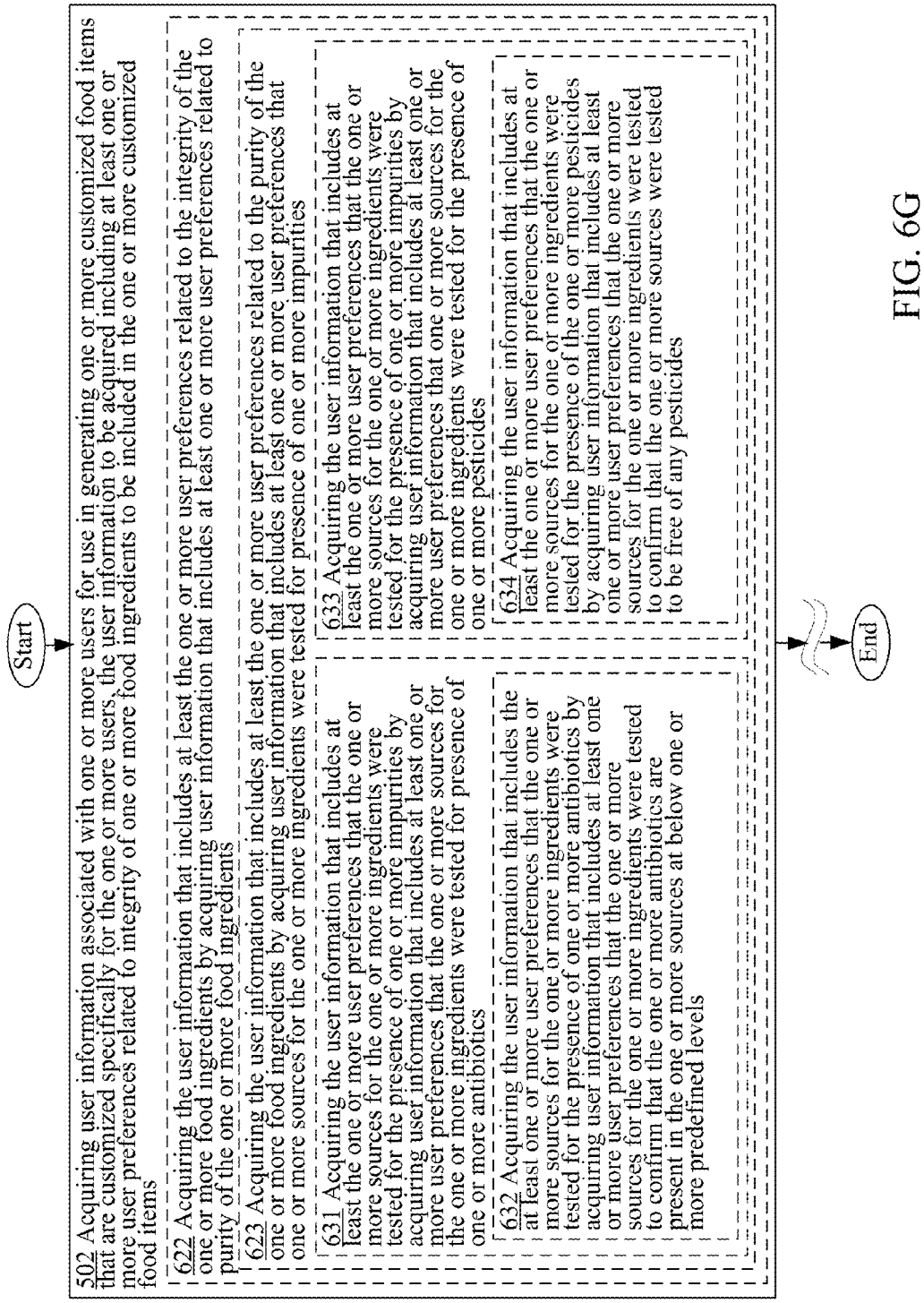
FIG. 6G is a high-level logic flowchart of a process depicting alternate implementations of the user information acquiring operation 502 of FIG. 5.

Referring now to FIG. 6G, in various implementations, operation 623 may include an operation 631 for acquiring the user information that includes at least the one or more user preferences that the one or more sources for the one or more ingredients were tested for the presence of one or more impurities by acquiring user information that includes at least one or more user preferences that the one or more sources for the one or more ingredients were tested for presence of one or more antibiotics. For instance, the user impurity testing preference obtaining module 420 of the customized food preparation system 10a or 10b of FIG. 3A or 3B (or of the network control system 12a or 12b of FIG. 3D or 3E) acquiring the user information that includes at least the one or more user preferences that the one or more sources for the one or more ingredients were tested for the presence of one or more impurities by acquiring or obtaining user information that includes at least one or more user preferences that the one or more sources (e.g., domesticated cow or cow herd, sheep, chicken batch, milk batch, and so forth) for the one or more ingredients (e.g., meat, milk, cheese, eggs, and so forth) were tested for presence of one or more antibiotics.

As further illustrated in FIG. 6G, in some cases, operation 631 may further include an operation 632 for acquiring the user information that includes the at least one or more user preferences that the one or more sources for the one or more ingredients were tested for the presence of one or more antibiotics by acquiring user information that includes at least one or more user preferences that the one or more sources for the one or more ingredients were tested to confirm that the one or more antibiotics are present in the one or more sources at below one or more predefined levels. For instance, the user impurity testing preference obtaining module 420 of the customized food preparation system 10a or 10b of FIG. 3A or 3B (or of the network control system 12a or 12b of FIG. 3D or 3E) acquiring the user information that includes the at least one or more user preferences that the one or more sources for the one or more ingredients were tested for the presence of one or more antibiotics by acquiring or obtaining user information that includes at least one or more user preferences that the one or more sources (e.g., slaughtered pig) for the one or more ingredients (e.g., pork) were tested to confirm that the one or more antibiotics are present in the one or more sources at below one or more predefined levels (e.g., a user may accept an ingredient if it does not contain levels of antibiotics that are greater than a certain predefined amount).

In various implementations, operation 623 may include an operation 633 for acquiring the user information that includes at least the one or more user preferences that the one or more sources for the one or more ingredients were tested for the presence of one or more impurities by acquiring user information that includes at least one or more user preferences that one or more sources for the one or more ingredients were tested for presence of one or more pesticides. For instance, the user impurity testing preference obtaining module 420 of the customized food preparation system 10a or 10b of FIG. 3A or 3B (or of the network control system 12a or 12b of FIG. 3D or 3E) acquiring the user information that includes at least the one or more user preferences that the one or more sources for the one or more ingredients were tested for the presence of one or more impurities by acquiring or obtaining user information that includes at least one or more user preferences that one or more sources (e.g., flour batch) for the one or more ingredients (e.g., flour) were tested for presence of one or more pesticides.

In some cases, operation 633 may, in turn, further include an operation 634 for acquiring the user information that includes at least the one or more user preferences that the one or more sources for the one or more ingredients were tested for the presence of the one or more pesticides by acquiring user information that includes at least one or more user preferences that the one or more sources for the one or more ingredients were tested to confirm that the one or more sources were tested to be free of any pesticides. For instance, the user impurity testing preference obtaining module 420 of the customized food preparation system 10a or 10b of FIG. 3A or 3B (or of the network control system 12a or 12b of FIG. 3D or 3E) acquiring the user information that includes at least the one or more user preferences that the one or more sources for the one or more ingredients were tested for the presence of the one or more pesticides by acquiring or obtaining user information that includes at least one or more user preferences that the one or more sources (e.g., vegetable crop) for the one or more ingredients (e.g., vegetable) were tested to confirm that the one or more sources were tested to be free of any pesticides.

Figure 6H:
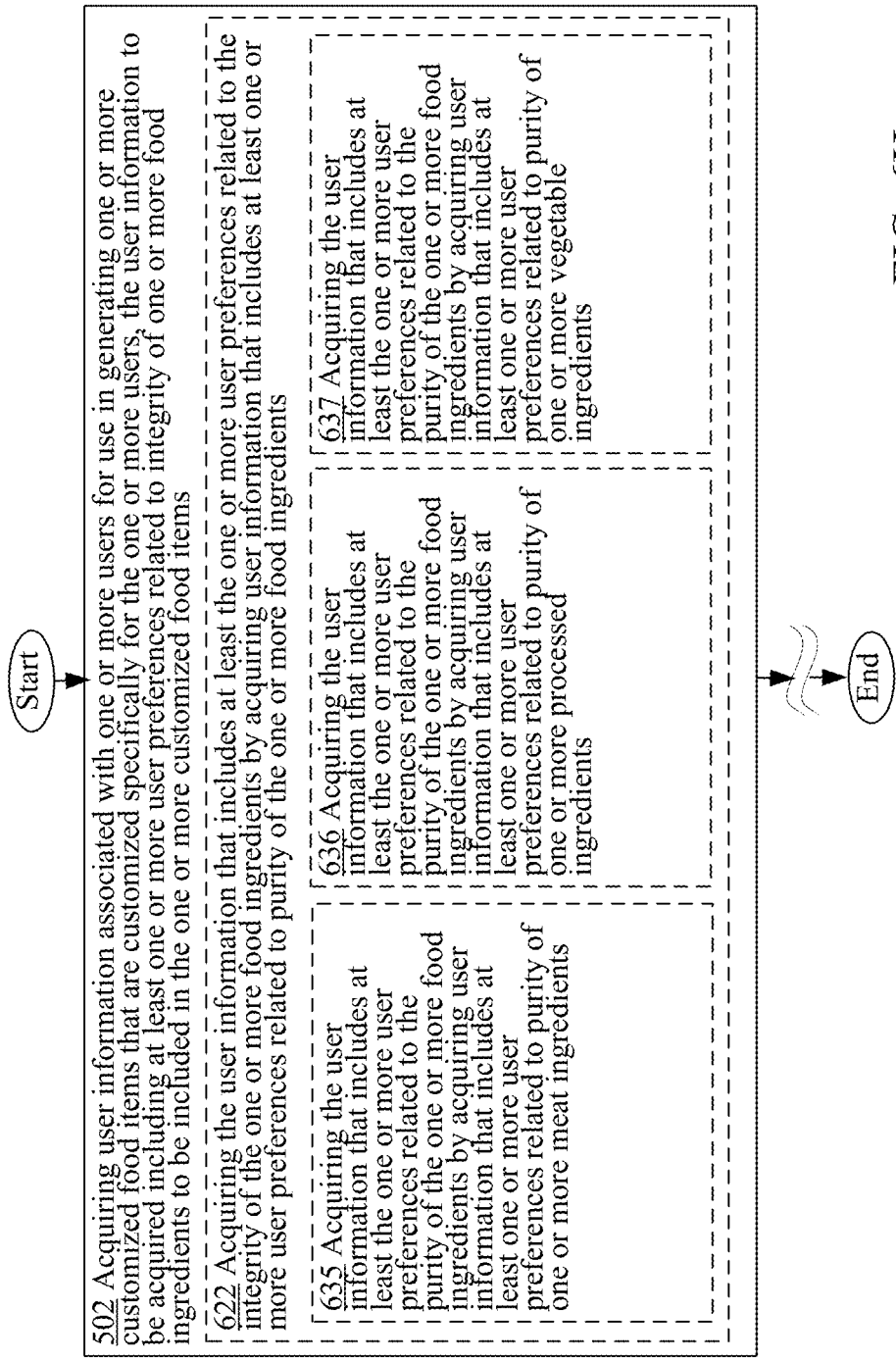
FIG. 6H is a high-level logic flowchart of a process depicting alternate implementations of the user information acquiring operation 502 of FIG. 5.

Turning now to FIG. 6H, in various implementations, operation 622 for acquiring the user information that includes at least the one or more user preferences related to the integrity of the one or more food ingredients by acquiring user information that includes at least one or more user preferences related to purity of the one or more food ingredients may actually include or involve an operation 635 for acquiring the user information that includes at least the one or more user preferences related to the purity of the one or more food ingredients by acquiring user information that includes at least one or more user preferences related to purity of one or more meat ingredients. For instance, the user purity preference obtaining module 418 of the customized food preparation system 10a or 10b of FIG. 3A or 3B (or of the network control system 12a or 12b of FIG. 3D or 3E) acquiring the user information that includes at least the one or more user preferences related to the purity of the one or more food ingredients by acquiring user information that includes at least one or more user preferences related to purity of one or more meat ingredients (e.g., beef, pork, poultry, fish, and so forth).

In some implementations, operation 622 may include an operation 636 for acquiring the user information that includes at least the one or more user preferences related to the purity of the one or more food ingredients by acquiring user information that includes at least one or more user preferences related to purity of one or more processed ingredients. For instance, the user purity preference obtaining module 418 of the customized food preparation system 10a or 10b of FIG. 3A or 3B (or of the network control system 12a or 12b of FIG. 3D or 3E) acquiring the user information that includes at least the one or more user preferences related to the purity of the one or more food ingredients by acquiring or obtaining user information that includes at least one or more user preferences related to purity of one or more processed ingredients (e.g., flour, sugar, cheese, milk, and so forth).

In some implementations, operation 622 may include an operation 637 for acquiring the user information that includes at least the one or more user preferences related to the purity of the one or more food ingredients by acquiring user information that includes at least one or more user preferences related to purity of one or more vegetable ingredients. For instance, the user purity preference obtaining module 418 of the customized food preparation system 10a or 10b of FIG. 3A or 3B (or of the network control system 12a or 12b of FIG. 3D or 3E) acquiring the user information that includes at least the one or more user preferences related to the purity of the one or more food ingredients by acquiring or obtaining user information that includes at least one or more user preferences (e.g., user preference that only vegetable grown without pesticides be used) related to purity of one or more vegetable ingredients (e.g., carrots, peas, alfalfa sprouts, spinach, and so forth).

Figure 6J:
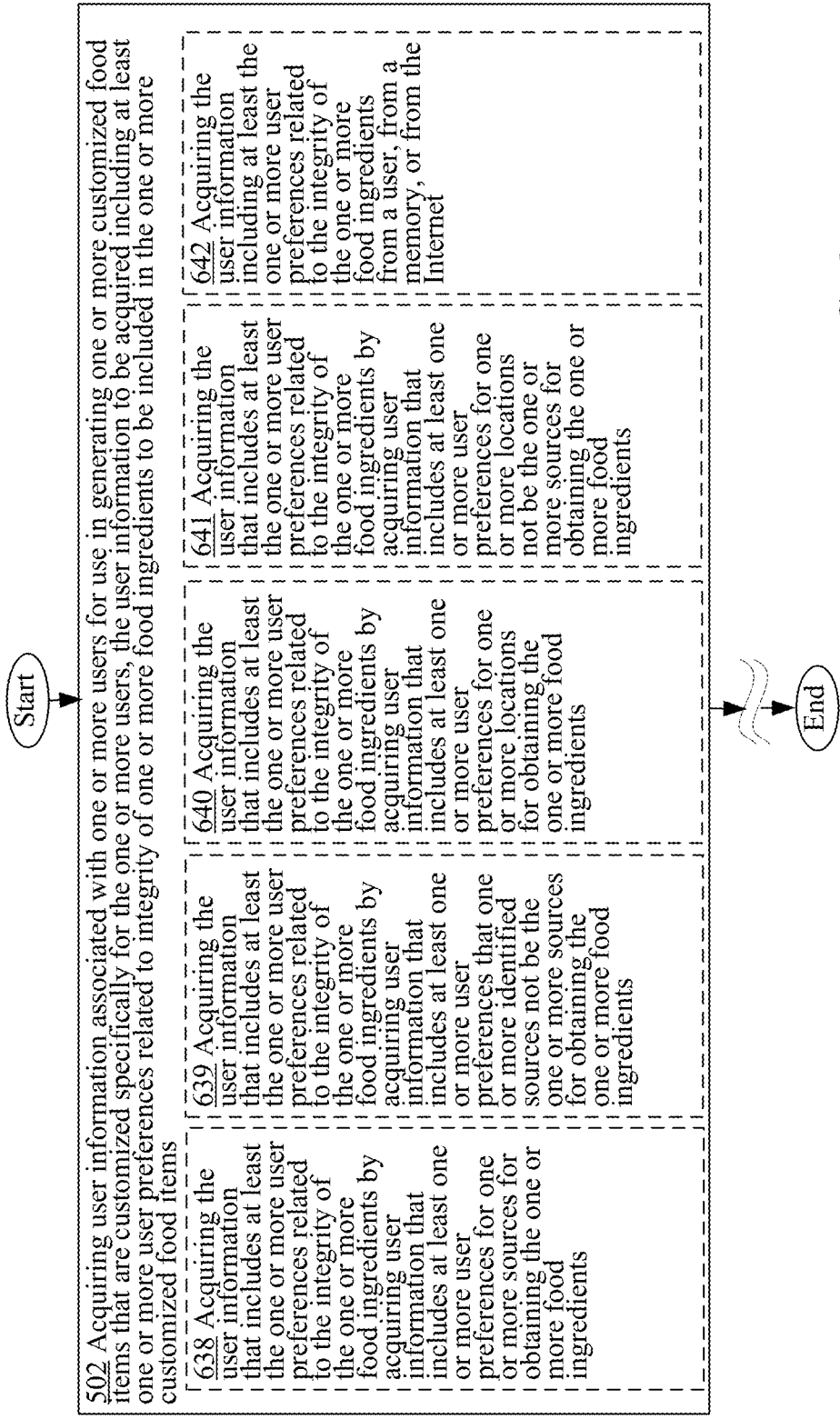
FIG. 6J is a high-level logic flowchart of a process depicting alternate implementations of the user information acquiring operation 502 of FIG. 5.

Referring now to FIG. 6J, in some implementations, the user information acquiring operation 502 of FIG. 5 may actually include or involve an operation 638 for acquiring the user information that includes at least the one or more user preferences related to the integrity of the one or more food ingredients by acquiring user information that includes at least one or more user preferences for one or more sources for obtaining the one or more food ingredients. For instance, the user information obtaining module 302* including the user source preference obtaining module 422 (see FIG. 4A) of the customized food preparation system 10a or 10b of FIG. 3A or 3B (or of the network control system 12a or 12b of FIG. 3D or 3E) acquiring the user information that includes at least the one or more user preferences related to the integrity of the one or more food ingredients by having the user source preference obtaining module 422 acquire or obtain user information that includes at least one or more user preferences for one or more sources (e.g., Tyson's chicken, C & H sugar, Meadow Gold, and so forth) for obtaining the one or more food ingredients (e.g., chicken, sugar, milk, and so forth).

In the same or alternative implementations, the user information acquiring operation 502 may actually include or involve an operation 639 for acquiring the user information that includes at least the one or more user preferences related to the integrity of the one or more food ingredients by acquiring user information that includes at least one or more user preferences that one or more identified sources not be the one or more sources for obtaining the one or more food ingredients. For instance, the user information obtaining module 302* including the user source preference obtaining module 422 of the customized food preparation system 10a or 10b of FIG. 3A or 3B (or of the network control system 12a or 12b of FIG. 3D or 3E) acquiring the user information that includes at least the one or more user preferences related to the integrity of the one or more food ingredients by having the user source preference obtaining module 422 acquire or obtain user information that includes at least one or more user preferences that one or more identified sources (e.g., Tyson's farms) not be the one or more sources for obtaining the one or more food ingredients (e.g., chicken meat).

In the same or alternative implementations, the user information acquiring operation 502 may actually include or involve an operation 640 for acquiring the user information that includes at least the one or more user preferences related to the integrity of the one or more food ingredients by acquiring user information that includes at least one or more user preferences for one or more locations for obtaining the one or more food ingredients. For instance, the user information obtaining module 302* including the user location preference obtaining module 424 (see FIG. 4A) of the customized food preparation system 10a or 10b of FIG. 3A or 3B (or of the network control system 12a or 12b of FIG. 3D or 3E) acquiring the user information that includes at least the one or more user preferences related to the integrity of the one or more food ingredients by having the user location preference obtaining module 424 acquire or obtain user information that includes at least one or more user preferences for one or more locations (e.g., Kobe, Japan) for obtaining the one or more food ingredients (e.g., Beef).

In the same or alternative implementations, the user information acquiring operation 502 may actually include or involve an operation 641 for acquiring the user information that includes at least the one or more user preferences related to the integrity of the one or more food ingredients by acquiring user information that includes at least one or more user preferences for one or more locations not be the one or more sources for obtaining the one or more food ingredients. For instance, the user information obtaining module 302* including the user location preference obtaining module 424 of the customized food preparation system 10a or 10b of FIG. 3A or 3B (or of the network control system 12a or 12b of FIG. 3D or 3E) acquiring the user information that includes at least the one or more user preferences related to the integrity of the one or more food ingredients by having the user location preference obtaining module 424 acquire or obtain user information that includes at least one or more user preferences for one or more locations (e.g., Britain) not be the one or more sources for obtaining the one or more food ingredients (e.g., Beef).

In the same or alternative implementations, the user information acquiring operation 502 may actually include or involve an operation 642 for acquiring the user information including at least the one or more user preferences related to the integrity of the one or more food ingredients from a user, from a memory, or from the Internet. For instance, the user information obtaining module 302* of the customized food preparation system 10a or 10b of FIG. 3A or 3B (or of the network control system 12a or 12b of FIG. 3D or 3E) acquiring or obtaining the user information including at least the one or more user preferences related to the integrity of the one or more food ingredients from a user, from a memory 340, or from the Internet.

Figure 6K:
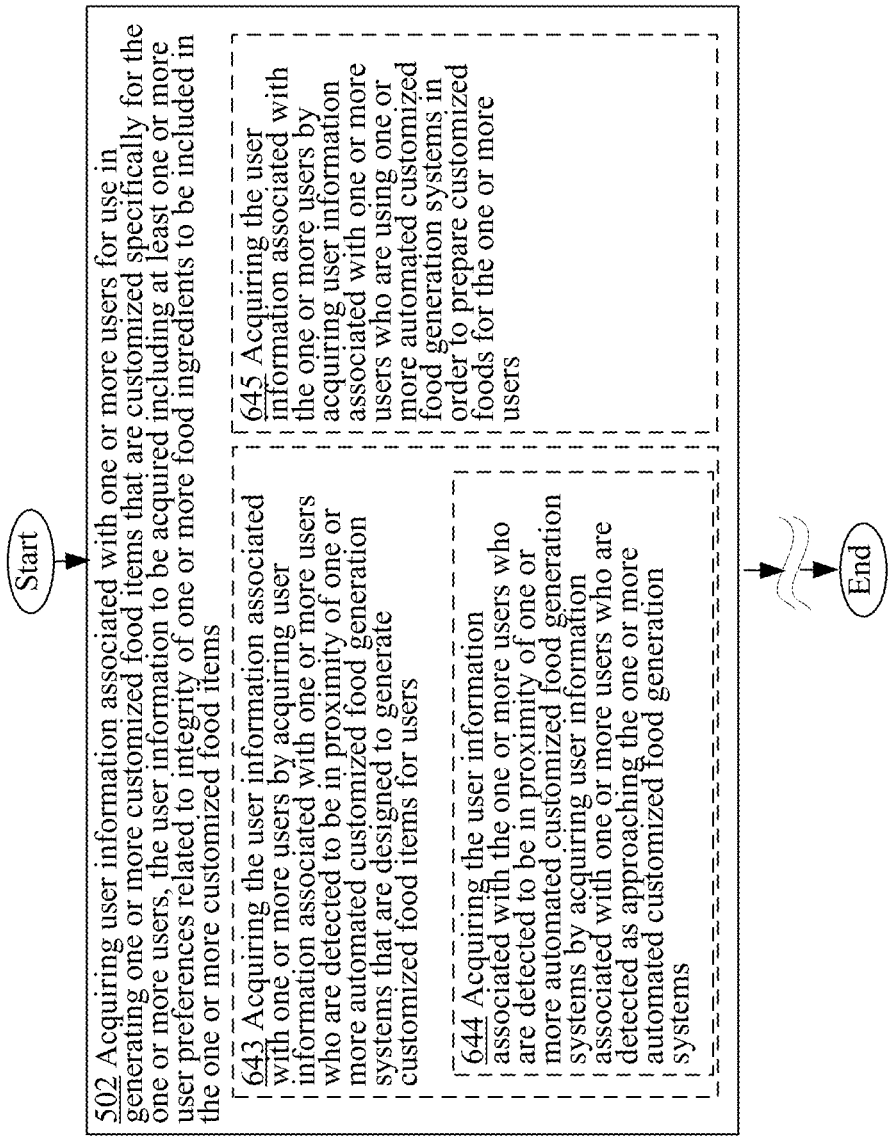
FIG. 6K is a high-level logic flowchart of a process depicting alternate implementations of the user information acquiring operation 502 of FIG. 5.

Turning to FIG. 6K, in some implementations, the user information acquiring operation 502 may include an operation 643 for acquiring the user information associated with one or more users by acquiring user information associated with one or more users who are detected to be in proximity of one or more automated customized food generation systems that are designed to generate customized food items for users. For instance, the user information obtaining module 302* of the customized food preparation system 10a or 10b of FIG. 3A or 3B (or of the network control system 12a or 12b of FIG. 3D or 3E) acquiring the user information associated with one or more users by acquiring or obtaining user information associated with one or more users who are detected by, for example, the user proximity detecting module 308* (see FIG. 3A, 3B, 3D, or 3E) to be in proximity (e.g., within 30 feet) of one or more automated customized food generation systems 10* that are designed to generate customized food items for users. In some cases, the determination as to whether a particular user is in proximity of an automated customized food preparation system 10* may be based on detecting (via GPS) that a mobile device carried by the user is in the proximity and/or approaching the automated customized food preparation system 10*.

Operation 643, in turn, may further include an operation 644 for acquiring the user information associated with the one or more users who are detected to be in proximity of one or more automated customized food generation systems by acquiring user information associated with one or more users who are detected as approaching the one or more automated customized food generation systems. For instance, the user information obtaining module 302* of the customized food preparation system 10a or 10b of FIG. 3A or 3B (or of the network control system 12a or 12b of FIG. 3D or 3E) acquiring the user information associated with the one or more users who are detected to be in proximity of one or more automated customized food generation systems by acquiring or obtaining user information associated with one or more users who are detected by, for example, the user proximity detecting module 308* (see FIG. 3A, 3B, 3D, or 3E) as approaching the one or more automated customized food generation systems 10* that are designed to generated customized food items for users.

In some implementations, the user information acquiring operation 502 may include an operation 645 for acquiring the user information associated with the one or more users by acquiring user information associated with one or more users who are using one or more automated customized food generation systems in order to prepare customized foods for the one or more users. For instance, the user information obtaining module 302* of the customized food preparation system 10a or 10b of FIG. 3A or 3B (or of the network control system 12a or 12b of FIG. 3D or 3E) acquiring the user information associated with the one or more users by acquiring or obtaining user information (e.g., acquire the user information from a mobile device or a Smartcard) associated with one or more users who are using (e.g., engaged with) one or more automated customized food generation systems 10* in order to prepare customized foods for the one or more users.

Figure 6L:
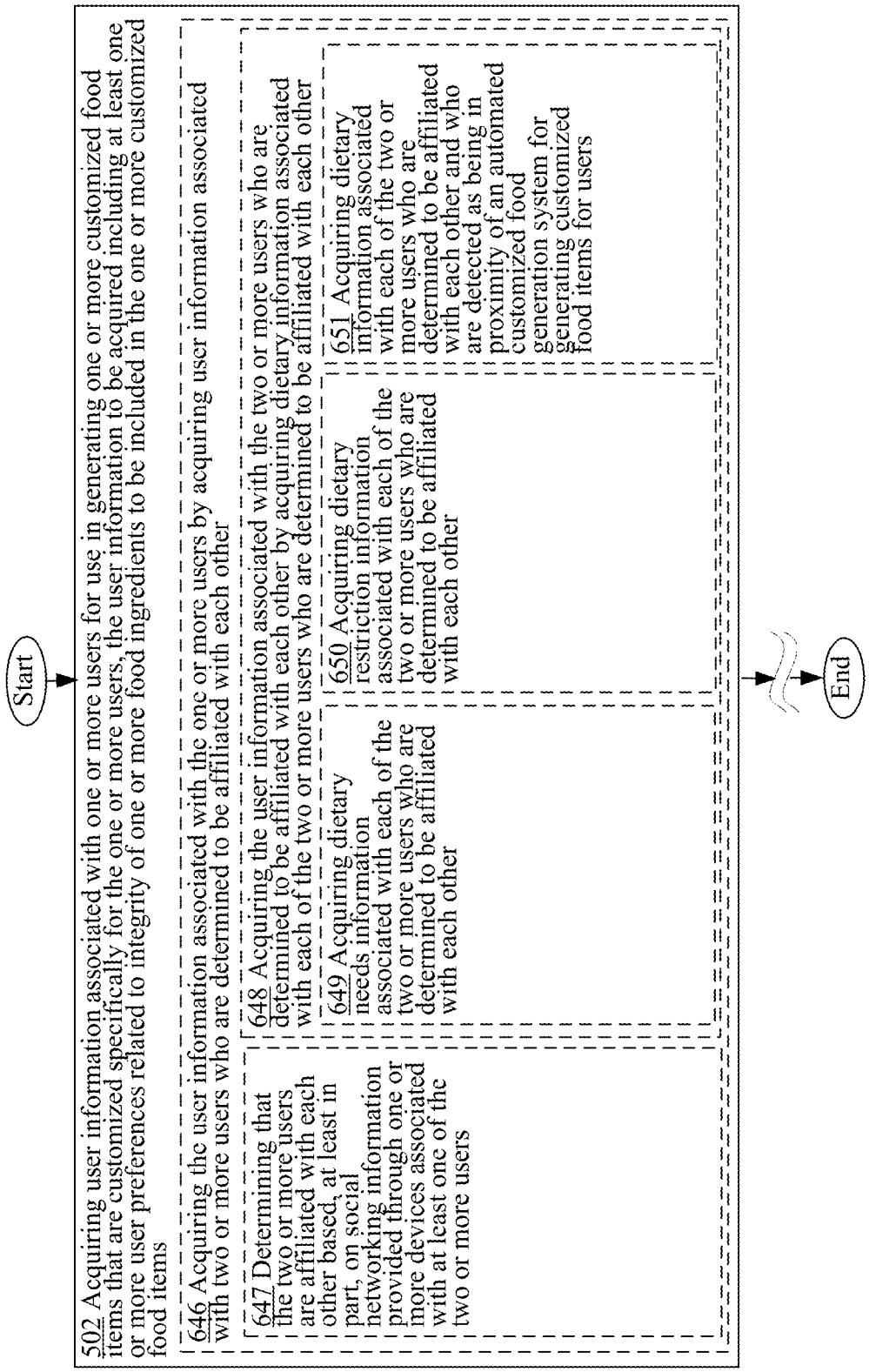
FIG. 6L is a high-level logic flowchart of a process depicting alternate implementations of the user information acquiring operation 502 of FIG. 5.

Referring to FIG. 6L, in various implementations, the user information acquiring operation 502 may include an operation 646 for acquiring the user information associated with the one or more users by acquiring user information associated with two or more users who are determined to be affiliated with each other. For instance, the user information obtaining module 302* including the user affiliated determining module 426 (see FIG. 4A) of the customized food preparation system 10a or 10b of FIG. 3A or 3B (or of the network control system 12a or 12b of FIG. 3D or 3E) acquiring the user information associated with the one or more users by acquiring or obtaining user information associated with two or more users who are determined by, for example, the user affiliated determining module 426 to be affiliated or associated with each other. In some cases, such acquired information may be useful in customizing the information to be, for example, printed on the customized food item 22* including indicating that the customized food item 22* has a peanut ingredient when there is a member of a group of affiliated users that is allergic to peanuts As further illustrated in FIG. 6L, in various implementations operation 646 may include one or more operations including, in some cases, operation 647 for determining that the two or more users are affiliated with each other based, at least in part, on social networking information provided through one or more devices associated with at least one of the two or more users. For instance, the user affiliated determining module 426 of the customized food preparation system 10a or 10b of FIG. 3A or 3B (or of the network control system 12a or 12b of FIG. 3D or 3E) determining that the two or more users are affiliated with each other based, at least in part, on social networking information provided through one or more devices (e.g., Smartphones, Smartcards, and so forth) associated with at least one of the two or more users.

In the same or alternative implementations, operation 646 may additionally or alternatively include an operation 648 for acquiring the user information associated with the two or more users who are determined to be affiliated with each other by acquiring dietary information associated with each of the two or more users who are determined to be affiliated with each other. For instance, the user information obtaining module 302* including the user affiliated determining module 426 of the customized food preparation system 10a or 10b of FIG. 3A or 3B (or of the network control system 12a or 12b of FIG. 3D or 3E) acquiring the user information associated with the two or more users who are determined to be affiliated with each other by acquiring or obtaining dietary information associated with each of the two or more users who are determined by, for example, the user affiliated determining module 426 to be affiliated with each other.

In some cases, operation 648 may further include an operation 649 for acquiring dietary needs information associated with each of the two or more users who are determined to be affiliated with each other. For instance, the user information obtaining module 302* including the user affiliated determining module 426 of the customized food preparation system 10a or 10b of FIG. 3A or 3B (or of the network control system 12a or 12b of FIG. 3D or 3E) acquiring or obtaining dietary needs information (e.g., high fiber requirements, vitamin C or D requirements, and so forth) associated with each of the two or more users who are determined by, for example, the user affiliated determining module 426 to be affiliated with each other.

In the same or different implementations, operation 648 may additionally or alternatively include an operation 650 for acquiring dietary restriction information associated with each of the two or more users who are determined to be affiliated with each other. For instance, the user information obtaining module 302* including the user affiliated determining module 426 of the customized food preparation system 10a or 10b of FIG. 3A or 3B (or of the network control system 12a or 12b of FIG. 3D or 3E) acquiring or obtaining dietary restriction information (e.g., sugar restrictions, salt restrictions, dairy restrictions, and so forth) associated with each of the two or more users who are determined by, for example, the user affiliated determining module 426 to be affiliated with each other.

In the same or different implementations, operation 648 may additionally or alternatively include an operation 651 for acquiring dietary information associated with each of the two or more users who are determined to be affiliated with each other and who are detected as being in proximity of an automated customized food generation system for generating customized food items for users. For instance, the user information obtaining module 302* of the customized food preparation system 10a or 10b of FIG. 3A or 3B (or of the network control system 12a or 12b of FIG. 3D or 3E) acquiring dietary information associated with each of the two or more users who are determined to be affiliated with each other and who are detected by, for example, the user proximity detecting module 308*, as being in proximity (e.g., within 15, 20, or 30 feet) of an automated customized food preparation system 10* for generating customized food items 22* for users.

Referring back to the customized food item generation directing operation 504 of FIG. 5, the customized food item generation directing operation 504 similar to the user information acquiring operation 502 of FIG. 5 may be executed in a number of different ways in various alternative embodiments as illustrated, for example, in FIGS. 7A, 7B, 7C, 7D, 7E, 7F, 7G, 7H, 7J, and 7K. In some cases, for example, the customized food item generation directing operation 504 may actually include or involve an operation 752 for directing the generation of the one or more customized food items that show the one or more visual indicators that provide the customized information by providing one or more instructions for generating the one or more customized food items that have been customized to show the one or more visual indicators that provide the customized information. For instance, the customized food item generation controlling module 304* including the instruction providing module 428 (see FIG. 4B) of the customized food preparation system 10a or 10b of FIG. 3A or 3B (or of the network control system 12a or 12b of FIG. 3D or 3E) directing the generation of the one or more customized food items that show the one or more visual indicators that provide the customized information by having the instruction providing module 428 provide to, for example, one or more automated customized food preparation systems 10* or the components of such systems one or more instructions for generating the one or more customized food items 22* that have been customized (e.g., marked or printed) to show the one or more visual indicators (e.g., printed text) that provide the customized information (e.g., customization information, ingredient information, purity information, and so forth).

In some implementations, the customized food item generation directing operation 504 may include an operation 753 for directing the generation of the one or more customized food items that show the one or more visual indicators that provide the customized information by controlling one or more components of one or more automated customized food generation systems to generate the one or more customized food items that display the one or more visual indicators that provide the customized information. For instance, the customized food item generation controlling module 304* including the component controlling module 430 (see FIG. 4B) of the customized food preparation system 10a or 10b of FIG. 3A or 3B (or of the network control system 12a or 12b of FIG. 3D or 3E) directing the generation of the one or more customized food items 22* that show the one or more visual indicators 204* that provide the customized information by having the component controlling module 430 control one or more components of one or more automated customized food generation systems 10* to generate the one or more customized food items 22* that display the one or more visual indicators 204* that provide the customized information.

In some implementations, the customized food item generation directing operation 504 may include an operation 754 for directing the generation of the one or more customized food items that show the one or more visual indicators that provide the customized information, the one or more visual indicators being in the form of one or more images, icons, and/or text. For instance, the customized food item generation controlling module 304* of the customized food preparation system 10a or 10b of FIG. 3A or 3B (or of the network control system 12a or 12b of FIG. 3D or 3E) directing or controlling the generation of the one or more customized food items 22* that show the one or more visual indicators 204* that provide the customized information (e.g., textual information indicating ingredient information related to the one or more customized food items 22*, the one or more visual indicators 204* being in the form of one or more images, icons, and/or text. Note that although the example visual indicators 204* in FIGS. 2A, 2B, 2C, 2D, 2E, 2F, and 2G are in textual form, those of ordinary skill in the art will recognize that such visual indicators 204* may alternatively be in the form of images and/or icons.

Figure 7A:
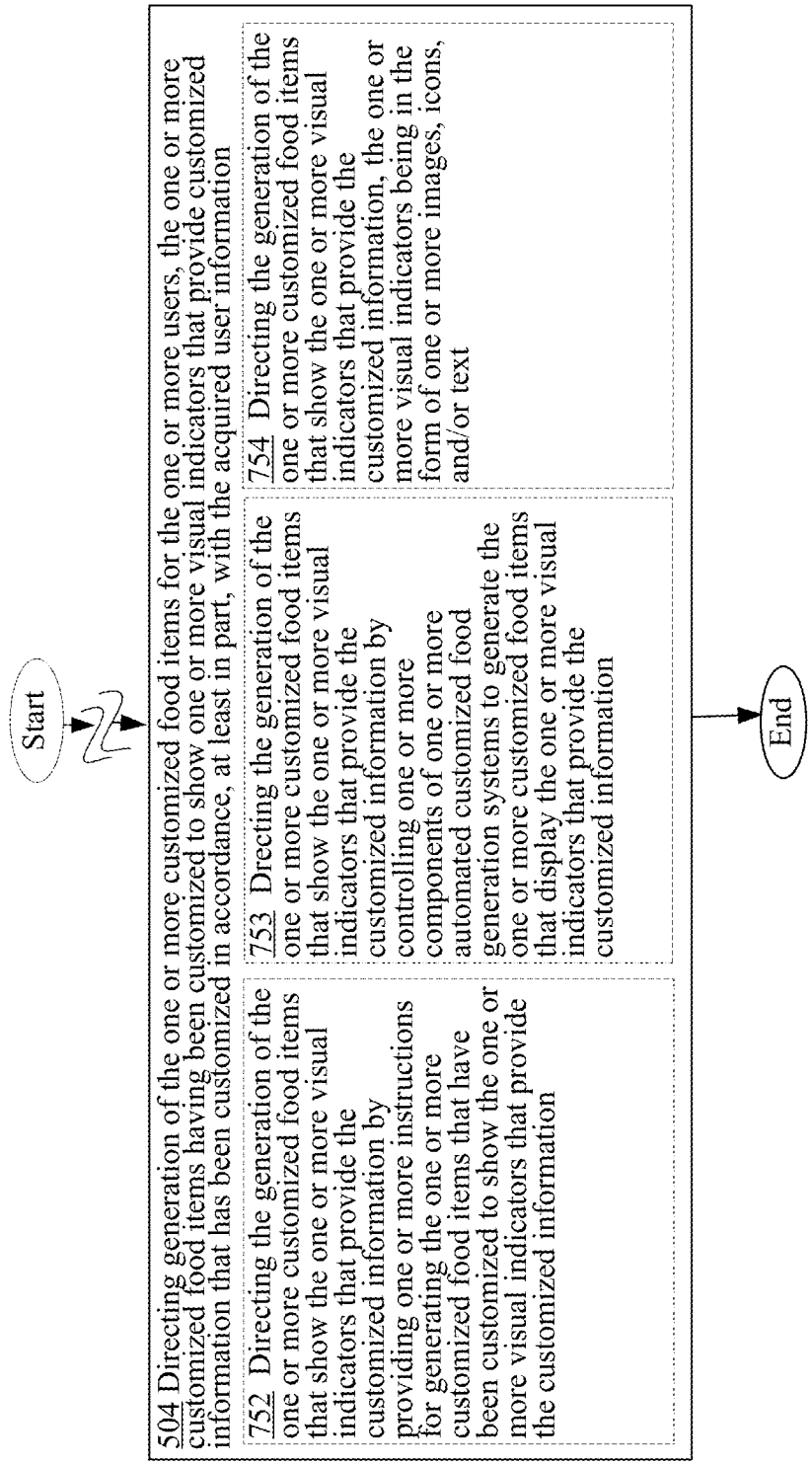
FIG. 7A is a high-level logic flowchart of a process depicting alternate implementations of the customized food item generation directing operation 504 of FIG. 5.
Figure 7B:
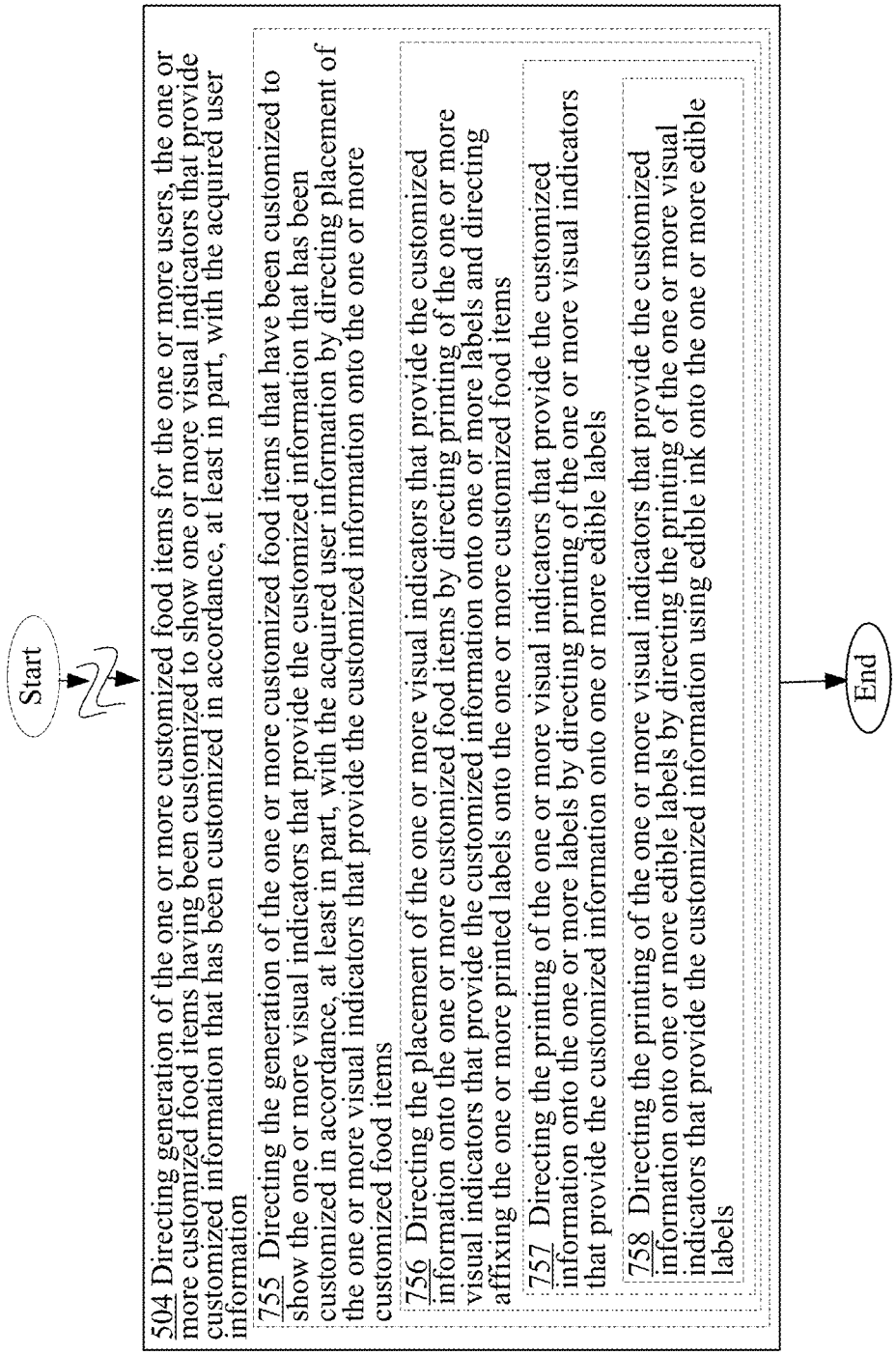
FIG. 7B is a high-level logic flowchart of a process depicting alternate implementations of the customized food item generation directing operation 504 of FIG. 5.

Various techniques may be employed in order to place visual indicators 204* onto customized food items 22* in various alternative implementations, For example, and referring now to FIG. 7B, in various implementations, the customized food item generation directing operation 504 of FIG. 5 may include or involve an operation 755 for directing the generation of the one or more customized food items that have been customized to show the one or more visual indicators that provide the customized information that has been customized in accordance, at least in part, with the acquired user information by directing placement of the one or more visual indicators that provide the customized information onto the one or more customized food items. For instance, the customized food item generation controlling module 304* including the visual indicator placement controlling module 432 (see FIG. 4B) of the customized food preparation system 10a or 10b of FIG. 3A or 3B (or of the network control system 12a or 12b of FIG. 3D or 3E) directing the generation of the one or more customized food items 22* that have been customized to show the one or more visual indicators 204* that provide the customized information that has been customized in accordance, at least in part, with the acquired user information by having the visual indicator placement controlling module 432 direct or control placement of the one or more visual indicators 204* that provide the customized information onto the one or more customized food items 22*.

As further illustrated in FIG. 7B, operation 755 may, in turn, further include an operation 756 for directing the placement of the one or more visual indicators that provide the customized information onto the one or more customized food items by directing printing of the one or more visual indicators that provide the customized information onto one or more labels and directing affixing the one or more printed labels onto the one or more customized food items. For instance, the visual indicator placement controlling module 432 including the label printing controlling module 434 and the label affixing controlling module 436 (see FIG. 4B) of the customized food preparation system 10a or 10b of FIG. 3A or 3B (or of the network control system 12a or 12b of FIG. 3D or 3E) directing the placement of the one or more visual indicators 204* that provide the customized information onto the one or more customized food items 22* by having the label printing controlling module 434 direct or control printing of the one or more visual indicators 204a (see FIG. 2A) that provide the customized information onto one or more labels 202 and having the label affixing controlling module 436 direct or control affixing the one or more printed labels 202 onto the one or more customized food items 22a. In some embodiments, the one or more labels 202 may be printed with the visual indicators 204* after the one or more labels 202 have already been affixed onto the one or more customized food items 22a.

In some cases, operation 756 may include or involve an operation 757 for directing the printing of the one or more visual indicators that provide the customized information onto the one or more labels by directing printing of the one or more visual indicators that provide the customized information onto one or more edible labels. For instance, the label printing controlling module 434 of the customized food preparation system 10a or 10b of FIG. 3A or 3B (or of the network control system 12a or 12b of FIG. 3D or 3E) directing the printing of the one or more visual indicators 204a that provide the customized information onto the one or more labels 202 by directing or controlling printing of the one or more visual indicators 204a that provide the customized information onto one or more edible labels (e.g., edible paper such as rice paper or other types of edible paper made of starches and/or sugars).

In some cases, operation 757 may, in turn, further include an operation 758 for directing the printing of the one or more visual indicators that provide the customized information onto one or more edible labels by directing the printing of the one or more visual indicators that provide the customized information using edible ink onto the one or more edible labels. For instance, the label printing controlling module 434 of the customized food preparation system 10a or 10b of FIG. 3A or 3B (or of the network control system 12a or 12b of FIG. 3D or 3E) directing the printing of the one or more visual indicators 204a that provide the customized information onto one or more edible labels (e.g., label 202) by directing or controlling the printing of the one or more visual indicators 204a that provide the customized information using edible ink (e.g., food coloring, onto the one or more edible labels.

Figure 7C:
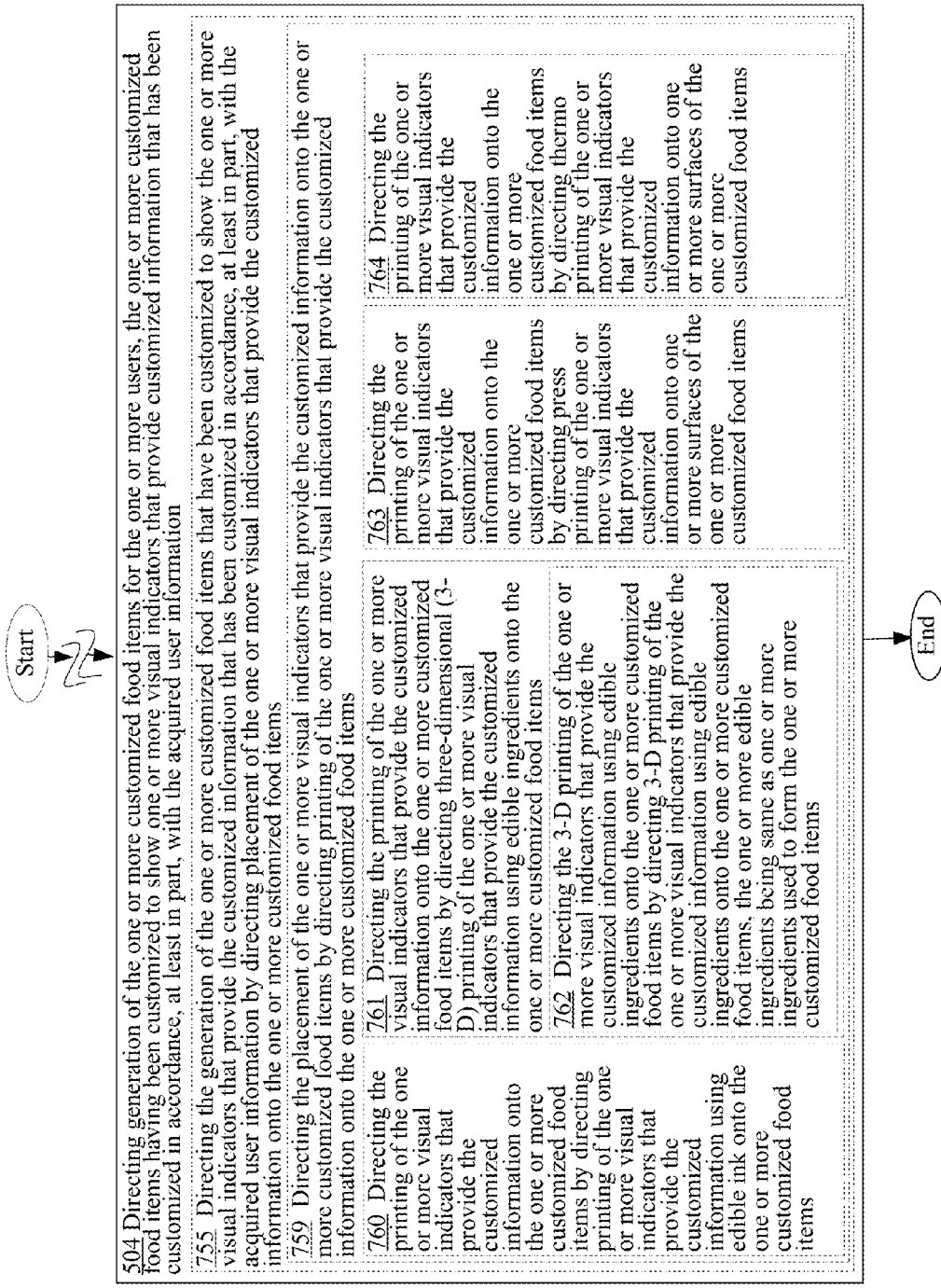
FIG. 7C is a high-level logic flowchart of a process depicting alternate implementations of the customized food item generation directing operation 504 of FIG. 5.

Turning now to FIG. 7C, in some implementations, operation 755 for directing or controlling the placement of the one or more visual indicators onto the one or more customized food items may actually include or involve an operation 759 for directing the placement of the one or more visual indicators that provide the customized information onto the one or more customized food items by directing printing of the one or more visual indicators that provide the customized information onto the one or more customized food items. For instance, the visual indicator placement controlling module 432 including the customized food item printing controlling module 438 (see FIG. 4B) of the customized food preparation system 10a or 10b of FIG. 3A or 3B (or of the network control system 12a or 12b of FIG. 3D or 3E) directing the placement of the one or more visual indicators 204* that provide the customized information onto the one or more customized food items 22* by having the customized food item printing controlling module 438 direct or control the direct printing of the one or more visual indicators 204* (e.g., visual indicators 204b, 204c, 204d, or 204g of FIG. 2B, 2C, 2D, or 2G) that provide the customized information onto the one or more customized food items 22* (e.g., customized food item 22a or 22g of FIG. 2B, 2C, 2D, or 2G).

In some implementations, operation 759 may include or involve an operation 760 for directing the printing of the one or more visual indicators that provide the customized information onto the one or more customized food items by directing printing of the one or more visual indicators that provide the customized information using edible ink onto the one or more customized food items. For instance, the customized food item printing controlling module 438 including the customized food item ink printing controlling module 440 (see FIG. 4B) of the customized food preparation system 10a or 10b of FIG. 3A or 3B (or of the network control system 12a or 12b of FIG. 3D or 3E) directing the printing of the one or more visual indicators 204* that provide the customized information onto the one or more customized food items 22* by having the customized food item ink printing controlling module 440 direct or control printing of the one or more visual indicators 204* that provide the customized information using edible ink onto the one or more customized food items 22*.

In some implementations, operation 759 may actually include or involve an operation 761 for directing the printing of the one or more visual indicators that provide the customized information onto the one or more customized food items by directing three-dimensional (3-D) printing of the one or more visual indicators that provide the customized information using edible ingredients onto the one or more customized food items. For instance, the customized food item printing controlling module 438 including the customized food item 3-D printing controlling module 442 (see FIG. 4B) of the customized food preparation system 10*a* or 10*b* of FIG. 3A or 3B (or of the network control system 12*a* or 12*b* of FIG. 3D or 3E) directing the printing of the one or more visual indicators 204* that provide the customized information onto the one or more customized food items 22* by having the customized food item 3-D printing controlling module 442 direct or control three-dimensional (3-D) printing of the one or more visual indicators 204*d* (see FIG. 2D) that provide the customized information using edible ingredients onto the one or more customized food items (e.g., customized food item 22*a* of FIG. 2D).

In some implementations, operation 761 may actually include or involve an operation 762 for directing the 3-D printing of the one or more visual indicators that provide the customized information using edible ingredients onto the one or more customized food items by directing 3-D printing of the one or more visual indicators that provide the customized information using edible ingredients onto the one or more customized food items, the one or more edible ingredients being same as one or more ingredients used to form the one or more customized food items. For instance, the customized food item 3-D printing controlling module 442 of the customized food preparation system 10*a* or 10*b* of FIG. 3A or 3B (or of the network control system 12*a* or 12*b* of FIG. 3D or 3E) directing the 3-D printing of the one or more visual indicators 204*d* (see FIG. 2D) that provide the customized information using edible ingredients onto the one or more customized food items (e.g., customized food item 22*a* of FIG. 2D) by directing 3-D printing of the one or more visual indicators 204*d* that provide the customized information using edible ingredients onto the one or more customized food items (e.g., customized food item 22*a*), the one or more edible ingredients being the same as one or more ingredients used to form the one or more customized food items (e.g., customized food item 22*a*). For example, if the customized food item 22*a* to be generated is an energy bar, then making the visual indicators 204*a* using the ingredients used to make the energy bar.

In some implementations, operation 759 may include an operation 763 for directing the printing of the one or more visual indicators that provide the customized information onto the one or more customized food items by directing press printing of the one or more visual indicators that provide the customized information onto one or more surfaces of the one or more customized food items. For instance, the customized food item printing controlling module 438 including the customized food item press printing controlling module 444 (see FIG. 4B) of the customized food preparation system 10*a* or 10*b* of FIG. 3A or 3B (or of the network control system 12*a* or 12*b* of FIG. 3D or 3E) directing the printing of the one or more visual indicators 204* that provide the customized information onto the one or more customized food items 22* by having the customized food item press printing controlling module 444 direct or control press printing of the one or more visual indicators 204*c* (see FIG. 2C) that provide the customized information onto one or more surfaces of the one or more customized food items 22*a*.

In some implementations, operation 759 may include an operation 764 for directing the printing of the one or more visual indicators that provide the customized information onto the one or more customized food items by directing thermo printing of the one or more visual indicators that provide the customized information onto one or more surfaces of the one or more customized food items. For instance, the customized food item printing controlling module 438 including the customized food item thermo printing controlling module 446 (see FIG. 4B) of the customized food preparation system 10*a* or 10*b* of FIG. 3A or 3B (or of the network control system 12*a* or 12*b* of FIG. 3D or 3E) directing the printing of the one or more visual indicators 204* that provide the customized information onto the one or more customized food items 22* by having the customized food item thermo printing controlling module 446 directs or controls thermo printing of the one or more visual indicators 204*g* (see FIG. 2G) that provide the customized information onto one or more surfaces of the one or more customized food items (e.g., customized food item 22*g* of FIG. 2G).

Various types of information may be provided through the visual indicators 204* placed on the one or more customized food items 22* in various alternative implementations. For example, and referring now to FIGS. 7D and 7E, in some implementations, the customized food item generation directing operation 504 of FIG. 5 may include an operation 765 for directing the generation of the one or more customized food items that have been customized to show the one or more visual indicators that provide customized information that has been customized in accordance, at least in part, with the acquired user information, the customized information to be provided through the one or more visual indicators indicating dietary information of at least one of the one or more users. For instance, the customized food item generation controlling module 304* of the customized food preparation system 10*a* or 10*b* of FIG. 3A or 3B (or of the network control system 12*a* or 12*b* of FIG. 3D or 3E) directing or controlling the generation of the one or more customized food items 22* that have been customized to show the one or more visual indicators 204* that provide customized information that has been customized in accordance, at least in part, with the acquired user information, the customized information to be provided through the one or more visual indicators 204* indicating dietary information (e.g., dietary consumption information, dietary restriction information, dietary needs information, and so forth) of at least one of the one or more users.

Figure 7D:
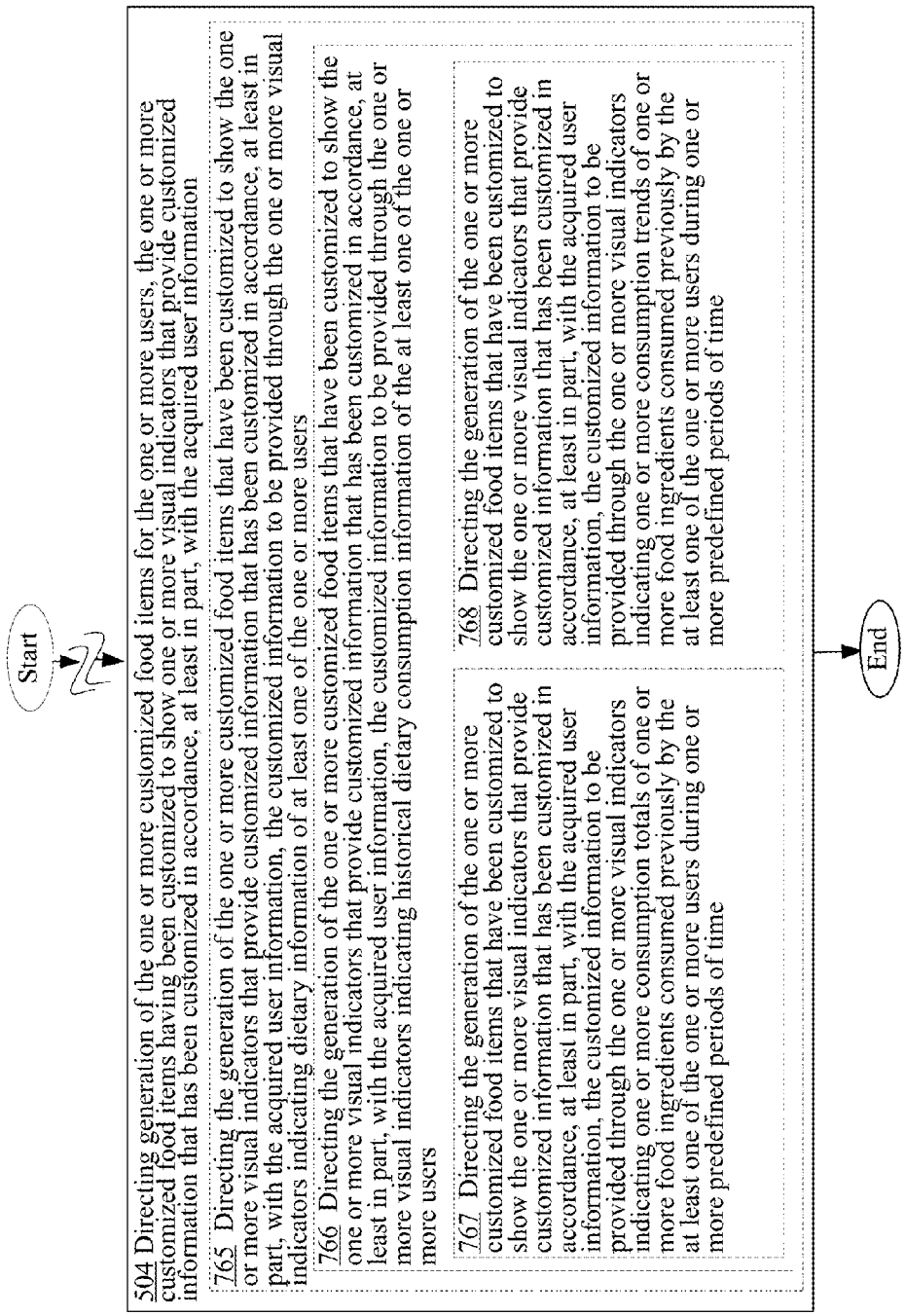
FIG. 7D is a high-level logic flowchart of a process depicting alternate implementations of the customized food item generation directing operation 504 of FIG. 5.

As further illustrated in FIG. 7D, in various implementations, operation 765 may further include an operation 766 for directing the generation of the one or more customized food items that have been customized to show the one or more visual indicators that provide customized information that has been customized in accordance, at least in part, with the acquired user information, the customized information to be provided through the one or more visual indicators indicating historical dietary consumption information of the at least one of the one or more users. For instance, the customized food item generation controlling module 304* of the customized food preparation system 10*a* or 10*b* of FIG. 3A or 3B (or of the network control system 12*a* or 12*b* of FIG. 3D or 3E) directing the generation of the one or more customized food items 22* that have been customized to show the one or more visual indicators 204* that provide customized information that has been customized in accordance, at least in part, with the acquired user information, the customized information to be provided through the one or more visual indicators 204* indicating historical dietary consumption information (e.g., weekly total sugar or sodium consumption amount of a user) of the at least one of the one or more users.

In some implementations, operation 766 may include an operation 767 for directing the generation of the one or more customized food items that have been customized to show the one or more visual indicators that provide customized information that has been customized in accordance, at least in part, with the acquired user information, the customized information to be provided through the one or more visual indicators indicating one or more consumption totals of one or more food ingredients consumed previously by the at least one of the one or more users during one or more predefined periods of time. For instance, the customized food item generation controlling module 304* of the customized food preparation system 10*a* or 10*b* of FIG. 3A or 3B (or of the network control system 12*a* or 12*b* of FIG. 3D or 3E) directing or controlling the generation of the one or more customized food items 22* that have been customized to show the one or more visual indicators 204* that provide customized information that has been customized in accordance, at least in part, with the acquired user information, the customized information to be provided through the one or more visual indicators (see, for example, visual indicators 204*b*, of FIG. 2B, which indicates week sugar consumption total) indicating one or more consumption totals (e.g., sugar, sodium, or carbohydrate consumption, or total daily calorie intake) of one or more food ingredients consumed previously by the at least one of the one or more users during one or more predefined periods of time (e.g., month, week, or day).

In some implementations, operation 766 may include an operation 768 for directing the generation of the one or more customized food items that have been customized to show the one or more visual indicators that provide customized information that has been customized in accordance, at least in part, with the acquired user information, the customized information to be provided through the one or more visual indicators indicating one or more consumption trends of one or more food ingredients consumed previously by the at least one of the one or more users during one or more predefined periods of time. For instance, the customized food item generation controlling module 304* of the customized food preparation system 10*a* or 10*b* of FIG. 3A or 3B (or of the network control system 12*a* or 12*b* of FIG. 3D or 3E) directing or controlling the generation of the one or more customized food items 22* that have been customized to show the one or more visual indicators 204* that provide customized information that has been customized in accordance, at least in part, with the acquired user information, the customized information to be provided through the one or more visual indicators (e.g., visual indicators 204*d* of FIG. 2D, which indicate reduction in carbohydrate consumption) indicating one or more consumption trends of one or more food ingredients consumed previously by the at least one of the one or more users during one or more predefined periods of time.

Figure 7E:
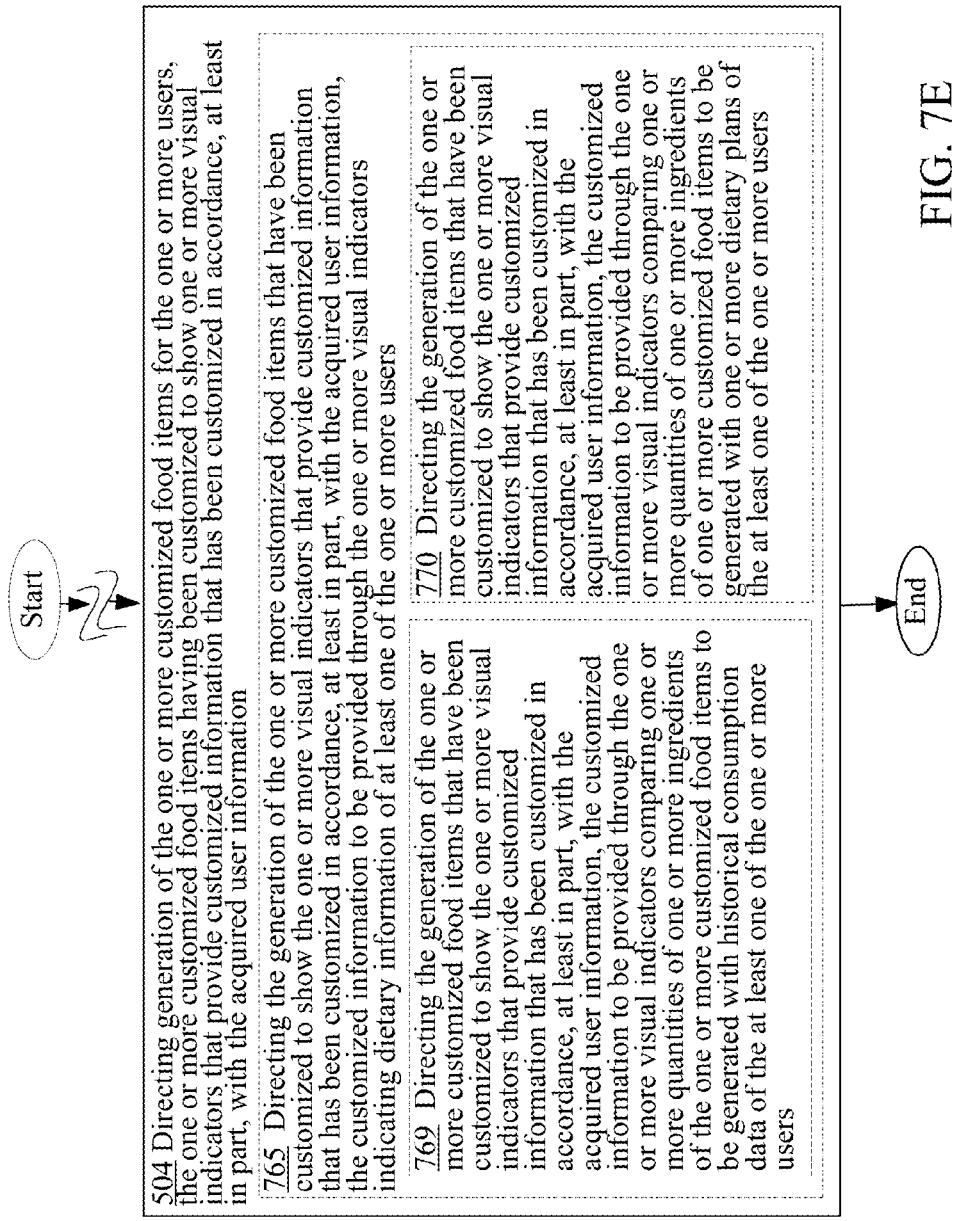
FIG. 7E is a high-level logic flowchart of a process depicting alternate implementations of the customized food item generation directing operation 504 of FIG. 5.

In some cases, operation 765 may actually include or involve an operation 769 for directing the generation of the one or more customized food items that have been customized to show the one or more visual indicators that provide customized information that has been customized in accordance, at least in part, with the acquired user information, the customized information to be provided through the one or more visual indicators comparing one or more quantities of one or more ingredients of the one or more customized food items to be generated with historical consumption data of the at least one of the one or more users as illustrated in FIG. 7E. For instance, the customized food item generation controlling module 304* of the customized food preparation system 10*a* or 10*b* of FIG. 3A or 3B (or of the network control system 12*a* or 12*b* of FIG. 3D or 3E) directing or controlling the generation of the one or more customized food items 22* that have been customized to show the one or more visual indicators 204* that provide customized information that has been customized in accordance, at least in part, with the acquired user information, the customized information to be provided through the one or more visual indicators 204* comparing one or more quantities of one or more ingredients of the one or more customized food items 22* to be generated with historical consumption data of the at least one of the one or more users. For example, providing visual indicators 204* onto a customized food item 22* that compares the sugar content of the customized food item 22* with previous sugar consumption data of the user.

In some implementations, operation 765 may include an operation 770 for directing the generation of the one or more customized food items that have been customized to show the one or more visual indicators that provide customized information that has been customized in accordance, at least in part, with the acquired user information, the customized information to be provided through the one or more visual indicators comparing one or more quantities of one or more ingredients of one or more customized food items to be generated with one or more dietary plans of the at least one of the one or more users. For instance, the customized food item generation controlling module 304* of the customized food preparation system 10*a* or 10*b* of FIG. 3A or 3B (or of the network control system 12*a* or 12*b* of FIG. 3D or 3E) directing or controlling the generation of the one or more customized food items 22* that have been customized to show the one or more visual indicators 204* that provide customized information that has been customized in accordance, at least in part, with the acquired user information, the customized information to be provided through the one or more visual indicators 204* comparing one or more quantities of one or more ingredients of one or more customized food items 22* to be generated with one or more dietary plans of the at least one of the one or more users.

In various implementations, the customized food item generation directing operation 504 of FIG. 5 may include an operation 771 for directing the generation of the one or more customized food items that have been customized to show the one or more visual indicators that provide customized information that has been customized in accordance, at least in part, with the acquired user information, the customized information to be provided through the one or more visual indicators identifying one or more ingredients included in the one or more customized food items to be generated. For instance, the customized food item generation controlling module 304* of the customized food preparation system 10*a* or 10*b* of FIG. 3A or 3B (or of the network control system 12*a* or 12*b* of FIG. 3D or 3E) directing or controlling the generation of the one or more customized food items 22* that have been customized to show the one or more visual indicators 204* that provide customized information that has been customized in accordance, at least in part, with the acquired user information, the customized information to be provided through the one or more visual indicators (e.g., visual indicators 204*a*, 204*b*, 204*c*, 204*d*, or 204*g* of FIG. 2A, 2B, 2C, 2D, or 2G) identifying one or more ingredients included in the one or more customized food items (e.g., customized food item 22*a* or 22*g* of FIG. 2A, 2B, 2C, 2D, or 2G) to be generated.

Figure 7F:
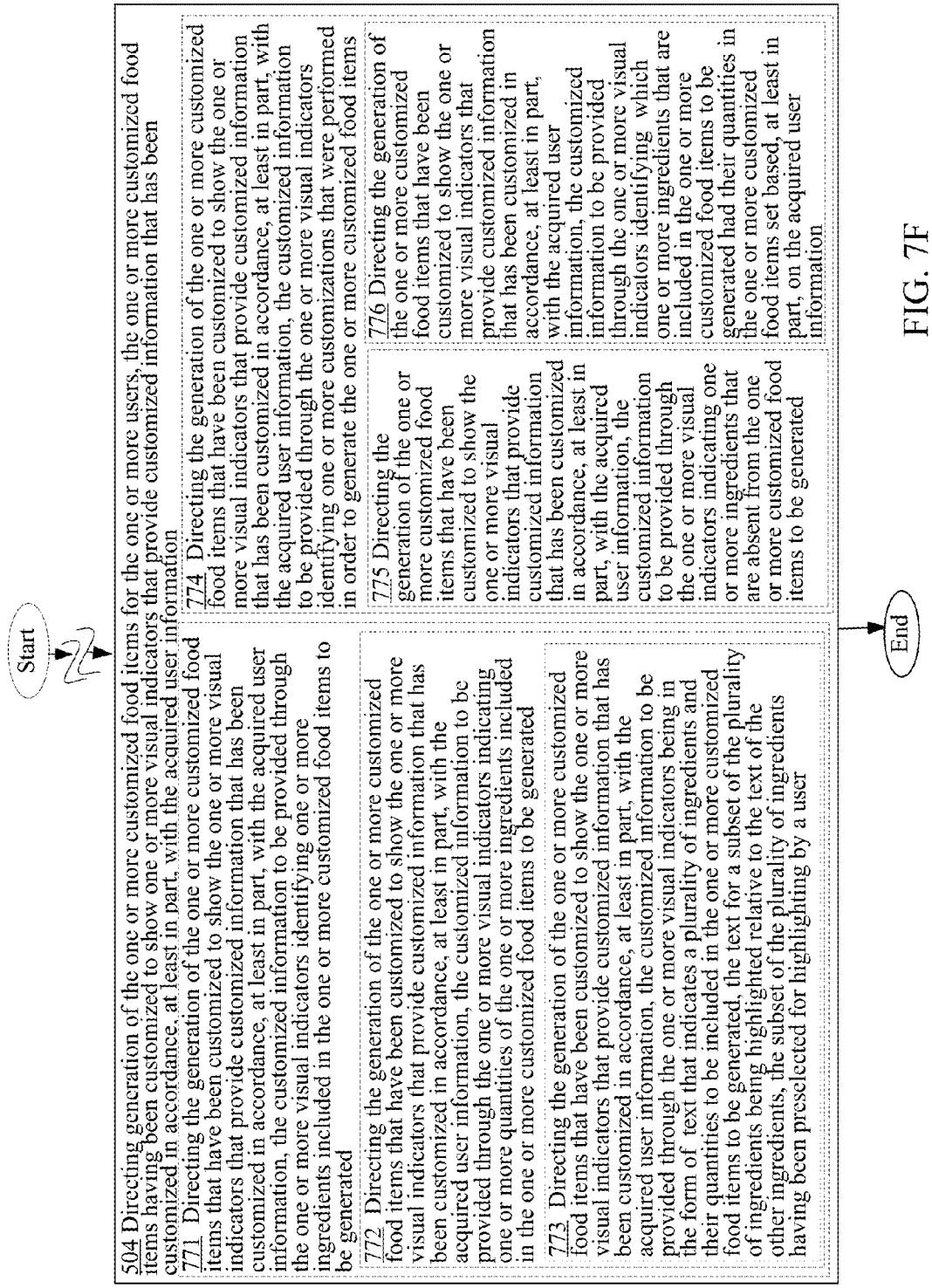
FIG. 7F is a high-level logic flowchart of a process depicting alternate implementations of the customized food item generation directing operation 504 of FIG. 5.

As further illustrated in FIG. 7F, in some implementations, operation 771 may further include an operation 772 for directing the generation of the one or more customized food items that have been customized to show the one or more visual indicators that provide customized information that has been customized in accordance, at least in part, with the acquired user information, the customized information to be provided through the one or more visual indicators indicating one or more quantities of the one or more ingredients included in the one or more customized food items to be generated. For instance, the customized food item generation controlling module 304* of the customized food preparation system 10a or 10b of FIG. 3A or 3B (or of the network control system 12a or 12b of FIG. 3D or 3E) directing or controlling the generation of the one or more customized food items 22* that have been customized to show the one or more visual indicators that provide customized information that has been customized in accordance, at least in part, with the acquired user information, the customized information to be provided through the one or more visual indicators (e.g., visual indicator 204c of FIG. 2C, which indicate ingredient quantities) indicating one or more quantities of the one or more ingredients included in the one or more customized food items (e.g., customized food item 22a of FIG. 2C) to be generated.

As further illustrated in FIG. 7F, in some cases, operation 772 may further include or involve an operation 773 for directing the generation of the one or more customized food items that have been customized to show the one or more visual indicators that provide customized information that has been customized in accordance, at least in part, with the acquired user information, the customized information to be provided through the one or more visual indicators being in the form of text that indicates a plurality of ingredients and their quantities to be included in the one or more customized food items to be generated, the text for a subset of the plurality of ingredients being highlighted relative to the text of the other ingredients, the subset of the plurality of ingredients having been preselected for highlighting by a user. For instance, the customized food item generation controlling module 304* of the customized food preparation system 10a or 10b of FIG. 3A or 3B (or of the network control system 12a or 12b of FIG. 3D or 3E) directing or controlling the generation of the one or more customized food items (e.g., customized food item 22a of FIG. 2C) that have been customized to show the one or more visual indicators (e.g., visual indicators 204c of FIG. 2C) that provide customized information that has been customized in accordance, at least in part, with the acquired user information, the customized information (e.g., ingredients and ingredient quantities) to be provided through the one or more visual indicators (e.g., visual indicators 204c) being in the form of text that indicates a plurality of ingredients and their quantities to be included in the one or more customized food items (e.g., customized food item 22a) to be generated, the text for a subset of the plurality of ingredients being highlighted (e.g., the sugar and milk ingredients being highlighted in FIG. 2C) relative to the text of the other ingredients, the subset of the plurality of ingredients having been preselected for highlighting by a user.

In various implementations, the customized food item generation directing operation 504 of FIG. 5 may include an operation 774 for directing the generation of the one or more customized food items that have been customized to show the one or more visual indicators that provide customized information that has been customized in accordance, at least in part, with the acquired user information, the customized information to be provided through the one or more visual indicators identifying one or more customizations that were performed in order to generate the one or more customized food items. For instance, the customized food item generation controlling module 304* of the customized food preparation system 10a or 10b of FIG. 3A or 3B (or of the network control system 12a or 12b of FIG. 3D or 3E) directing or controlling the generation of the one or more customized food items 22* that have been customized to show the one or more visual indicators 204* that provide customized information that has been customized in accordance, at least in part, with the acquired user information, the customized information to be provided through the one or more visual indicators identifying one or more (ingredient addition or subtraction, or extra heating or cooling) customizations that were performed in order to generate the one or more customized food items 22a.

In some implementations, operation 774 may include an operation 775 for directing the generation of the one or more customized food items that have been customized to show the one or more visual indicators that provide customized information that has been customized in accordance, at least in part, with the acquired user information, the customized information to be provided through the one or more visual indicators indicating one or more ingredients that are absent from the one or more customized food items to be generated. For instance, the customized food item generation controlling module 304* of the customized food preparation system 10a or 10b of FIG. 3A or 3B (or of the network control system 12a or 12b of FIG. 3D or 3E) directing or controlling the generation of the one or more customized food items (e.g., customized food item 22a of FIG. 2A) that have been customized to show the one or more visual indicators (e.g., visual indicators 204a of FIG. 2A) that provide customized information that has been customized in accordance, at least in part, with the acquired user information, the customized information to be provided through the one or more visual indicators (e.g., visual indicators 204a) indicating one or more ingredients that are absent (e.g., "No Peanuts" as illustrated in FIG. 2A) from the one or more customized food items (e.g., customized food item 22a) to be generated.

In the same or alternative implementations, operation 774 may additionally or alternatively include an operation 776 for directing the generation of the one or more customized food items that have been customized to show the one or more visual indicators that provide customized information that has been customized in accordance, at least in part, with the acquired user information, the customized information to be provided through the one or more visual indicators identifying which one or more ingredients that are included in the one or more customized food items to be generated had their quantities in the one or more customized food items set based, at least in part, on the acquired user information. For instance, the customized food item generation controlling module 304* of the customized food preparation system 10a or 10b of FIG. 3A or 3B (or of the network control system 12a or 12b of FIG. 3D or 3E) directing or controlling the generation of the one or more customized food items 22a that have been customized to show the one or more visual indicators 204* that provide customized information that has been customized in accordance, at least in part, with the acquired user information, the customized information to be provided through the one or more visual indicators 204* identifying which one or more ingredients that are included in the one or more customized food items 22* to be generated had their quantities in the one or more customized food items 22* set based, at least in part, on the acquired user information.

Figure 7G:
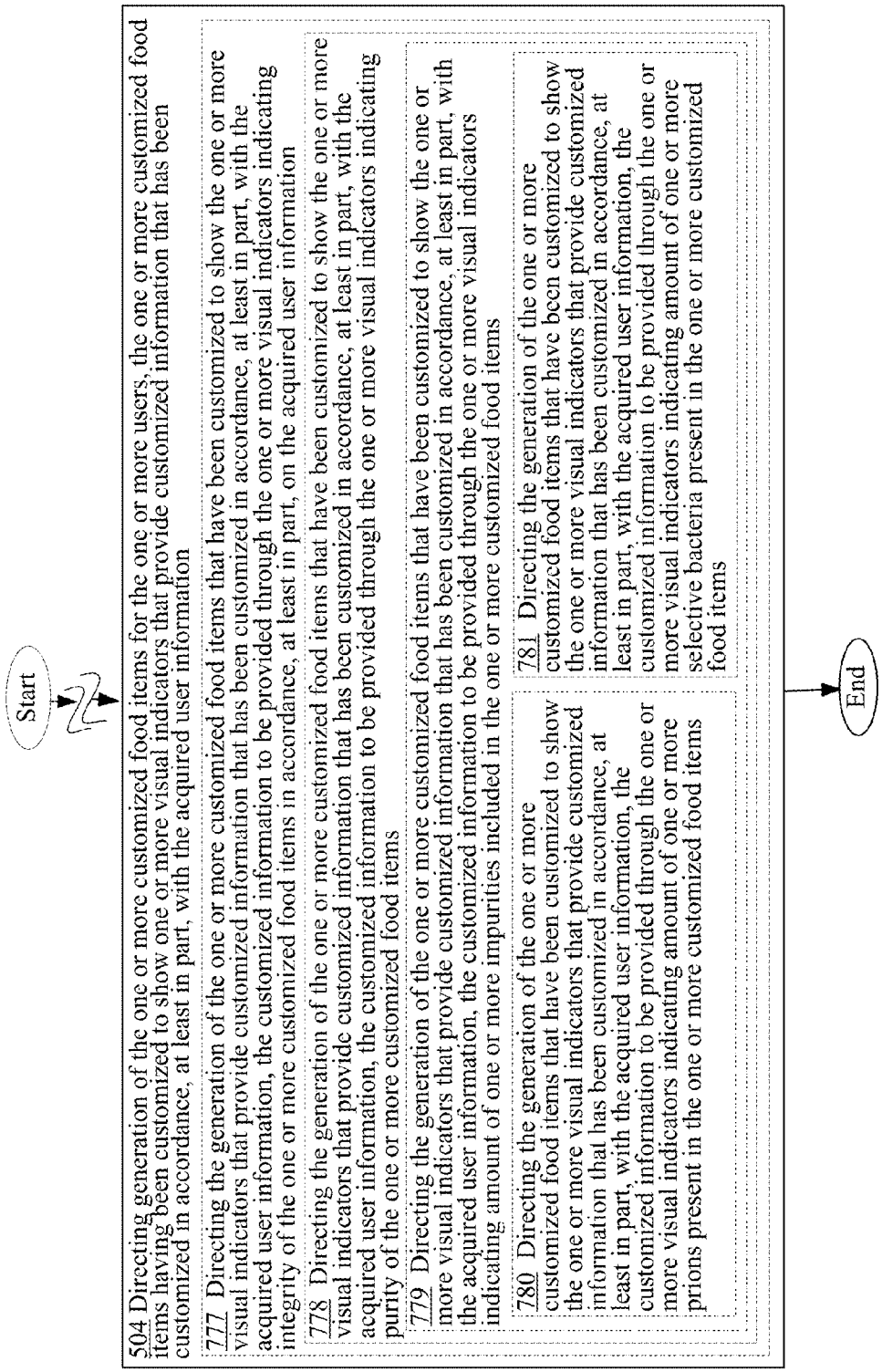
FIG. 7G is a high-level logic flowchart of a process depicting alternate implementations of the customized food item generation directing operation 504 of FIG. 5.

Referring now to FIG. 7G, in various implementations, the customized food item generation directing operation 504 of FIG. 5 may actually include an operation 777 for directing the generation of the one or more customized food items that have been customized to show the one or more visual indicators that provide customized information that has been customized in accordance, at least in part, with the acquired user information, the customized information to be provided through the one or more visual indicators indicating integrity of the one or more customized food items in accordance, at least in part, on the acquired user information. For instance, the customized food item generation controlling module 304* of the customized food preparation system 10a or 10b of FIG. 3A or 3B (or of the network control system 12a or 12b of FIG. 3D or 3E) directing or controlling the generation of the one or more customized food items 22* that have been customized to show the one or more visual indicators 204* that provide customized information that has been customized in accordance, at least in part, with the acquired user information, the customized information to be provided through the one or more visual indicators 204* indicating integrity (e.g., purity, ingredient source integrity, and so forth) of the one or more customized food items 22* in accordance, at least in part, on the acquired user information (e.g., in accordance with one or more user preferences).

As further illustrated in FIG. 7G, in various implementations, operation 777 may include one or more additional operations including, in some cases, an operation 778 for directing the generation of the one or more customized food items that have been customized to show the one or more visual indicators that provide customized information that has been customized in accordance, at least in part, with the acquired user information, the customized information to be provided through the one or more visual indicators indicating purity of the one or more customized food items. For instance, the customized food item generation controlling module 304* of the customized food preparation system 10a or 10b of FIG. 3A or 3B (or of the network control system 12a or 12b of FIG. 3D or 3E) directing the generation of the one or more customized food items 22* that have been customized to show the one or more visual indicators 204* that provide customized information that has been customized in accordance, at least in part, with the acquired user information, the customized information to be provided through the one or more visual indicators 204* indicating purity (e.g., cleanliness, free of impurities or contaminants, and so forth) of the one or more customized food items 22*.

In various implementations, operation 778 may further include an operation 779 for directing the generation of the one or more customized food items that have been customized to show the one or more visual indicators that provide customized information that has been customized in accordance, at least in part, with the acquired user information, the customized information to be provided through the one or more visual indicators indicating amount of one or more impurities included in the one or more customized food items. For instance, the customized food item generation controlling module 304* of the customized food preparation system 10a or 10b of FIG. 3A or 3B (or of the network control system 12a or 12b of FIG. 3D or 3E) directing or controlling the generation of the one or more customized food items 22* that have been customized to show the one or more visual indicators 204* that provide customized information that has been customized in accordance, at least in part, with the acquired user information, the customized information to be provided through the one or more visual indicators 204* indicating the amount of one or more impurities (e.g., Bacteria, virus, pesticides, and so forth) included in the one or more customized food items 22*. Note that the amount of the one or more impurities that may be indicated may be zero (e.g., "no pesticides").

In some implementations, operation 779 may include an operation 780 for directing the generation of the one or more customized food items that have been customized to show the one or more visual indicators that provide customized information that has been customized in accordance, at least in part, with the acquired user information, the customized information to be provided through the one or more visual indicators indicating amount of one or more prions present in the one or more customized food items. For instance, the customized food item generation controlling module 304* of the customized food preparation system 10a or 10b of FIG. 3A or 3B (or of the network control system 12a or 12b of FIG. 3D or 3E) directing or controlling the generation of the one or more customized food items (e.g., customized food item 22a of FIG. 2B) that have been customized to show the one or more visual indicators (e.g., visual indicators 204b of FIG. 2B) that provide customized information that has been customized in accordance, at least in part, with the acquired user information, the customized information to be provided through the one or more visual indicators (e.g., visual indicators 204b) indicating the amount (e.g., zero) of one or more prions present in the one or more customized food items (e.g., customized food item 22a).

In the same or alternative implementations, operation 779 may additionally or alternatively include an operation 781 for directing the generation of the one or more customized food items that have been customized to show the one or more visual indicators that provide customized information that has been customized in accordance, at least in part, with the acquired user information, the customized information to be provided through the one or more visual indicators indicating amount of one or more selective bacteria present in the one or more customized food items. For instance, the customized food item generation controlling module 304* of the customized food preparation system 10a or 10b of FIG. 3A or 3B (or of the network control system 12a or 12b of FIG. 3D or 3E) directing or controlling the generation of the one or more customized food items (e.g., customized food item 22g of FIG. 2G) that have been customized to show the one or more visual indicators (e.g., visual indicators 204g of FIG. 2G) that provide customized information that has been customized in accordance, at least in part, with the acquired user information, the customized information to be provided through the one or more visual indicators (e.g., visual indicators 204g) indicating amount of one or more selective bacteria (e.g., "Zero E. coli") present in the one or more customized food items (e.g., customized food item 22g).

Figure 7H:
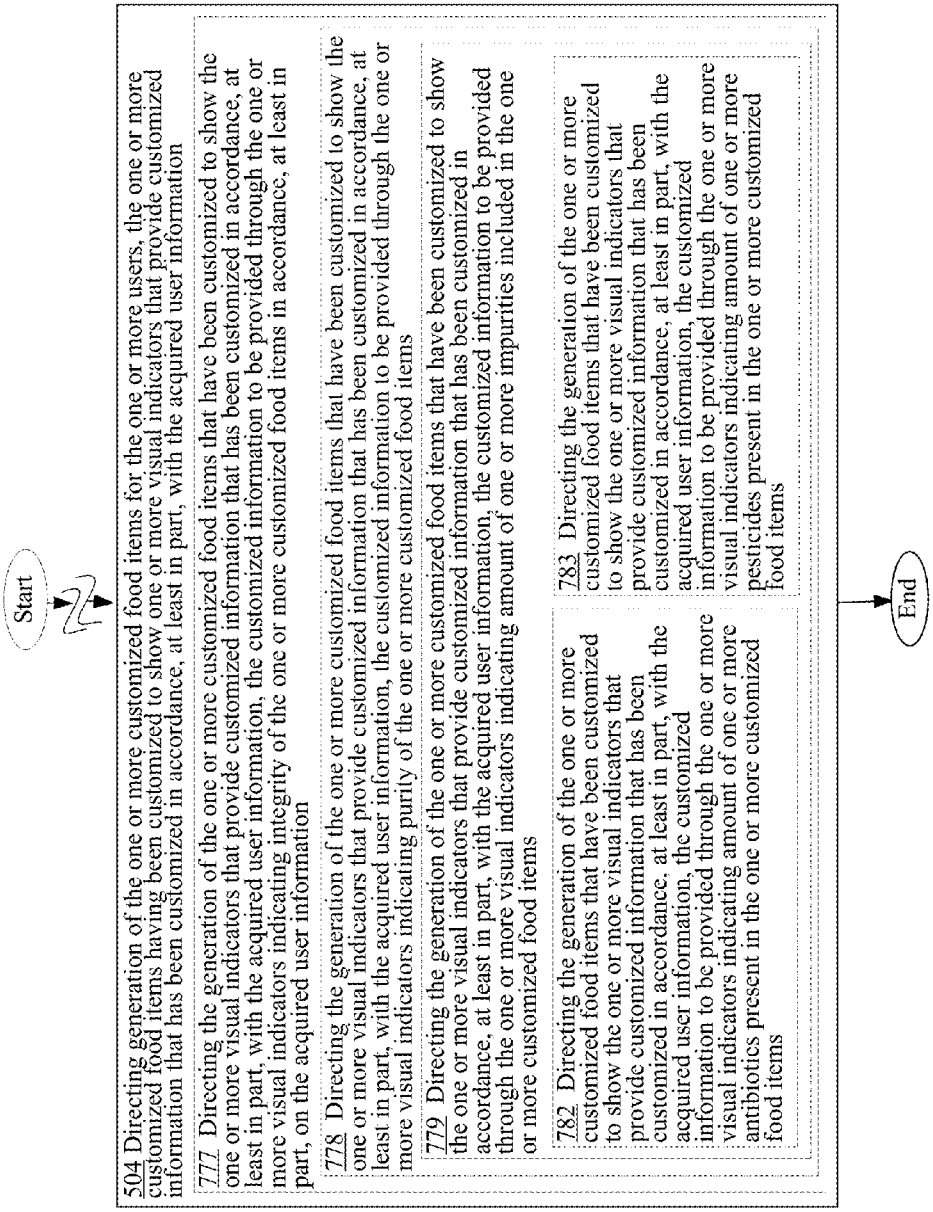
FIG. 7H is a high-level logic flowchart of a process depicting alternate implementations of the customized food item generation directing operation 504 of FIG. 5.

In the same or alternative implementations, operation 779 may additionally or alternatively include an operation 782 for directing the generation of the one or more customized food items that have been customized to show the one or more visual indicators that provide customized information that has been customized in accordance, at least in part, with the acquired user information, the customized information to be provided through the one or more visual indicators indicating amount of one or more antibiotics present in the one or more customized food items as illustrated in FIG. 7H. For instance, the customized food item generation controlling module 304* of the customized food preparation system 10a or 10b of FIG. 3A or 3B (or of the network control system 12a or 12b of FIG. 3D or 3E) directing or controlling the generation of the one or more customized food items 22* that have been customized to show the one or more visual indicators 204* that provide customized information that has been customized in accordance, at least in part, with the acquired user information, the customized information to be provided through the one or more visual indicators 204* indicating amount of one or more antibiotics (e.g., including indicating no antibiotics) present in the one or more customized food items 22*.

In the same or alternative implementations, operation 779 may additionally or alternatively include an operation 783 for directing the generation of the one or more customized food items that have been customized to show the one or more visual indicators that provide customized information that has been customized in accordance, at least in part, with the acquired user information, the customized information to be provided through the one or more visual indicators indicating amount of one or more pesticides present in the one or more customized food items. For instance, the customized food item generation controlling module 304* of the customized food preparation system 10a or 10b of FIG. 3A or 3B (or of the network control system 12a or 12b of FIG. 3D or 3E) directing or controlling the generation of the one or more customized food items 22* that have been customized to show the one or more visual indicators 204* that provide customized information that has been customized in accordance, at least in part, with the acquired user information, the customized information to be provided through the one or more visual indicators 204* indicating amount of one or more pesticides (e.g., including indicating no pesticide) present in the one or more customized food items 22*.

Figure 7J:
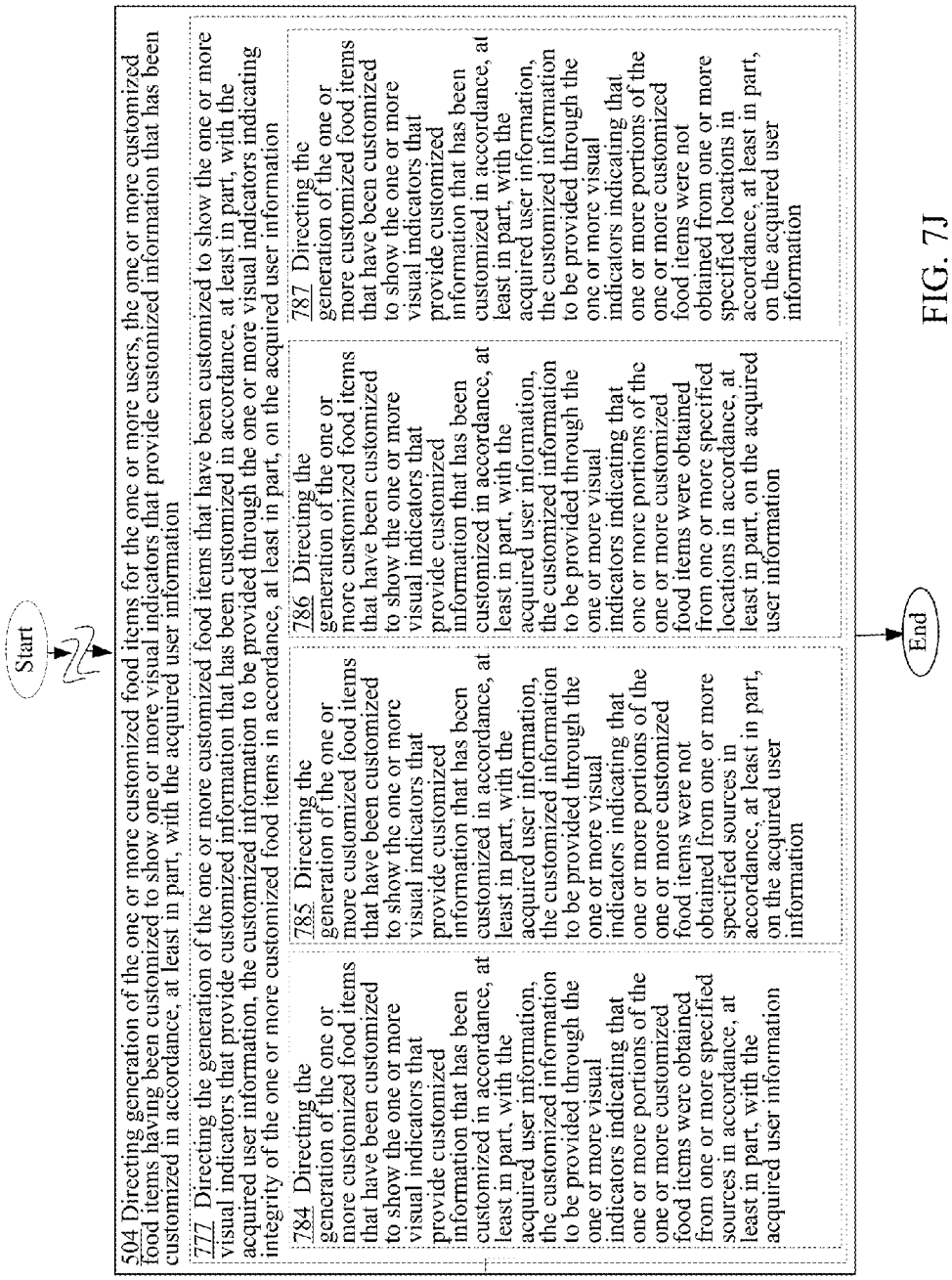
FIG. 7J is a high-level logic flowchart of a process depicting alternate implementations of the customized food item generation directing operation 504 of FIG. 5.

Turning now to FIG. 7J, in various implementations, operation 777 may include an operation 784 for directing the generation of the one or more customized food items that have been customized to show the one or more visual indicators that provide customized information that has been customized in accordance, at least in part, with the acquired user information, the customized information to be provided through the one or more visual indicators indicating that one or more portions of the one or more customized food items were obtained from one or more specified sources in accordance, at least in part, with the acquired user information. For instance, the customized food item generation controlling module 304* of the customized food preparation system 10a or 10b of FIG. 3A or 3B (or of the network control system 12a or 12b of FIG. 3D or 3E) directing or controlling the generation of the one or more customized food items (e.g., customized food item 22a of FIG. 2A) that have been customized to show the one or more visual indicators (e.g., visual indicators 204a of FIG. 2A) that provide customized information that has been customized in accordance, at least in part, with the acquired user information, the customized information to be provided through the one or more visual indicators (e.g., visual indicators 204a) indicating that one or more portions of the one or more customized food items were obtained from one or more specified sources (e.g., "C&H Sugar" as illustrated, for example, in FIG. 2A) in accordance, at least in part, with the acquired user information (e.g., in accordance with one or more user preferences).

In the same or alternative implementations, operation 777 may additionally or alternatively include an operation 785 for directing the generation of the one or more customized food items that have been customized to show the one or more visual indicators that provide customized information that has been customized in accordance, at least in part, with the acquired user information, the customized information to be provided through the one or more visual indicators indicating that one or more portions of the one or more customized food items were not obtained from one or more specified sources in accordance, at least in part, on the acquired user information. For instance, the customized food item generation controlling module 304* of the customized food preparation system 10a or 10b of FIG. 3A or 3B (or of the network control system 12a or 12b of FIG. 3D or 3E) directing or controlling the generation of the one or more customized food items (e.g., customized food item 22g of FIG. 2G) that have been customized to show the one or more visual indicators (e.g., visual indicators 204g of FIG. 2G) that provide customized information that has been customized in accordance, at least in part, with the acquired user information, the customized information to be provided through the one or more visual indicators (e.g., visual indicators 204g) indicating that one or more portions of the one or more customized food items (e.g., customized food item 22g) were not obtained from one or more specified sources (see, for example, "Chicken Bologna not from Tysons" in FIG. 2G) in accordance, at least in part, on the acquired user information (e.g., in accordance with one or more user preferences).

In the same or alternative implementations, operation 777 may additionally or alternatively include an operation 786 for directing the generation of the one or more customized food items that have been customized to show the one or more visual indicators that provide customized information that has been customized in accordance, at least in part, with the acquired user information, the customized information to be provided through the one or more visual indicators indicating that one or more portions of the one or more customized food items were obtained from one or more specified locations in accordance, at least in part, on the acquired user information. For instance, the customized food item generation controlling module 304* of the customized food preparation system 10a or 10b of FIG. 3A or 3B (or of the network control system 12a or 12b of FIG. 3D or 3E) directing or controlling the generation of the one or more customized food items (e.g., customized food item 22a of FIG. 2A) that have been customized to show the one or more visual indicators (e.g., visual indicators 204a of FIG. 2A) that provide customized information that has been customized in accordance, at least in part, with the acquired user information, the customized information to be provided through the one or more visual indicators (e.g., visual indicators 204a) indicating that one or more portions of the one or more customized food items (e.g., customized food item 22a) were obtained from one or more specified locations (see, for example, "C & H Sugar" as illustrated in FIG. 2A) in accordance, at least in part, on the acquired user information.

In the same or alternative implementations, operation 777 may additionally or alternatively include an operation 787 for directing the generation of the one or more customized food items that have been customized to show the one or more visual indicators that provide customized information that has been customized in accordance, at least in part, with the acquired user information, the customized information to be provided through the one or more visual indicators indicating that one or more portions of the one or more customized food items were not obtained from one or more specified locations in accordance, at least in part, on the acquired user information. For instance, the customized food item generation controlling module 304* of the customized food preparation system 10a or 10b of FIG. 3A or 3B (or of the network control system 12*a* or 12*b* of FIG. 3D or 3E) directing or controlling the generation of the one or more customized food items (e.g., customized food item 22*g* of FIG. 2G) that have been customized to show the one or more visual indicators (e.g., visual indicators 204*g* of FIG. 2G) that provide customized information that has been customized in accordance, at least in part, with the acquired user information, the customized information to be provided through the one or more visual indicators (e.g., visual indicators 204*g*) indicating that one or more portions of the one or more customized food items (e.g., customized food item 22*g*) were not obtained from one or more specified locations (see, for example, "No Beef from Britain" as illustrated in FIG. 2G) in accordance, at least in part, on the acquired user information.

Figure 7K:
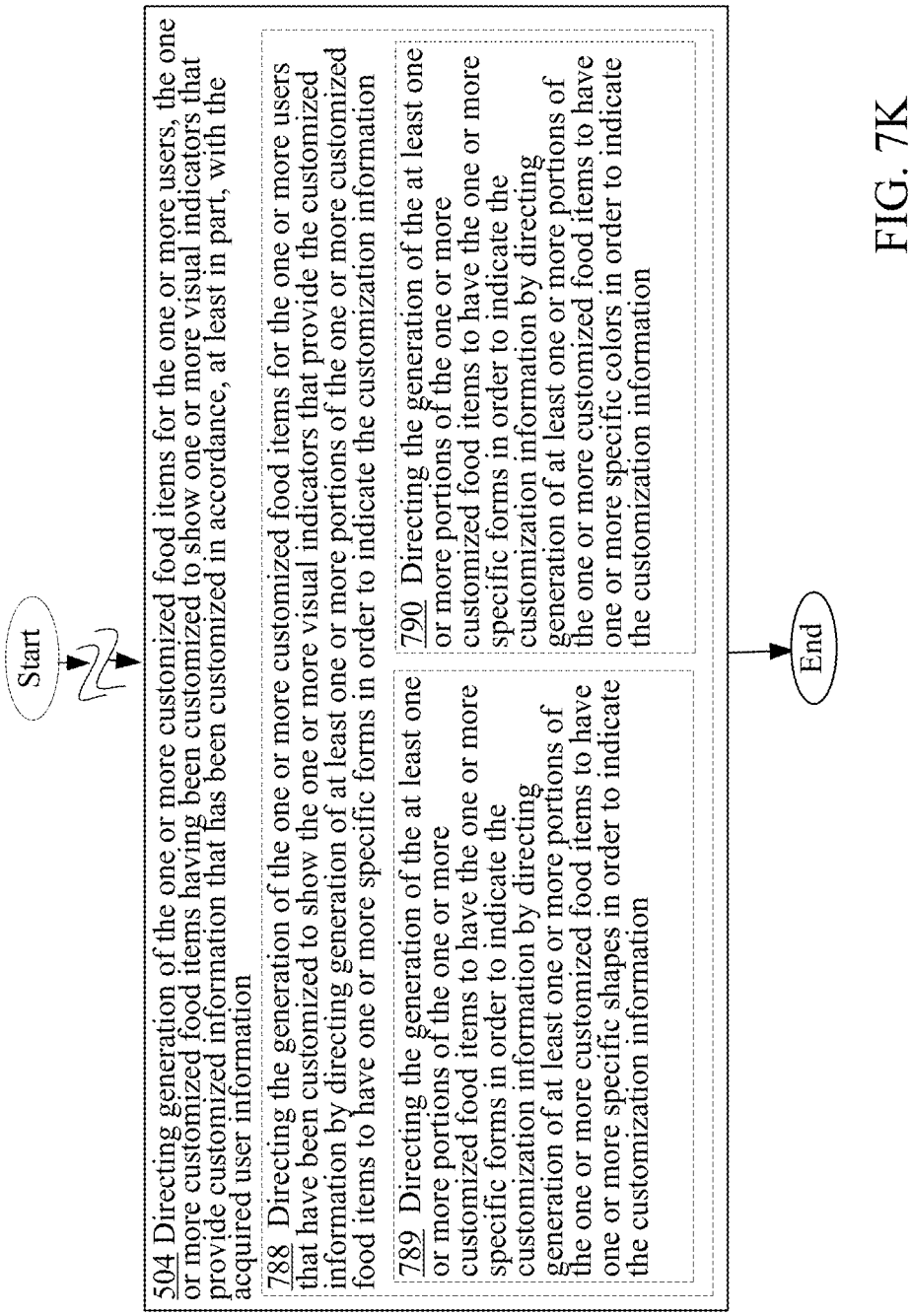
FIG. 7K is a high-level logic flowchart of a process depicting alternate implementations of the customized food item generation directing operation 504 of FIG. 5.

Turning now to FIG. 7K, in various implementations, the customized food item generation directing operation 504 of FIG. 5 may actually include an operation 788 for directing the generation of the one or more customized food items for the one or more users that have been customized to show the one or more visual indicators that provide the customized information by directing generation of at least one or more portions of the one or more customized food items to have one or more specific forms in order to indicate the customization information. For instance, the customized food item generation controlling module 304* including the customized food item form controlling module 448 (see FIG. 4B) of the customized food preparation system 10*a* or 10*b* of FIG. 3A or 3B (or of the network control system 12*a* or 12*b* of FIG. 3D or 3E) directing the generation of the one or more customized food items (e.g., customized food items 22*e* or 22*f* of FIG. 2E or 2G) for the one or more users that have been customized to show the one or more visual indicators that provide the customized information by having the customized food item form controlling module 448 direct or control generation (e.g., direct or control generation by the customized food item production system 460 of FIG. 4C or 4D) of at least one or more portions of the one or more customized food items (e.g., customized food items 22*e* or 22*f* of FIG. 2E or 2G) to have one or more specific forms (e.g., specific shapes, surface patterns, textures, and/or colors) in order to indicate the customization information.

As further illustrated in FIG. 7K, in some implementations, operation 788 may include an operation 789 for directing the generation of the at least one or more portions of the one or more customized food items to have the one or more specific forms in order to indicate the customization information by directing generation of at least one or more portions of the one or more customized food items to have one or more specific shapes in order to indicate the customization information. For instance, the customized food item form controlling module 448 including the customized food item shape controlling module 450 (see FIG. 4B) of the customized food preparation system 10*a* or 10*b* of FIG. 3A or 3B (or of the network control system 12*a* or 12*b* of FIG. 3D or 3E) directing the generation of the at least one or more portions of the one or more customized food items (e.g., customized food item 22*f* of FIG. 2F) to have the one or more specific forms in order to indicate the customization information by having the customized food item shape controlling module 450 direct or control generation (e.g., direct or control generation by the customized food item production system 460 of FIG. 4C or 4D) of at least one or more portions of the one or more customized food items (e.g., customized food item 22*f*) to have one or more specific shapes (e.g., the customized food item 22*f* of FIG. 2F having a cylindrical shape) in order to indicate the customization information (e.g., organic ingredients only used for the customized food item 220.

In the same or alternative implementations, operation 788 may additionally or alternatively include an operation 790 for directing the generation of the at least one or more portions of the one or more customized food items to have the one or more specific forms in order to indicate the customization information by directing generation of at least one or more portions of the one or more customized food items to have one or more specific colors in order to indicate the customization information. For instance, the customized food item form controlling module 448 including the customized food item color controlling module 452 (see FIG. 4B) of the customized food preparation system 10*a* or 10*b* of FIG. 3A or 3B (or of the network control system 12*a* or 12*b* of FIG. 3D or 3E) directing the generation of the at least one or more portions of the one or more customized food items (e.g. customized food item 22*e* of FIG. 2E) to have the one or more specific forms in order to indicate the customization information by having the customized food item color controlling module 452 direct or control generation (e.g., direct or control generation by the customized food item production system 460 of FIG. 4C or 4D) of at least one or more portions of the one or more customized food items (e.g. customized food item 22*e*) to have one or more specific colors in order to indicate the customization information (e.g., ingredient sources tested to be free of *E. coli* or *salmonella*).

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

This application may make reference to one or more trademarks, e.g., a word, letter, symbol, or device adopted by one manufacturer or merchant and used to identify and/or distinguish his or her product from those of others. Trademark names used herein are set forth in such language that makes clear their identity, that distinguishes them from common descriptive nouns, that have fixed and definite meanings, or, in many if not all cases, are accompanied by other specific identification using terms not covered by trademark. In addition, trademark names used herein have meanings that are well-known and defined in the literature, or do not refer to products or compounds for which knowledge of one or more trade secrets is required in order to divine their meaning. All trademarks referenced in this application are the property of their respective owners, and the appearance of one or more trademarks in this application does not diminish or otherwise adversely affect the validity of the one or more trademarks. All trademarks, registered or unregistered, that appear in this application are assumed to include a proper trademark symbol, e.g., the circle R or bracketed capitalization (e.g., [trademark name]), even when such trademark symbol does not explicitly appear next to the trademark. To the extent a trademark is used in a descriptive manner to refer to a product or process, that trademark should be interpreted to represent the corresponding product or process as of the date of the filing of this patent application.

Throughout this application, the terms "in an embodiment," 'in one embodiment," "in some embodiments," "in several embodiments," "in at least one embodiment," "in various embodiments," and the like, may be used. Each of these terms, and all such similar terms should be construed as "in at least one embodiment, and possibly but not necessarily all embodiments," unless explicitly stated otherwise. Specifically, unless explicitly stated otherwise, the intent of phrases like these is to provide non-exclusive and non-limiting examples of implementations of the invention. The mere statement that one, some, or may embodiments include one or more things or have one or more features, does not imply that all embodiments include one or more things or have one or more features, but also does not imply that such embodiments must exist. It is a mere indicator of an example and should not be interpreted otherwise, unless explicitly stated as such.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

What is claimed is:

1. An automated customized food preparation system, comprising:
    at least one processing device; and
    one or more instructions which, when executed by the at least one processing device, cause the at least one processing device to perform one or more operations including at least:
        detecting one or more users within at least one proximity of the automated customized food preparation system;
        acquiring one or more user preferences associated with the one or more users for use in generating one or more food items customized for the one or more users in accordance, at least in part, with the one or more user preferences; and
        controlling at least one hardware-based preparation component of the automated customized food preparation system to generate the one or more food items customized for the one or more users; and
        controlling at least one printing component of the automated customized food preparation system to direct placement of one or more visual indicators onto the one or more food items customized for the one or more users, the one or more visual indicators providing information relating to one or more customizations occurring during the generation in accordance, at least in part, with the one or more user preferences.

2. The automated customized food preparation system of claim 1, wherein acquiring one or more user preferences associated with the one or more users for use in generating one or more food items customized for the one or more users in accordance, at least in part, with the one or more user preferences comprises:
    acquiring at least a portion of the one or more user preferences from one or more mobile devices associated with the one or more users, the one or more mobile devices having been detected within the at least one proximity of the automated customized food generation.

3. The automated customized food preparation system of claim 1, wherein acquiring one or more user preferences associated with the one or more users for use in generating one or more food items customized for the one or more users in accordance, at least in part, with the one or more user preferences comprises:

retrieving at least a portion of the one or more user preferences from a memory based, at least in part, on one or more user identifications provided by the one or more users.

4. The automated customized food preparation system of claim 1, wherein acquiring one or more user preferences associated with the one or more users for use in generating one or more food items customized for the one or more users in accordance, at least in part, with the one or more user preferences comprises:

retrieving at least a portion of the one or more user preferences from the Internet based, at least in part, on one or more user identifications provided by the one or more users.

5. The automated customized food preparation system of claim 4, wherein retrieving at least a portion of the one or more user preferences from the Internet based, at least in part, on one or more user identifications provided by the one or more users comprises:

retrieving at least a portion of the one or more user preferences from one or more social networking websites based, at least in part, on one or more user identifications provided by the one or more users.

6. The automated customized food preparation system of claim 1, wherein acquiring one or more user preferences associated with the one or more users for use in generating one or more food items customized for the one or more users in accordance, at least in part, with the one or more user preferences comprises:

acquiring dietary information associated with the one or more users.

7. The automated customized food preparation system of claim 6, wherein acquiring dietary information associated with the one or more users comprises:

acquiring one or more dietary preferences of the one or more users.

8. The automated customized food preparation system of claim 7, wherein acquiring one or more dietary preferences of the one or more users comprises:

acquiring one or more ingredient preferences of the one or more users.

9. The automated customized food preparation system of claim 6, wherein acquiring dietary information associated with the one or more users comprises:

acquiring at least one of one or more dietary schedules or one or more dietary restrictions of the one or more users.

10. The automated customized food preparation system of claim 6, wherein acquiring dietary information associated with the one or more users comprises:

acquiring historical dietary information associated with the one or more users.

11. The automated customized food preparation system of claim 1, wherein acquiring one or more user preferences associated with the one or more users for use in generating one or more food items customized for the one or more users in accordance, at least in part, with the one or more user preferences comprises:

acquiring one or more user preferences related to purity of one or more food ingredients for use in generating one or more food items customized for the one or more users.

12. The automated customized food preparation system of claim 11, wherein acquiring one or more user preferences related to purity of one or more food ingredients for use in generating one or more food items customized for the one or more users comprises:

acquiring one or more user preferences that one or more sources for the one or more ingredients were tested for presence of one or more impurities.

13. The automated customized food preparation system of claim 12, wherein acquiring one or more user preferences that one or more sources for the one or more ingredients were tested for presence of one or more impurities comprises:

acquiring one or more user preferences that the one or more sources for the one or more ingredients were tested for presence of at least one of one or more prions or one or more selective bacteria.

14. The automated customized food preparation system of claim 1, wherein acquiring one or more user preferences associated with the one or more users for use in generating one or more food items customized for the one or more users in accordance, at least in part, with the one or more user preferences comprises:

acquiring one or more user preferences for one or more sources for obtaining one or more food ingredients for use in generating one or more food items customized for the one or more users.

15. The automated customized food preparation system of claim 14, wherein acquiring one or more user preferences for one or more sources for obtaining one or more food ingredients for use in generating one or more food items customized for the one or more users comprises:

acquiring one or more user preferences that one or more identified sources not be the one or more sources for obtaining the one or more food ingredients for use in generating one or more food items customized for the one or more users.

16. The automated customized food preparation system of claim 1, wherein acquiring one or more user preferences associated with the one or more users for use in generating one or more food items customized for the one or more users in accordance, at least in part, with the one or more user preferences comprises:

acquiring one or more user preferences for one or more locations for obtaining one or more food ingredients for use in generating one or more food items customized for the one or more users.

17. The automated customized food preparation system of claim 16, wherein acquiring one or more user preferences for one or more locations for obtaining one or more food ingredients for use in generating one or more food items customized for the one or more users comprises:

acquiring one or more user preferences for one or more locations to not be the one or more sources for obtaining the one or more food ingredients for use in generating one or more food items customized for the one or more users.

18. The automated customized food preparation system of claim 1, wherein acquiring one or more user preferences associated with the one or more users for use in generating one or more food items customized for the one or more users in accordance, at least in part, with the one or more user preferences comprises:

acquiring at least one indication of at least one group of affiliated users of which the one or more users are members; and acquiring at least one indication of at least one food sensitivity of at least one member of the at least one group of affiliated users in order to customize one or more food items for the one or more users omitting one or more ingredients associated with the at least one food sensitivity even when the one or more users do not themselves experience the at least one food sensitivity.

19. The automated customized food preparation system of claim 18, wherein acquiring at least one indication of at least one group of affiliated users of which the one or more users are members comprises:
  acquiring at least one indication of at least one group of affiliated users of which the one or more users are members based, at least in part, on social networking information provided through one or more devices associated with at least one of the one or more users.

20. The automated customized food preparation system of claim 1, wherein controlling at least one hardware-based preparation component of the automated customized food preparation system to generate the one or more food items customized for the one or more users comprises:
  controlling one or more food item printing components of the automated customized food preparation system to generate the one or more food items customized for the one or more users.

21. The automated customized food preparation system of claim 20, wherein controlling one or more food item printing components of the automated customized food preparation system to generate the one or more food items customized for the one or more users comprises:
  controlling one or more ingredient deposition components of the automated customized food preparation system to fabricate the one or more food items customized for the one or more users at least in part via placement of one or more layers of one or more ingredients.

22. The automated customized food preparation system of claim 1, wherein controlling at least one printing component of the automated customized food preparation system to direct placement of one or more visual indicators onto the one or more food items customized for the one or more users, the one or more visual indicators providing information relating to one or more customizations occurring during the generation in accordance, at least in part, with the one or more user preferences comprises:
  directing printing of the one or more visual indicators providing information relating to one or more customizations occurring during the generation in accordance, at least in part, with the one or more user preferences onto one or more labels; and
  directing affixing the one or more printed labels onto the one or more food items customized for the one or more users.

23. The automated customized food preparation system of claim 1, wherein controlling at least one printing component of the automated customized food preparation system to direct placement of one or more visual indicators onto the one or more food items customized for the one or more users, the one or more visual indicators providing information relating to one or more customizations occurring during the generation in accordance, at least in part, with the one or more user preferences comprises:
  controlling at least one press printing component of the automated customized food preparation system to stamp the one or more visual indicators into at least one surface of the one or more food items customized for the one or more users, the one or more visual indicators providing information relating to one or more customizations occurring during the generation in accordance, at least in part, with the one or more user preferences.

24. The automated customized food preparation system of claim 1, wherein controlling at least one printing component of the automated customized food preparation system to direct placement of one or more visual indicators onto the one or more food items customized for the one or more users, the one or more visual indicators providing information relating to one or more customizations occurring during the generation in accordance, at least in part, with the one or more user preferences comprises:
  controlling at least one printing component of the automated customized food preparation system to direct placement of one or more visual indicators indicating dietary information of at least one of the one or more users onto the one or more food items customized for the one or more users.

25. The automated customized food preparation system of claim 24, wherein controlling at least one printing component of the automated customized food preparation system to direct placement of one or more visual indicators indicating dietary information of at least one of the one or more users onto the one or more food items customized for the one or more users comprises:
  controlling at least one printing component of the automated customized food preparation system to direct placement of one or more visual indicators indicating historical dietary consumption information of the at least one of the one or more users onto the one or more food items customized for the one or more users.

26. The automated customized food preparation system of claim 25, wherein controlling at least one printing component of the automated customized food preparation system to direct placement of one or more visual indicators indicating historical dietary consumption information of the at least one of the one or more users onto the one or more food items customized for the one or more users comprises:
  controlling at least one printing component of the automated customized food preparation system to direct placement of one or more visual indicators indicating one or more consumption totals of one or more food ingredients consumed previously by the at least one of the one or more users during one or more predefined periods of time onto the one or more food items customized for the one or more users.

27. The automated customized food preparation system of claim 1, wherein controlling at least one printing component of the automated customized food preparation system to direct placement of one or more visual indicators onto the one or more food items customized for the one or more users, the one or more visual indicators providing information relating to one or more customizations occurring during the generation in accordance, at least in part, with the one or more user preferences comprises:
  controlling at least one printing component of the automated customized food preparation system to direct placement of one or more visual indicators identifying one or more ingredients included in the one or more food items customized for the one or more users, including at least placing the one or more visual indicators placed onto the one or more food items customized for the one or more users.

28. The automated customized food preparation system of claim 27, wherein controlling at least one printing component of the automated customized food preparation system to direct placement of one or more visual indicators identifying one or more ingredients included in the one or more food items customized for the one or more users, including at least placing the one or more visual indicators placed onto the one or more food items customized for the one or more users comprises:

controlling at least one printing component of the automated customized food preparation system to direct placement of one or more visual indicators indicating one or more quantities of the one or more ingredients included in the one or more food items customized for the one or more users.

29. The automated customized food preparation system of claim 1, wherein controlling at least one printing component of the automated customized food preparation system to direct placement of one or more visual indicators onto the one or more food items customized for the one or more users, the one or more visual indicators providing information relating to one or more customizations occurring during the generation in accordance, at least in part, with the one or more user preferences comprises:

controlling at least one printing component of the automated customized food preparation system to direct placement of one or more visual indicators identifying one or more controlled substance ingredients included in the one or more food items customized for the one or more users, including at least directing a press printing component of the automated customized food preparation system to stamp the one or more visual indicators into at least one surface of the one or more food items customized for the one or more users.

30. The automated customized food preparation system of claim 29, wherein controlling at least one printing component of the automated customized food preparation system to direct placement of one or more visual indicators identifying one or more controlled substance ingredients included in the one or more food items customized for the one or more users, including at least directing a press printing component of the automated customized food preparation system to stamp the one or more visual indicators into at least one surface of the one or more food items customized for the one or more users comprises:

controlling at least one printing component of the automated customized food preparation system to direct placement of one or more visual indicators identifying one or more controlled substance ingredients included in the one or more food items, including at least one or more medications compounded by the automated customized food preparation machine, for the one or more users.

31. The automated customized food preparation system of claim 1, wherein controlling at least one printing component of the automated customized food preparation system to direct placement of one or more visual indicators onto the one or more food items customized for the one or more users, the one or more visual indicators providing information relating to one or more customizations occurring during the generation in accordance, at least in part, with the one or more user preferences comprises:

controlling at least one printing component of the automated customized food preparation system to direct placement of one or more visual indicators indicating integrity of the one or more food items customized for the one or more users.

32. The automated customized food preparation system of claim 31, wherein controlling at least one printing component of the automated customized food preparation system to direct placement of one or more visual indicators indicating integrity of the one or more food items customized for the one or more users comprises:

controlling at least one printing component of the automated customized food preparation system to direct placement of one or more visual indicators indicating integrity of the one or more food items customized for the one or more users, the one or more visual indicators indicating integrity operable to provide visual confirmation that the one or more food items have not been tampered with subsequent to their generation.

33. The automated customized food preparation system of claim 1, wherein controlling at least one hardware-based preparation component of the automated customized food preparation system to generate the one or more food items customized for the one or more users and controlling at least one printing component of the automated customized food preparation system to direct placement of one or more visual indicators onto the one or more food items customized for the one or more users, the one or more visual indicators providing information relating to one or more customizations occurring during the generation in accordance, at least in part, with the one or more user preferences comprise:

controlling at least one hardware-based preparation component of the automated customized food preparation system to generate one or more food items having one or more visual indicators providing information relating to one or more customizations occurring during the generation in accordance, at least in part, with the one or more user preferences, including at least directing three-dimensional printing of the one or more food items to generate the one or more food items with one or more specific forms, the one or more specific forms being the one or more visual indicators providing information relating to one or more customizations occurring during the generation in accordance, at least in part, with the one or more user preferences.

34. The automated customized food preparation system of claim 33, wherein controlling at least one hardware-based preparation component of the automated customized food preparation system to generate one or more food items having one or more visual indicators providing information relating to one or more customizations occurring during the generation in accordance, at least in part, with the one or more user preferences, including at least directing three-dimensional printing of the one or more food items to generate the one or more food items with one or more specific forms, the one or more specific forms being the one or more visual indicators providing information relating to one or more customizations occurring during the generation in accordance, at least in part, with the one or more user preferences comprises:

directing three-dimensional printing of the one or more food items in one or more specific colors in order to provide the information relating to one or more customizations occurring during the generation in accordance, at least in part, with the one or more user preferences.

35. The automated customized food preparation system of claim 1, wherein detecting one or more users within at least one proximity of the automated customized food preparation system comprises:

detecting, within at least one proximity of the automated customized food preparation system, at least one mobile device associated with one or more users known to the automated customized food preparation system.

36. The automated customized food preparation system of claim 1, wherein acquiring one or more user preferences associated with the one or more users for use in generating one or more food items customized for the one or more users in accordance, at least in part, with the one or more user preferences comprises:

acquiring, from at least one mobile device associated with the one or more users, one or more user preferences associated with the one or more users for use in generating one or more food items in accordance, at least in part, with the one or more user preferences.

37. The automated customized food preparation system of claim 1, wherein controlling at least one printing component of the automated customized food preparation system to direct placement of one or more visual indicators onto the one or more food items customized for the one or more users, the one or more visual indicators providing information relating to one or more customizations occurring during the generation in accordance, at least in part, with the one or more user preferences comprises:

controlling at least one printing component of the automated customized food preparation system to direct placement of one or more edible visual indicators onto the one or more food items customized for the one or more users, the one or more edible visual indicators providing information relating to one or more customizations occurring during the generation in accordance, at least in part, with the one or more user preferences.

38. The automated customized food preparation system of claim 37, wherein controlling at least one printing component of the automated customized food preparation system to direct placement of one or more edible visual indicators onto the one or more food items customized for the one or more users, the one or more edible visual indicators providing information relating to one or more customizations occurring during the generation in accordance, at least in part, with the one or more user preferences comprises:

controlling at least one printing component of the automated customized food preparation system to direct printing of one or more edible labels and to direct placement of the one or more edible labels onto the one or more food items customized for the one or more users, the one or more edible labels providing information relating to one or more customizations occurring during the generation in accordance, at least in part, with the one or more user preferences.

39. The automated customized food preparation system of claim 37, wherein controlling at least one printing component of the automated customized food preparation system to direct placement of one or more edible visual indicators onto the one or more food items customized for the one or more users, the one or more edible visual indicators providing information relating to one or more customizations occurring during the generation in accordance, at least in part, with the one or more user preferences comprises:

controlling at least one printing component of the automated customized food preparation system to direct printing, using edible ink, of one or more visual indicators onto the one or more food items customized for the one or more users, the one or more visual indicators printed using edible ink providing information relating to one or more customizations occurring during the generation in accordance, at least in part, with the one or more user preferences.

40. The automated customized food preparation system of claim 1, wherein controlling at least one hardware-based preparation component of the automated customized food preparation system to generate the one or more food items customized for the one or more users and controlling at least one printing component of the automated customized food preparation system to direct placement of one or more visual indicators onto the one or more food items customized for the one or more users, the one or more visual indicators providing information relating to one or more customizations occurring during the generation in accordance, at least in part, with the one or more user preferences comprise:

controlling at least one hardware-based preparation component of the automated customized food preparation system to generate one or more food items having one or more visual indicators providing information relating to one or more customizations occurring during the generation in accordance, at least in part, with the one or more user preferences, including at least directing three-dimensional printing of the one or more food items while leaving, via the three-dimensional printing, a stamp of the one or more visual indicators on a surface of the one or more food items, the one or more visual indicators providing information relating to one or more customizations occurring during the generation in accordance, at least in part, with the one or more user preferences.

41. A method for an automated customized food preparation system, comprising:

detecting one or more users within at least one proximity of the automated customized food preparation system;

acquiring one or more user preferences associated with the one or more users for use in generating one or more food items customized for the one or more users in accordance, at least in part, with the one or more user preferences;

controlling at least one hardware-based preparation component of the automated customized food preparation system to generate the one or more food items customized for the one or more users; and controlling at least one printing component of the automated customized food preparation system to direct placement of one or more visual indicators onto the one or more food items customized for the one or more users, the one or more visual indicators providing information relating to one or more customizations occurring during the generation in accordance, at least in part, with the one or more user preferences, wherein at least one of the detecting, acquiring, or controlling is at least partially implemented using at least one processing device.

42. An automated customized food preparation system, comprising:

electrical circuitry configured for detecting one or more users within at least one proximity of the automated customized food preparation system;

electrical circuitry configured for acquiring one or more user preferences associated with the one or more users for use in generating one or more food items customized for the one or more users in accordance, at least in part, with the one or more user preferences; and electrical circuitry configured for controlling at least one hardware-based preparation component of the automated customized food preparation system to generate the one or more food items customized for the one or more users; and electrical circuitry configured for controlling at least one printing component of the automated customized food preparation system to direct placement of one or more visual indicators onto the one or more food items customized for the one or more users, the one or more visual indicators providing information relating to one or more customizations occurring during the generation in accordance, at least in part, with the one or more user preferences.

\* \* \* \* \*